(12) United States Patent
Kim et al.

(10) Patent No.: US 10,656,375 B2
(45) Date of Patent: May 19, 2020

(54) LENS DRIVING DEVICE, CAMERA MODULE, AND OPTICAL DEVICE

(71) Applicant: LG INNOTEK CO., LTD., Seoul (KR)

(72) Inventors: Jung Cheol Kim, Seoul (KR); Jin Suk Han, Seoul (KR); Sang Ok Park, Seoul (KR); Tae Bong Park, Seoul (KR); Seung Taek Shin, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 16/099,798

(22) PCT Filed: May 8, 2017

(86) PCT No.: PCT/KR2017/004771
§ 371 (c)(1),
(2) Date: Nov. 8, 2018

(87) PCT Pub. No.: WO2017/196047
PCT Pub. Date: Nov. 16, 2017

(65) Prior Publication Data
US 2019/0107685 A1   Apr. 11, 2019

(30) Foreign Application Priority Data

May 9, 2016  (KR) .......................... 10-2016-0056218
Jun. 30, 2016 (KR) .......................... 10-2016-0082896
(Continued)

(51) Int. Cl.
*H04N 5/00*    (2011.01)
*H04N 5/225*   (2006.01)
(Continued)

(52) U.S. Cl.
CPC ................. *G02B 7/09* (2013.01); *G02B 3/10* (2013.01); *G02B 7/02* (2013.01); *G02B 7/10* (2013.01);
(Continued)

(58) Field of Classification Search
CPC ... G02B 7/09; G02B 7/02; G02B 7/10; G02B 3/10; G02B 27/646; H02K 11/215;
(Continued)

(56) References Cited

U.S. PATENT DOCUMENTS 8,970,973 B2    3/2015  Cho et al.
9,547,216 B2 *  1/2017  Jung ..................... G03B 13/36
(Continued)

FOREIGN PATENT DOCUMENTS

JP    2014-153718 A    8/2014
JP    2016-17977 A     2/2016
(Continued)

*Primary Examiner* — Hung H Lam
(74) *Attorney, Agent, or Firm* — Birch, Stewart, Kolasch & Birch, LLP

(57) ABSTRACT

The present embodiments relates to a lens driving device comprising: a housing; a bobbin disposed in the housing; a coil disposed on the bobbin; a first magnet which is disposed on the housing and faces the coil; a second magnet disposed on the bobbin; and a sensor which is disposed on the housing and faces the second sensor, wherein the sensor comprises an upper surface, a lower surface disposed opposite the upper surface, an inner surface facing the second magnet, an outer surface disposed opposite the inner surface, and both lateral surfaces connecting the inner surface with the outer surface, the upper surface and the lower surface of the sensor are fixed to the housing, and one of the side surfaces of the sensor is opened.

20 Claims, 38 Drawing Sheets

(30) Foreign Application Priority Data

| Jun. 30, 2016 | (KR) | 10-2016-0082901 |
|---|---|---|
| Jul. 14, 2016 | (KR) | 10-2016-0089090 |
| Jul. 14, 2016 | (KR) | 10-2016-0089093 |

(51) Int. Cl.

| G02B 7/09 | (2006.01) |
|---|---|
| H04N 5/232 | (2006.01) |
| G03B 5/00 | (2006.01) |
| G03B 3/10 | (2006.01) |
| G02B 7/02 | (2006.01) |
| G02B 7/10 | (2006.01) |
| G02B 3/10 | (2006.01) |
| H02K 11/215 | (2016.01) |
| G02B 27/64 | (2006.01) |
| G03B 5/04 | (2006.01) |
| G03B 13/36 | (2006.01) |
| H02K 5/24 | (2006.01) |
| H02K 41/035 | (2006.01) |

(52) U.S. Cl.
CPC ............ *G02B 27/646* (2013.01); *G03B 3/10* (2013.01); *G03B 5/00* (2013.01); *G03B 5/04* (2013.01); *G03B 13/36* (2013.01); *H02K 5/24* (2013.01); *H02K 11/215* (2016.01); *H02K 41/0356* (2013.01); *H04N 5/2253* (2013.01); *H04N 5/2254* (2013.01); *H04N 5/22525* (2018.08); *H04N 5/232* (2013.01); *G03B 2205/0015* (2013.01); *G03B 2205/0023* (2013.01); *G03B 2205/0069* (2013.01)

(58) Field of Classification Search
CPC .... H02K 5/24; H02K 41/0356; H04N 5/2253; H04N 5/2254; H04N 5/232; H04N 5/22525; G03B 2205/0015; G03B 2205/0023; G03B 2205/0069; G03B 5/00; G03B 3/10; G03B 5/04; G03B 13/36
See application file for complete search history.

(56) References Cited

U.S. PATENT DOCUMENTS

| 2015/0116514 A1* | 4/2015 | Kim | G03B 13/36 |
| | | | 348/208.4 |
| 2015/0309282 A1 | 10/2015 | Lee et al. | |
| 2015/0378169 A1* | 12/2015 | Kim | G02B 27/646 |
| | | | 359/557 |
| 2016/0048033 A1 | 2/2016 | Kim et al. | |
| 2016/0344919 A1* | 11/2016 | Cho | H04N 5/2254 |
| 2017/0038601 A1* | 2/2017 | Fan | G02B 27/646 |
| 2017/0115463 A1 | 4/2017 | Osaka et al. | |
| 2017/0139225 A1* | 5/2017 | Lim | G02B 27/646 |

FOREIGN PATENT DOCUMENTS

| JP | 2016-20992 A | 2/2016 |
| KR | 20-2013-0007120 U | 12/2013 |
| KR | 10-2015-0128263 A | 11/2015 |

* cited by examiner

LENS DRIVING DEVICE, CAMERA MODULE, AND OPTICAL DEVICE

CROSS REFERENCE TO RELATED APPLICATIONS

This application is the National Phase of PCT International Application No. PCT/KR2017/004771, filed on May 8, 2017, which claims priority under 35 U.S.C. 119(a) to Patent Application Nos. 10-2016-0056218, filed in the Republic of Korea on May 9, 2016, 10-2016-0082896, filed in the Republic of Korea on Jun. 30, 2016, 10-2016-0082901, filed in the Republic of Korea on Jun. 30, 2016, 10-2016-0089090, filed in the Republic of Korea on Jul. 14, 2016, 10-2016-0089093, filed in the Republic of Korea on Jul. 14, 2016, all of which are hereby expressly incorporated by reference into the present application.

TECHNICAL FIELD

This embodiment relates to a lens driving device, a camera module, and an optical device.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals.

Among the representative items thereof, a camera module photographing a subject in a picture or a video may be mentioned. Meantime, a camera module equipped with auto focus function is recently used. Furthermore, a camera module equipped with auto focus feedback function has been developed. Meantime, in order to implement the abovementioned auto focus feedback function, there is a need to accurately detect a movement of bobbin mounted with a lens to an optical axis direction.

However, the conventional camera module suffers from disadvantages in that an optical axis direction position of a sensor is changed in response to a coated mount of adhesive in the manufacturing process. Furthermore, the conventional camera module suffers from disadvantages in that an optical axis direction position of a sensing magnet is changed in response to a coated mount of adhesive in the manufacturing process.

Meantime, in order to realize the abovementioned auto focus function and auto focus feedback function, there is a need to supply an electric power to a driving part moving a lens and to electrically connect a lens movement-sensing sensor to an outside element.

However, the convention lens driving device suffers from disadvantages in that peaks and workability deteriorate in the coupling between conductive members for forming a conductive line for a driving part and a sensor.

Furthermore, the convention lens driving device suffers from disadvantages in that operation defects occur due to disengaged coupling after reliability test because coupling between conductive members for forming a conductive line for a driving part and a sensor is not properly implemented.

A camera module for miniaturization and low power consumption is difficult in being applied with a VCM (Voice Coil Motor) used in the conventional camera module and therefore, studies thereto are being briskly waged. Demands and manufacturing increase for smart phones and electronic products such as portable phones mounted with a camera. Trends are that a camera for portable phones is being high-pixelated and miniaturized and an actuator is also miniaturized, large-calibered and multi-functionalized in response to the abovementioned trend.

Concomitant with miniaturization and slimming of cameras for mobile phones, an electromagnetic force of a lens driving device for camera module decreases and spring force of an elastic member also decreases. Moreover, the vibration motor for mobile phones is also changed in shape to a linear vibration motor due to increased capacity of battery for mobile phones in order to allow a vibration motor for vibration mode of a mobile phone disposed at a lower side of a battery to be disposed near to a camera module and to make vibration feel good.

The linear vibration motor suffers from disadvantages in that resolution of a camera mounted on the mobile phone may deteriorate due to influence from vibration as the vibration is generated to an optical axis direction of a lens driving device, and noise may be generated.

Furthermore, an outside shock, e.g., a shock generated during touch input of a smart phone may result in generation of trembling on the lens driving device mounted on the mobile phones, and the resolution of a camera may deteriorate due to the trembling.

DETAILED DESCRIPTION OF THE INVENTION

Technical Subject

In order to solve the aforementioned disadvantages/problems, an exemplary embodiment of the present invention is to provide a lens driving device in which an upper surface and a lower surface of a sensor are all fitted to a housing.

An exemplary embodiment of the present invention is to provide a lens driving device in which an upper surface and a lower surface of a sensing magnet are all fitted to a housing.

An exemplary embodiment of the present invention is to provide a lens driving device in which peaks and workability are improved when a conductive line is formed for a driving part and a sensor.

An exemplary embodiment of the present invention is to provide a lens driving device in which workability is simplified and an area of pad part is enlargeable by arranging and moving a conductive pad of a substrate for supplying an electric power to an auto focus driving coil to a center part.

Furthermore, an exemplary embodiment of the present invention is to provide a lens driving device in which soldering is excellent and reliability can be secured by designing position of pad at the same level as that of support member (1:1) or designing the position of pad to be a bit lower than the support member.

Furthermore, an exemplary embodiment of the present invention is to provide a camera module including a lens driving device and an optical device.

An exemplary embodiment of the present invention is to provide a lens driving device configured to restrict vibration of vibration motor at a mobile phone or to restrict vibration of mover caused by outside shock, and to prevent deterioration of resolution caused by vibration of mover, a camera module including the lens driving device and an optical device.

Technical Solution

A lens driving device according to an exemplary embodiment of the present invention comprising: a housing; a bobbin disposed in the housing; a coil disposed on the bobbin; a first magnet which is disposed on the housing and faces the coil; a second magnet disposed on the bobbin; and a sensor which is disposed on the housing and faces the second sensor, wherein the sensor comprises an upper surface, a lower surface disposed opposite the upper surface, an inner surface facing the second magnet, an outer surface disposed opposite the inner surface, and both lateral surfaces connecting the inner surface with the outer surface, the upper surface and the lower surface of the sensor are fixed to the housing, and one of the side surfaces of the sensor is opened.

Preferably, but not necessarily, the other surface of both lateral surfaces in the sensor may be fixed to the housing.

Preferably, but not necessarily, the housing may include a lower guide part contacting a lower surface of sensor, an upper guide part contacting an upper surface of sensor, and a lateral guide part contacting the other surface of sensor, and an inner guide contacting a portion of the inner surface of sensor.

Preferably, but not necessarily, at least one surface of the lower surface, upper surface and the other surface and inner surface of sensor may be fixed to the housing using an adhesive.

Preferably, but not necessarily, the lens driving device may further comprise a substrate coupled to the sensor and disposed on the housing, wherein the sensor is disposed at an inner surface of substrate, an outer surface of substrate is disposed at a coupled surface of housing, wherein the coupled surface of housing includes a first surface parallel with the outer surface of sensor, a second surface disposed on the first surface to form an obtuse angle with the first surface, and a third surface disposed underneath the first surface to form an obtuse angle with the first surface, wherein an upper surface of substrate disposed on the second surface and a lower surface of the substrate disposed on the third surface are bent toward the sensor.

Preferably, but not necessarily, the housing may include a lateral guide part contacting the other surface of both lateral surfaces of sensor, and a bonding infuse hole formed between the lateral guide part and the coupled surface.

Preferably, but not necessarily, the lens driving device may further comprise a substrate coupled by the sensor and disposed at the housing, wherein the substrate includes a body part, a sensor mounting part extended from a first lateral surface of body part and coupled by the sensor, and a terminal part downwardly extended from the body part, wherein the a second lateral surface disposed opposite to the first lateral surface of body part is coupled by being press-fitted to the housing by an interference fitting method.

Preferably, but not necessarily, the lens driving device may further comprise a support member coupled to the housing and the bobbin and having elasticity on at least a portion thereof, wherein the support member may include an outer part coupled to the housing, an inner part coupled to the bobbin, a connection part connecting the outer part and the inner part, and a terminal part extended from the outer part, wherein the terminal part of substrate may be interposed between the support member and the terminal part.

Preferably, but not necessarily, the sensor may be disposed at a corner part formed between lateral parts of housing.

Preferably, but not necessarily, the housing may include a first lateral part, a first corner part disposed at one side of the first lateral part, and a second corner part disposed at the other side of the first lateral part, wherein the sensor may be disposed at the first corner part, and the first magnet may include a first magnet unit disposed at the first lateral part of housing, and the first magnet unit may be more eccentrically disposed toward a second corner part side than the first corner part.

Preferably, but not necessarily, a portion of upper surface of sensor and a portion of lower surface of sensor may be fixed to the housing, and remaining portion of upper surface of sensor and remaining portion of lower surface of sensor may be opened.

Preferably, but not necessarily, the second magnet may be interposed between the coil and the sensor, and an upper surface and a lower surface of second magnet may be fixed to the bobbin.

Preferably, but not necessarily, the bobbin may include an upper support part fixed by an upper surface of the second magnet, and a hole formed at the upper support part to open a portion of upper surface of second magnet.

A camera module according to an exemplary embodiment of the present invention may comprise: a PCB; an image sensor disposed at the PCB; a lens driving device of claim 1 disposed at the PCB; and a lens coupled to a bobbin of the lens driving device and disposed on the image sensor.

An optical device according to an exemplary embodiment of the present invention may comprise: a body; a camera module of claim 14 disposed at the body; and a display part disposed at one surface of body to output an image photographed by the camera module.

A lens driving device according to an exemplary embodiment of the present invention may comprise: a housing including a hole; a bobbin accommodated into the hole; a driving magnet disposed at the housing; a coil disposed at the bobbin to face the driving magnet; a sensing magnet disposed at the bobbin; and a sensor disposed at the housing to detect the sensing magnet, wherein an upper surface and a lower surface of sensor may be fixed to the housing, and one lateral surface of both lateral surfaces of sensor may be opened.

Preferably, but not necessarily, the other lateral surface of both lateral surfaces of sensor may be fixed by being touched to the housing.

Preferably, but not necessarily, the housing may include a lower guide part contacting a lower surface of sensor, an upper guide part contacting an upper surface of sensor, a lateral guide part contacting the other lateral surface of sensor and an inner guide part contacting a portion of inner surface of sensor.

Preferably, but not necessarily, at least one surface of the lower surface, the upper surface, the other lateral surface and the inner surface of sensor may be fixed to the housing by an adhesive.

Preferably, but not necessarily, the lens driving device according to an exemplary embodiment of the present invention may further comprise a substrate coupled by the sensor and disposed with the housing, wherein the sensor may be disposed at an inner surface of substrate, an outside surface of substrate may contact a coupled surface of housing, and the coupled surface may include a slant surface slantly formed to allow an upper surface and lower surface of substrate coupled to the coupled surface to be inwardly bent.

Preferably, but not necessarily, the housing may include a bonding infuse hole formed between a lateral guide part contacting the other surface of both lateral surfaces of sensor and the coupled surface.

Preferably, but not necessarily, the lens driving device according to an exemplary embodiment of the present invention may further comprise a substrate disposed at the housing, wherein the substrate may include a body part, a sensor mounting part extended from the body part to a lateral surface of one side and coupled by the sensor, and a terminal part downwardly extended from the body part, wherein the other lateral surface of body part may be coupled to the housing by being press-fitted thereto.

Preferably, but not necessarily, the lens driving device may include a support member coupled to the housing and the bobbin and having elasticity on at least a portion thereof, wherein the support member may include an outer part coupled to the housing, an inner part coupled to the bobbin, a connection part connecting the outer part and the inner part, and a terminal part extended from the outer part, wherein the terminal part of substrate may be interposed between the support member and the terminal part.

Preferably, but not necessarily, the sensor may be disposed at a corner part of housing.

Preferably, but not necessarily, the housing may include a first lateral part, a first corner part disposed at one side of the first lateral part, and a second corner part disposed at the other side of the first lateral part, wherein the sensor may be disposed at the first corner part, and the driving magnet disposed at the first lateral surface may be disposed nearer to the second corner part than the first corner part.

Preferably, but not necessarily, a portion of upper surface of sensor and a portion of lower surface of sensor may be fixed to the housing, and remaining portion of upper surface of sensor and remaining portion of lower surface of sensor may be opened.

A camera module according to an exemplary embodiment of the present invention may comprise: a PCB disposed with an image sensor; a base disposed at an upper surface of the PCB; a housing disposed at an upper side of base to include a hole; a bobbin accommodated into the hole; a driving magnet disposed at the housing; a coil disposed at the bobbin to face the driving magnet; a sensing magnet disposed at the bobbin; and a sensor disposed at the housing to detect the sensing magnet, wherein an upper surface and a lower surface of sensor may be fixed to the housing and one lateral surface of both lateral surfaces of sensor may be opened.

An optical device according to an exemplary embodiment of the present invention may comprise: a main body; a camera module disposed at the main body to photograph an image of a subject; and a display part disposed at one surface of main body to output an image photographed by the camera module, wherein the camera module may include a PCB mounted with an image sensor, a base disposed at an upper surface of PCB, a housing disposed at an upper side of base to include a hole, a bobbin accommodated into the hole, a driving magnet disposed at the housing, a coil disposed at the bobbin to face the driving magnet, a sensing magnet disposed at the bobbin, and a sensor disposed at the housing to detect the sensing magnet, wherein an upper surface and a lower surface of sensor may be fixed to the housing and one lateral surface at one side in both sides of sensor may be opened.

A lens driving device according to an exemplary embodiment of the present invention may comprise: a housing including a through hole; a bobbin accommodated into the through hole; a driving magnet disposed at the housing; a coil disposed at the bobbin to face the driving magnet; a sensing magnet disposed at the bobbin; and a sensor disposed at the housing to detect the sensing magnet, wherein the sensing magnet may be disposed between the coil and the sensor and an upper surface and a lower surface of sensing magnet may be fixed to the bobbin.

Preferably, but not necessarily, at least one portion of the upper surface of sensing magnet and at least one portion of lower surface of sensing magnet may be fixed to the bobbin by an adhesive.

Preferably, but not necessarily, the bobbin may include an upper support part disposed at an upper side of an upper surface of the sensing magnet, and an upper open hole disposed at the upper support part to expose a portion of the upper surface of sensing magnet to an upper side.

Preferably, but not necessarily, an upper surface of sensing magnet may be fixed to the bobbin by an adhesive infused into the upper open hole.

Preferably, but not necessarily, the bobbin may include a lower support part disposed at a lower side of lower surface of sensing magnet, and a lower open hole disposed at the lower support part to expose a portion of lower surface of sensing magnet to a lower side.

Preferably, but not necessarily, the bobbin may include a lateral support part supporting both lateral surfaces of sensing magnet, wherein the lateral support part may include a support surface facing both lateral surfaces of sensing magnet, a protrusion part gradually more protruding outwardly toward the sensing magnet, and a round part disposed at rounded area where the support surface and an outside of the protrusion part meet.

Preferably, but not necessarily, the bobbin may include a sensing magnet reception groove formed by being inwardly recessed from an outside of bobbin and having a shape corresponding to that of the sensing magnet, and a coil reception groove formed by being inwardly recessed from an outside of bobbin and having a shape corresponding to that of the coil, wherein the coil reception groove may be formed by being more inwardly recessed than the sensing magnet reception groove.

Preferably, but not necessarily, the sensing magnet may be disposed at a corner part of bobbin.

Preferably, but not necessarily, the lens driving device may further comprise a compensation magnet symmetrically formed with the sensing magnet about an optical axis.

Preferably, but not necessarily, the coil may include a first corner part adjacently disposed with the sensing magnet, a third corner part adjacently disposed with the compensation magnet, and second and fourth corner parts interposed between the first corner part and the third corner part, wherein a distance between the first and third corner parts may be shorter than that between the second and fourth corner parts.

Preferably, but not necessarily, an upper end of the sensing magnet may be disposed at a position higher than an upper end of coil, and a lower end of sensing magnet may be disposed at a position lower than a lower end of the coil.

Preferably, but not necessarily, the sensor, the sensing magnet and the coil may be disposed on an imaginary straight line.

A camera module according to an exemplary embodiment of the present invention may comprise: a PCB disposed with an image sensor; a base disposed at an upper surface of the PCB; a housing disposed at an upper side of base to include a through hole; a bobbin accommodated into the through hole; a driving magnet disposed at the housing; a coil disposed at the bobbin to face the driving magnet; a sensing magnet disposed at the bobbin; and a sensor disposed at the housing to detect the sensing magnet, wherein the sensing magnet may be interposed between the coil and the sensor and an upper surface and a lower surface of sensing magnet may be fixed to the bobbin.

An optical device according to an exemplary embodiment of the present invention may comprise: a main body; a camera module disposed at the main body to photograph an image of a subject; and a display part disposed at one surface of main body to output an image photographed by the camera module, wherein the camera module may include a PCB mounted with an image sensor, a base disposed at an upper surface of PCB, a housing disposed at an upper side of base to include a through hole, a bobbin accommodated into the through hole, a driving magnet disposed at the housing, a coil disposed at the bobbin to face the driving magnet, a sensing magnet disposed at the bobbin, and a sensor disposed at the housing to detect the sensing magnet, wherein the sensing magnet may be interposed between the coil and the sensor and an upper surface and a lower surface of sensing magnet may be fixed to the bobbin.

A lens driving device according to an exemplary embodiment of the present invention may comprise: a housing; a bobbin disposed at an inside of the housing; a coil disposed at the bobbin; a first magnet disposed at the housing to face the coil; a support member coupled with the housing and the bobbin; a substrate coupled with the housing; and a sensor coupled with the substrate, wherein the support member may include first and second support units, each spaced apart from the other, and each of the first and second support units may include an outside part coupled with the housing, an inner part coupled with the bobbin, a connection part connecting the outer part and the inner part, and a terminal part downwardly extended from the outer part, and an inner part of first support unit and an inner part of second support unit may be electrically connected to a coil, an outer part of first support unit and an outer part of second support unit may be symmetrical based on an optical axis, and a portion of substrate may be interposed between a terminal part of first support unit and a terminal part of second support unit.

Preferably, but not necessarily, the terminal part of first support unit and the terminal part of second support unit may be symmetrical based on an imaginary surface including the optical axis.

Preferably, but not necessarily, the inner part of first support unit and the inner part of second support unit may be symmetrical based on an imaginary surface including the optical axis, and the connection part of first support unit and the connection unit of second support unit may be asymmetrical based on an imaginary surface including the optical axis.

Preferably, but not necessarily, the lens driving device may further comprise a second magnet disposed at the bobbin, wherein the sensor may be disposed at a corner part of housing when viewed from an upper side to thereby support movement of second magnet.

Preferably, but not necessarily, the lens driving device may further comprise a third magnet disposed at the bobbin, wherein the third magnet may be disposed at a position symmetrical with the second magnet based on an optical axis.

Preferably, but not necessarily, the housing may further include a first lateral surface, a second lateral surface adjacent to the first lateral surface, a third lateral surface adjacent to the second lateral surface, and a fourth lateral surface adjacent to the third and first lateral surfaces, wherein the first magnet may include a first magnet part disposed at the first lateral surface, a second magnet part disposed at the second lateral surface, a third magnet part disposed at the third lateral surface, and a fourth magnet part disposed at the fourth lateral surface.

Preferably, but not necessarily, the housing may include a first corner part interposed between the first lateral surface and the second lateral surface and a second corner part interposed between the second lateral surface and the third lateral surface, wherein the first magnet may be disposed to be more adjacent to the second corner part than the first corner part.

Preferably, but not necessarily, the lens driving device may further comprise a base disposed at a lower side of housing, wherein the base may include a first reception part inwardly recessed from an external lateral surface, and a second reception part more inwardly recessed from the external lateral surface than the first reception part, and at least one portion of terminal part may be disposed at the first reception part, and at least one portion of substrate may be disposed at the second reception part.

Preferably, but not necessarily, the first reception part may be disposed at both sides of second reception part.

Preferably, but not necessarily, the lens driving part may further comprise a base disposed at a lower side of housing, where at least one portion of substrate and at least one portion of terminal part may be extended along a lateral surface of one side of base, and wherein the substrate may include first to fourth terminals, each mutually spaced apart, and wherein the first to fourth terminals may be interposed between a terminal part of first support unit and a terminal part of second support unit.

A camera module according to an exemplary embodiment of the present invention may comprise: a PCB mounted with an image sensor; a lens module disposed at an upper side of image sensor; a housing disposed at an upper side of PCB; a bobbin disposed at an inside of housing to accommodate the lens module; a coil disposed at the bobbin; a first magnet disposed at the housing to face the coil; a support member coupled with the housing and the bobbin; a substrate coupled with the housing; and a sensor coupled with the substrate, wherein the support member may include first and second support units each mutually spaced apart, and each of the first and second support units may include an external part coupled with the housing, an internal part coupled with the bobbin, a connection part connecting the external part and the internal part, and a terminal part downwardly extended from the external part, and an inner lateral part of first support unit and an inner lateral part of second support unit may be respectively and electrically connected to the coil, and an outer lateral part of first support unit and an outer lateral part of first support unit may be symmetrical based on an optical axis, and a portion of the substrate may be interposed between a terminal part of the first support unit and a terminal part of second support unit.

An optical device according to an exemplary embodiment of the present invention may comprise; a camera module; and a display part to output an image photographed by the camera module, wherein the camera module may include: a PCB mounted with an image sensor; a lens module disposed at an upper side of image sensor; a housing disposed at an upper side of PCB; a bobbin disposed at an inside of housing to accommodate the lens module; a coil disposed at the bobbin; a first magnet disposed at the housing to face the coil; a support member coupled with the housing and the bobbin; a substrate coupled with the housing; and a sensor coupled with the substrate, wherein the support member may include first and second support units each mutually spaced apart, and each of the first and second support units may include an external part coupled with the housing, an internal part coupled with the bobbin, a connection part connecting the external part and the internal part, and a terminal part downwardly extended from the external part, and an inner lateral part of first support unit and an inner lateral part of second support unit may be respectively and electrically connected to the coil, and an outer lateral part of first support unit and an outer lateral part of first support unit may be symmetrical based on an optical axis, and a portion of the substrate may be interposed between a terminal part of the first support unit and a terminal part of second support unit.

A lens driving device according to an exemplary embodiment of the present invention may comprise: a housing; a bobbin disposed at an inside of the housing; a coil disposed at the bobbin; a first magnet disposed at the housing to face the coil; a support member coupled with the housing and the bobbin; a substrate coupled with the housing; and a sensor coupled with the substrate, wherein the support member may include first and second support units, each mutually spaced apart from the other, the substrate may include a terminal electrically connected to the support member, and each of the first and second support units may include an external lateral part coupled with the housing, an internal lateral part coupled with the bobbin, a connection part connecting the external lateral part and the internal lateral part, and one portion of external lateral part may include a coupling part extended to a position corresponding to that of the substrate, and the terminal of substrate and the coupling part of external lateral part may be electrically connected, and an area of terminal at the substrate may be such that an area of a lower surface at the coupling part may be greater than an area of an upper surface at the coupling part based on the coupling part.

Preferably, but not necessarily, the coupling part may include an extension part extended from the external lateral part, and a pad part having a width wider than that of the extension part at a position corresponding to that of the terminal of substrate.

Preferably, but not necessarily, the coupling part may be extended more than a distal end of the internal lateral part.

Preferably, but not necessarily, the external lateral part of first support unit and the coupling part may be symmetrical with the external lateral part of second support unit and the coupling part based on an imaginary surface including an optical axis.

Preferably, but not necessarily, the external lateral part of first support unit and the coupling part may be asymmetrical with the external lateral part of second support unit and the coupling part based on an optical axis.

Preferably, but not necessarily, the terminal of substrate may include a first pad coupled with the coupling part of first support unit, a second pad spaced apart from the first pad and coupled with the coupling part of second support unit, and the first pad and the second pad may be disposed within a first area integrally formed on the substrate.

Preferably, but not necessarily, the lens driving device may further comprise a second magnet disposed at the bobbin, and the sensor may detect movement of second magnet, and the sensor may be electrically connected with the substrate, and a conductive line electrically connected to the sensor may not pass through the first area at the substrate.

Preferably, but not necessarily, the substrate may be disposed at an inside of the support member, and the terminal may be disposed at an internal lateral surface of substrate to be electrically connected to the support member.

Preferably, but not necessarily, the substrate may be disposed at an outside of support member, and the terminal may be disposed at an external lateral surface of substrate to be electrically connected to the support member, and the substrate may further include a through hole adjacently formed with the terminal.

Preferably, but not necessarily, the terminal of substrate may be disposed only at a lower surface of coupling part.

A lens driving device according to another exemplary embodiment of present invention may comprise: a housing; a bobbin disposed at an inside of the housing; a coil disposed at the bobbin; a first magnet disposed at the housing to face the coil; a support member coupled with the housing and the bobbin; a substrate coupled with the housing; and a sensor coupled with the substrate, wherein the support member may include first and second support units, each mutually spaced apart from the other, the substrate may include a terminal electrically connected to the support member, and each of the first and second support units may include an external lateral part coupled with the housing, an internal lateral part coupled with the bobbin, a connection part connecting the external lateral part and the internal lateral part, and one portion of external lateral part may include a coupling part extended to a position corresponding to that of the substrate, and the terminal of substrate and the coupling part of external lateral part may be electrically connected, and an area of terminal at the substrate may be such that an area of a lower surface at the coupling part may be greater than an area of an upper surface at the coupling part based on the coupling part.

A lens driving device according to still another exemplary embodiment of present invention may comprise: a housing; a bobbin disposed at an inside of the housing; a coil disposed at the bobbin; a first magnet disposed at the housing to face the coil; a support member coupled with the housing and the bobbin; a substrate coupled with the housing; and a sensor coupled with the substrate, wherein the support member may include first and second support units, each mutually spaced apart from the other, the substrate may include a terminal electrically connected to the support member, and each of the first and second support units may include an external lateral part coupled with the housing, an internal lateral part coupled with the bobbin, a connection part connecting the external lateral part and the internal lateral part, and one portion of external lateral part may include a coupling part extended to a position corresponding to that of the substrate, and the terminal of substrate and the coupling part of external lateral part may be electrically connected, and an area of terminal at the substrate may be same as an area of an upper surface of coupling part and same as an area of a lower surface of coupling part.

A camera module according to an exemplary embodiment of the present invention may comprise: a PCB mounted with an image sensor; a housing disposed at an upper side of PCB; a bobbin disposed at an inside of the housing; a coil disposed at the bobbin; a first magnet disposed at the housing to face the coil; a support member coupled with the housing and the bobbin; a substrate coupled with the housing; and a sensor coupled with the substrate, wherein the support member may include first and second support units each mutually spaced apart, and the substrate may include a terminal electrically connected to the support member, each of the first and second support units may include an external part coupled with the housing, an internal part coupled with the bobbin, a connection part connecting the external part and the internal part, and one portion of external part may include a coupling part extended to a position corresponding to that of the terminal of substrate, and the terminal of substrate and the coupling part of external part may be electrically connected, and an area of terminal at the substrate may be such that an area of a lower surface of coupling part may be greater than that of an upper surface of coupling part based on the coupling part.

An optical device according to an exemplary embodiment of the present invention may comprise; a camera module photographing a subject; and a display part to output an image photographed by the camera module, wherein the camera module may include: a PCB mounted with an image sensor; a housing disposed at an upper side of PCB; a bobbin disposed at an inside of housing; a coil disposed at the bobbin; a first magnet disposed at the housing to face the coil; a support member coupled with the housing and the bobbin; a substrate coupled with the housing; and a sensor coupled with the substrate, wherein the support member may include first and second support units each mutually spaced apart, and the substrate may include a terminal electrically connected to the support member, each of the first and second support units may include an external part coupled with the housing, an internal part coupled with the bobbin, a connection part connecting the external part and the internal part, and one portion of external part may include a coupling part extended to a position corresponding to that of the terminal of substrate, and the terminal of substrate and the coupling part of external part may be electrically connected, and an area of terminal at the substrate may be such that an area of a lower surface of coupling part may be greater than that of an upper surface of coupling part based on the coupling part.

A lens driving device according to an exemplary embodiment of present invention may comprise: a bobbin accommodating a lens; a coil disposed at the bobbin; a housing accommodated into an inside of bobbin; a magnet disposed at the housing to move the bobbin in response to interaction with the coil; and an elastic member including an inner frame coupled with the bobbin, an external frame coupled with the housing, and a connection part connecting the inner frame and the external frame; and a damper member interposed between the connection part and the bobbin, wherein a peak of a first resonance frequency at a first frequency response characteristic relative to a peak of ratio between an input signal applied to the coil and displacement of bobbin may be lower as much as 10 [dB]~20 [dB] than a reference peak, wherein the reference peak may be a peak of first resonance frequency at a second frequency response characteristic relative to a peak of ratio between an input signal applied to the coil when there is no damper member and a displacement of bobbin.

Preferably, but not necessarily, a first peak at the first reference frequency may be lower as much as 3 [dB]~6 [dB] than a second peak at the second reference frequency, the first reference frequency may be a frequency lower as much as a preset frequency difference of the first resonance frequency at the first frequency response characteristic, and the second reference frequency may be a frequency lower as much the preset frequency difference of first resonance frequency at the second frequency response characteristic.

Preferably, but not necessarily, the preset frequency difference may be 40 [dB]~70 [dB].

Preferably, but not necessarily, the first resonance frequency at the first frequency response characteristic may be 50 [dB]~170 [dB].

Preferably, but not necessarily, the first resonance frequency at the first frequency response characteristic may be higher by as much as 5 [dB]~10 [dB] than the first resonance frequency at the second frequency response characteristic.

Preferably, but not necessarily, the bobbin may be formed with a protrusion, and the connection part of elastic member may include a plurality of bent parts, and any one selected from the plurality of bent parts may be so disposed as to wrap a lateral surface of the protrusion, and a damper member may be interposed between the lateral surface of protrusion and the any one selected from the plurality of bent parts.

Preferably, but not necessarily, a first bent part may be disposed at a center of the plurality of bent parts.

Preferably, but not necessarily, the connection part may include first bent parts convex to a housing direction from the bobbin, and second bent parts disposed between adjacent first bent parts, and the bent member may be disposed among any one of the first bent parts, any of a lateral surface of protrusion or any one of the second bent parts and a lateral surface of the protrusion.

Preferably, but not necessarily, the elastic member may include an upper elastic member including a first inner frame coupled with the bobbin, a first external frame coupled with the housing, and a first connection part connecting the first inner frame and the external frame, and a lower elastic member including a second inner frame coupled with the bobbin, a second external frame coupled with the housing, and a second connection part connecting the second inner frame and the second external frame, wherein the damper member may include a first damper member interposed between the first connection part and an upper surface of bobbin, and a second damper member interposed between the second connection part and a lower surface of bobbin.

Preferably, but not necessarily, the bobbin may include a first protrusion provided at an upper surface, and a second protrusion provided at a lower surface, and the first damper member may be interposed between the first connection part and a lateral surface of first protrusion, and the second damper member may be interposed between the second connection part and the second protrusion.

Preferably, but not necessarily, each of the first and second connection parts may include a plurality of bent parts, and the first damper member may be interposed between a bent part disposed at a center among the plurality of bent parts of the first connection part and a lateral surface of the first protrusion, and the second damper member may be interposed between a bent part disposed at a center among the plurality of bents of the second connection part and a lateral surface of second protrusion.

Preferably, but not necessarily, the magnet may include two driving magnets disposed at a lateral surface of housing to allow facing each other.

A camera module according to an exemplary embodiment of the present invention may comprise: a lens barrel; a lens driving device moving the lens barrel according to an exemplary embodiment; and an image sensor converting an image incident through the lens driving device to an electric signal.

An optical device according to an exemplary embodiment may comprise: a display module including a plurality of pixels changing in color in response to an electric signal; a camera module according to an exemplary embodiment; a display module; and a controller controlling the operation of the camera module.

Advantageous Effects

Through the exemplary embodiments, a sensor's optical axis direction position can be constantly maintained, even if amount of adhesive coated between a sensor and a housing is inconsistent for each product in the manufacturing process.

Furthermore, a sensor can be assembled at a fixed regular position at all times by a horizontal guide when the sensor is inserted in a housing.

Still furthermore, a sensor's optical axis direction position can be constantly maintained even if amount of adhesive coated between a sensing magnet and a bobbin is inconsistent for each product in the manufacturing process.

Still furthermore, an output level can be increased that is detected by a sensor as a distance between a sensing magnet and a sensor is nearing.

Through the exemplary embodiments, an AF (Auto Focus) resistance can be decreased over a driving coil conductive pad being disposed on a substrate, and productivity can be increased through improvement in workability and peak. Thus, reliability can be secured.

Furthermore, soldering between a terminal part of lower support member and a PCB has an excellent advantage according to the present exemplary embodiment.

Furthermore, a reduced number of conductive lines to be formed on a substrate enable optimization of pattern design within a limited space.

Through the exemplary embodiments, soldering with a support member can have an advantageous effect using an area and a position with a pad part formed on a substrate, whereby reliability can be secured.

Still furthermore, a pad part is disposed at a center side of substrate to enable optimization in pattern design of substrate, whereby resistance generated from the substrate can be reduced.

The vibration on a mover caused by vibration of a vibration motor in a mobile phone or by outside shock can be restricted to thereby prevent the resolution from being deteriorated that is caused by vibration on the mover.

BRIEF DESCRIPTION OF DRAWINGS

FIGS. 32 to 49 are illustrations of third exemplary embodiment of the present invention.

FIG. 1 is a perspective view of a lens driving device according to an exemplary embodiment of the present invention.

FIG. 2 is an exploded perspective view illustrating a lens driving device according to an exemplary embodiment of present invention.

FIG. 3 is a cross-sectional view taken along line A-A' of FIG. 1.

FIG. 4 is a partially enlarged cross-sectional view illustrating a portion of FIG. 3.

FIG. 5 is a perspective view illustrating a housing of a lens driving device according to an exemplary embodiment of the present invention.

FIG. 6 is a perspective view illustrating a coupled state between a housing of a lens driving device and a substrate according to an exemplary embodiment of the present invention.

FIG. 7 is a bottom perspective view illustrating a coupled state between a housing of a lens driving device and a substrate according to an exemplary embodiment of the present invention.

FIG. 8 is a perspective view illustrating a coupled state between a housing of a lens driving device and a sensor, and a coupled state between a sensing magnet and a bobbin according to an exemplary embodiment of the present invention while omitting some portions of housing and bobbin.

FIG. 9 is an exploded perspective view of a bobbin, a sensing magnet and a compensation magnet of a lens driving device according to an exemplary embodiment of present invention.

FIG. 10 is a perspective view of a driving coil in a lens driving device according to an exemplary embodiment of present invention.

FIG. 11 is a perspective view illustrating a coupled state between a sensing magnet of lens driving device and a bobbin according to an exemplary embodiment of the present invention.

FIG. 12 is a perspective view illustrating a coupled state among a sensing magnet of lens driving device, a driving coil and a bobbin according to an exemplary embodiment of the present invention.

FIG. 13 is a plane view illustrating a coupled state between a sensing magnet of lens driving device and a bobbin according to an exemplary embodiment of the present invention.

FIG. 14 is a bottom view illustrating a coupled state between a sensing magnet of lens driving device and a bobbin according to an exemplary embodiment of the present invention.

FIG. 15 is an exploded perspective view of a support member in a lens driving device according to an exemplary embodiment of present invention.

FIG. 16 is a lateral view illustrating a lens driving device according to an exemplary embodiment of present invention, while omitting some portions of the lens driving device.

FIG. 17 is a perspective view illustrating a lower support member of a lens driving device according to an exemplary embodiment of present invention.

FIG. 18 is a perspective view illustrating a base of a lens driving device according to an exemplary embodiment of present invention.

FIG. 19 is a perspective view illustrating a lens driving device according to a first exemplary embodiment of present invention.

FIG. 20 is an exploded perspective view illustrating a lens driving device according to a first exemplary embodiment of present invention.

FIG. 21 is a perspective view illustrating a housing of a lens driving device according to an exemplary embodiment of present invention.

FIG. 22 is a perspective view illustrating a coupled state between a housing of a lens driving device and a substrate according to a first exemplary embodiment of the present invention.

FIG. 23 is a bottom perspective view illustrating a coupled state between a housing of a lens driving device and a substrate according to a first exemplary embodiment of the present invention.

FIG. 24 is a cross-sectional view taken along line A-A of FIG. 1.

FIG. 25 is a plane view illustrating some elements of a lens driving device according to a first exemplary embodiment of present invention.

FIG. 26 is a perspective view illustrating a lower support member of a lens driving device according to a first exemplary embodiment of the present invention.

FIG. 27 is a bottom perspective view illustrating a coupled state between a lower support member of a lens driving device and a substrate according to a first exemplary embodiment of the present invention.

FIG. 28 is a bottom perspective view illustrating some elements of a lens driving device according to a first exemplary embodiment of present invention.

FIG. 29 is a bottom perspective view illustrating some elements of a lens driving device according to a second exemplary embodiment of present invention.

FIG. 30 is a bottom perspective view illustrating some elements of a lens driving device according to a third exemplary embodiment of present invention.

FIG. 31 is a bottom perspective view illustrating some elements of a lens driving device according to a fourth exemplary embodiment of present invention.

FIG. 32 is an exploded perspective view of a lens driving device according to an exemplary embodiment of present invention.

FIG. 33 is a coupled perspective view of a lens driving device except for a cover member of FIG. 32.

FIG. 34 is a first coupled perspective view of between a bobbin and a coil illustrated in FIG. 32.

FIG. 35 is a second coupled perspective view of between a bobbin and a coil illustrated in FIG. 32.

FIG. 36 is a coupled perspective view of between a housing and a circuit substrate illustrated in FIG. 32.

FIG. 37 is a plane view of an upper elastic member illustrated in FIG. 32.

FIG. 38 is a plane view of a lower elastic member illustrated in FIG. 32.

FIG. 39 is a schematic view illustrating a first damper member interposed between a connection part of upper elastic member and a bobbin.

FIG. 41 is a schematic view of bent parts and first damper member according to another exemplary embodiment of present invention.

FIG. 42 is a schematic view of second damper member according to an exemplary embodiment of present invention.

FIG. 44 is a schematic view of first damper members according to another exemplary embodiment of present invention.

FIG. 46b is a displacement of a mover according to a time in case of FIG. 45a.

FIG. 47 is an exploded perspective view of a camera module according to an exemplary embodiment of present invention.

FIG. 48 is a perspective view of a portable terminal according to an exemplary embodiment of present invention.

FIG. 49 is a block diagram of a portable terminal illustrated in FIG. 48.

BEST MODE

Figure 1:
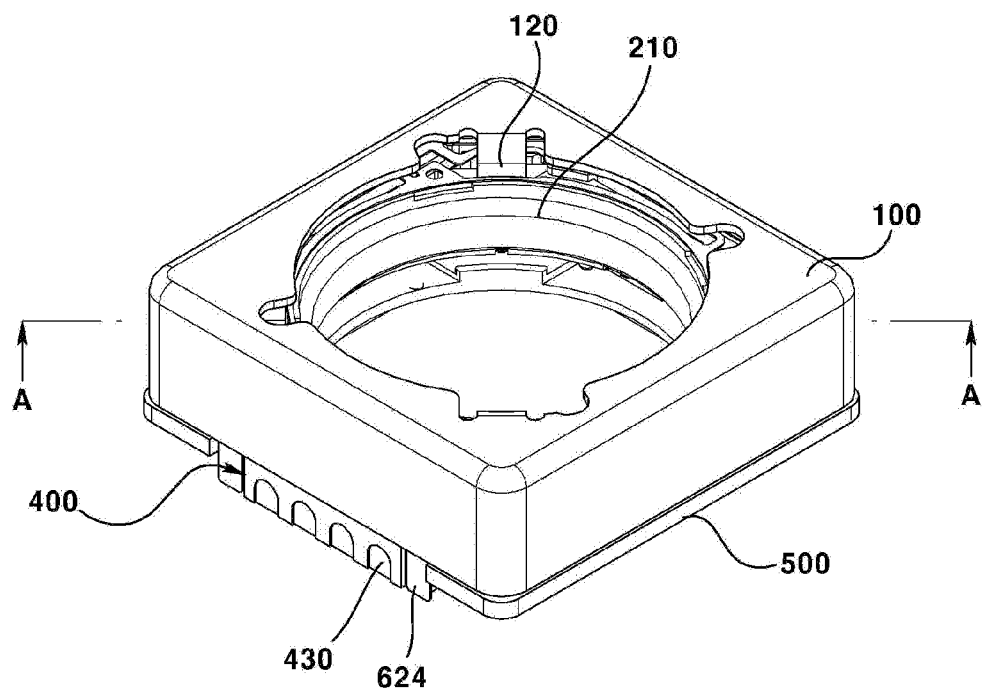
FIGS. 1 to 18 are illustrations of first exemplary embodiment of the present invention.

Some exemplary embodiments of present invention will be described in detail with reference to the accompanying drawings. In describing a reference numeral for each element, a same reference numeral will be designated, if possible, for the same element, albeit being differently indicated on other drawings. Furthermore, a detailed explanation of some elements will be omitted in explaining exemplary embodiments of the present invention if obstructed in the understanding of exemplary embodiment of present invention.

In describing elements in the exemplary embodiments of the present invention, the terms, first, second, A, B (a), (b), etc., may be used. These terms may be used only to distinguish one element from another element, and the nature, order or sequence is not restricted by these terms.

When an element is referred to as being "accessed to", "coupled to," or "connected to," another element, it should be appreciated that the element may be directly accessed, connected or coupled to the other element, or intervening elements may be present therebetween.

The optical axis direction used hereinunder is defined as an optical axis direction of a lens module coupled to a lens driving device. Meantime, the "optical axis direction" may be interchangeably used with a vertical direction and a z axis direction.

The 'auto focus function' used hereinafter may be defined as a function of adjusting a focus relative to a subject by adjusting a distance to an image sensor through movement of lens module to an optical axis direction in response to a distance to the subject. Meantime, an 'auto focus' may be interchangeably used with an 'AF (Auto Focus)'.

The "handshake correction function" hereinafter used may be defined as a function to move or tilt a lens module to a direction perpendicular to an optical axis direction in order to offset vibration (movement) generated from an image sensor by an outside force. Meantime, the "handshake correction" may be interchangeably used with an "OIS (Optical Image Stabilization)".

Hereinafter, any one of a 'driving magnet (320)' and a 'sensing magnet (710)' and a 'compensation magnet (730)' may be called a 'first magnet', a remaining another may be called a 'second driving part', and a remaining still another may be called a 'third magnet'.

FIGS. 1 to 18 are illustrations of first exemplary embodiment of the present invention.

Hereinafter, configuration of an optical device according to an exemplary embodiment will be described.

The optical device according to an exemplary embodiment of the present invention may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may include any device capable of photographing an image or a photograph.

The optical device according to an exemplary embodiment may include a main body (not shown), a camera module and a display part (not shown). However, any one or more of the elements in main body, the camera module and the display part may be omitted or changed from the optical device.

The main body may form an external shape of an optical device. The main body may include a cubic shape, for example. However, the present invention is not limited thereto. As a modification, the main body may be partially rounded. The main body may accommodate a camera module. One surface of a main body may be disposed with a display part.

The camera module may be disposed on the main body. The camera module may be disposed at one surface of main body. At least one portion of camera module may be accommodated into the main body. The camera module may photograph an image of a subject.

The display part may be disposed on the main body. The display part may be disposed at one surface of main body. That is, the display part may be disposed on a same surface as that of camera module. Alternatively, the display part may be disposed at the other surface of main body. The display part may be disposed on a surface disposed at an opposite surface of a surface disposed with the camera module. The display part may output an image photographed by the image sensor.

Hereinafter, configuration of a camera module according to an exemplary embodiment of the present invention will be described.

A camera module may include a lens driving device, a lens module (not shown), an IR (Infrared) filter (not shown), a PCB (Printed Circuit Board, not shown), and an image sensor (not shown), and may further include a controller (not shown). However, any one or more of the lens driving device, the lens module the IR filter, the PCB, the image sensor and the controller may be omitted or changed from the configuration of camera module.

The lens module may include one or more lenses (not shown). The lens module may include a lens and a lens barrel (not shown). However, one element of lens module is limited by the lens module, and any holder structure capable of supporting one or more lenses will suffice. The lens module may move along with a portion of the lens driving device by being coupled to the lens driving device. The lens module may be coupled to an inner side of a lens driving device. The lens module may be screw-coupled to a lens driving device. The lens module may be coupled with a lens driving device by an adhesive (not shown). Meantime, a light having passed the lens module may be irradiated on an image sensor.

The infrared filter may be disposed at a groove (510) of a base (500). Alternatively, the infrared filter may be disposed at a holder member (not shown) separately formed on the base (500). The infrared filter may serve to prevent a light of infrared ray region from entering the image sensor. The infrared filter may be an infrared absorption filter (blue filter). The infrared filter may include an infrared cut-off filter. The infrared filter may be interposed between a lens module and an image sensor. The infrared filter may be formed with a film material or a glass material. The infrared filter may be formed by allowing an infrared cut-off coating material to be coated on a plate-shaped optical filter such as an imaging plane protection cover glass or a cover glass. However, the present invention is not limited thereto.

The PCB may be disposed at a lower side of lens driving device. The PCB may support the lens driving device. The PCB may be mounted with an image sensor. The PCB may be disposed at an inner upper side with an image sensor and may be disposed at an outer upper side with a sensor holder (not shown), for example. An upper side of sensor holder may be disposed with a lens driving device. Alternatively, the PCB may be disposed at an upper outer side with a lens driving device, and may be disposed at an inner upper side with an image sensor. Through the structure described as above, a light having passed the lens module accommodated at an inner side of the lens driving device may be irradiated on the image sensor mounted on the PCB. The PCB may supply a power to the lens driving device. Meantime, the PCB may be disposed with a controller to control the lens driving device.

The image sensor may be mounted on the PCB. The image sensor may be so disposed as to match the lens module by way of optical axis, through which the image sensor can obtain a light having passed the lens module. The image sensor may output the irradiated light in an image. The image sensor may be, for example, a CCD (charge coupled device), a MOS (metal oxide semi-conductor), a CPD and a CID. However, the types of image sensors are not limited thereto.

The controller may be mounted on a PCB. The controller may individually control a direction, intensity and an amplitude of a current supplied to each element forming the lens driving device. The controller may perform an auto focus function of a camera module by controlling the lens driving device. That is, the controller may move a lens module to an optical axis direction by controlling the lens driving device. Furthermore, the controller may perform a feedback control of the auto focus function. To be more specific, the controller may provide a more accurate auto focus function by controlling a current or a power supplied to a driving coil part (220) by receiving a position of lens module detected by a sensor (720).

Hereinafter, configuration of lens driving device according to an exemplary embodiment of present invention will be described with reference to the accompanying drawings.

Figure 2:
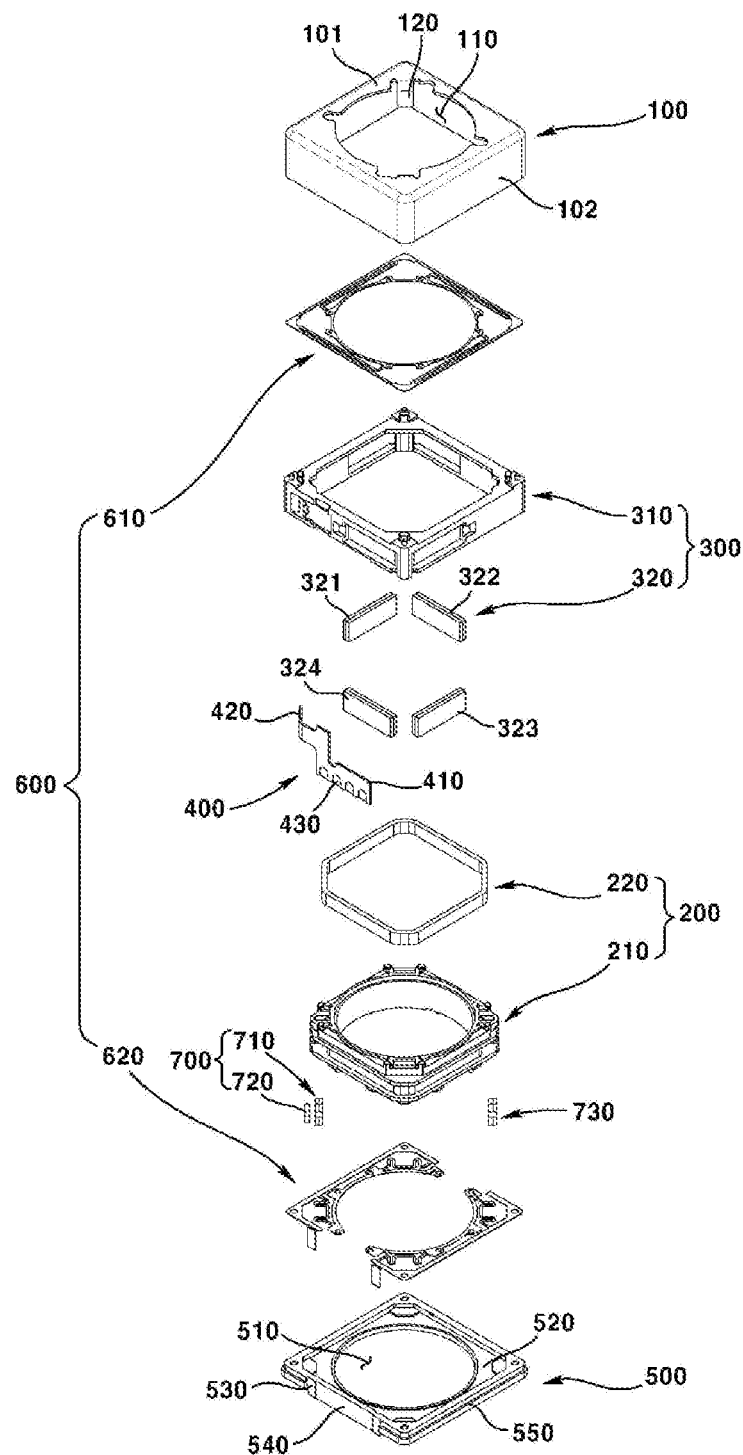
Figure 3:
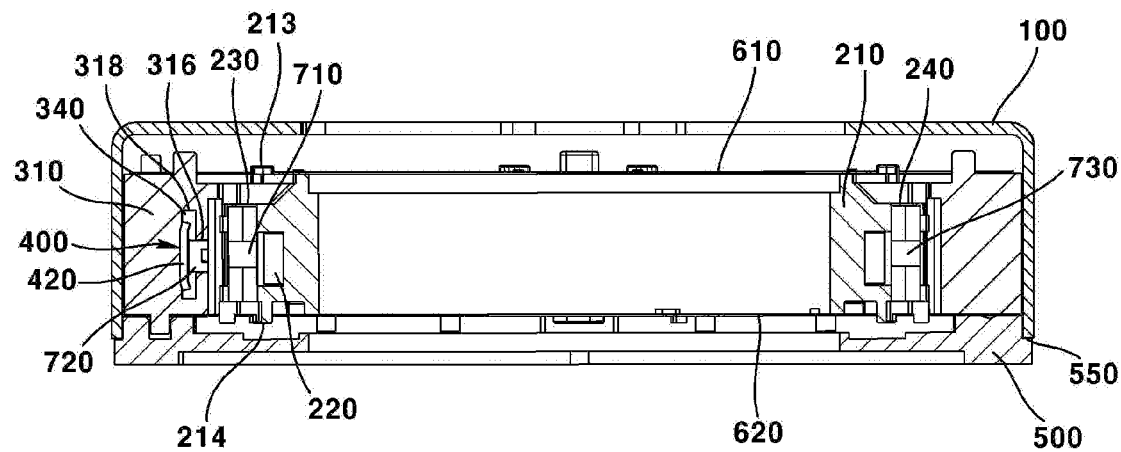
Figure 4:
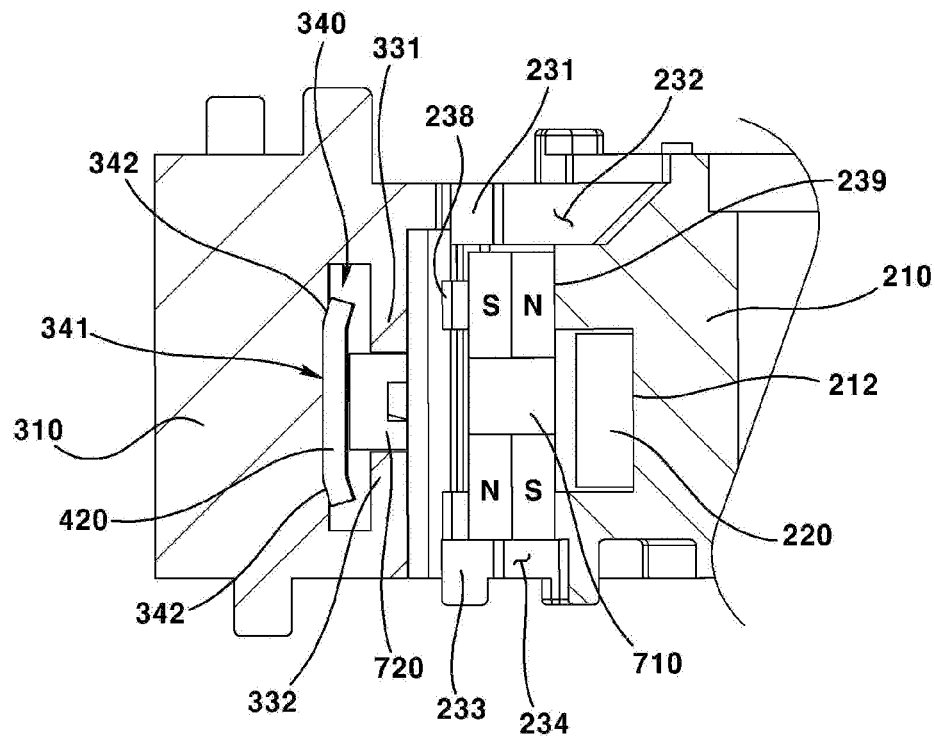
Figure 5:
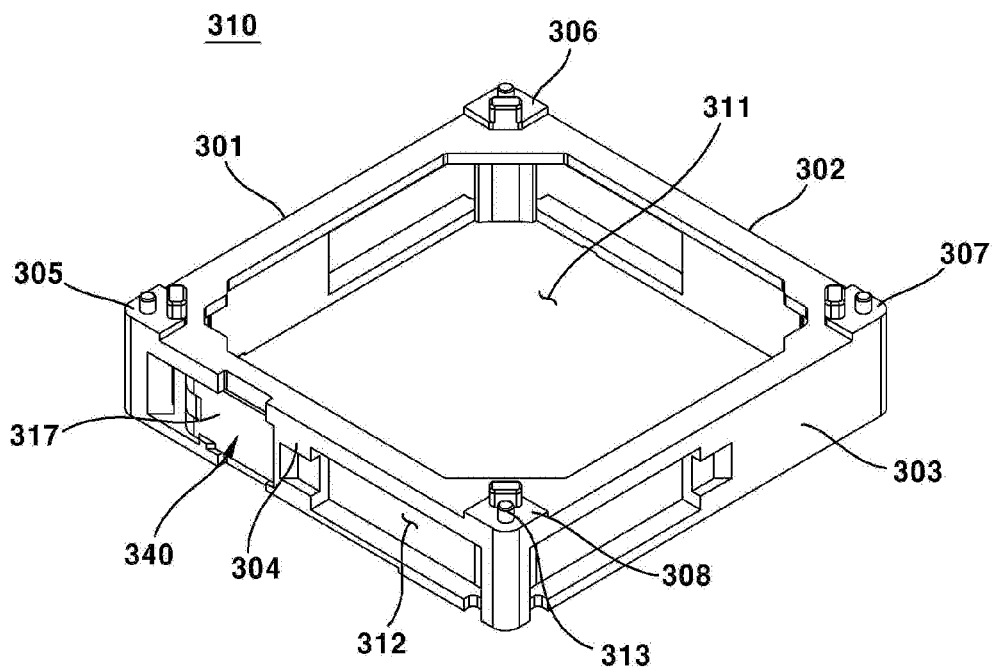
Figure 6:
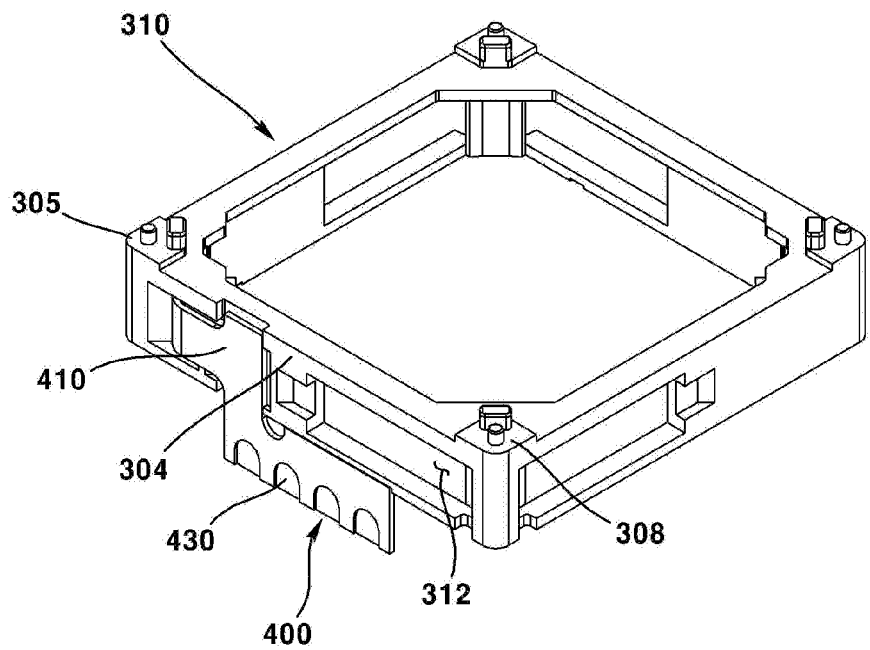
Figure 7:
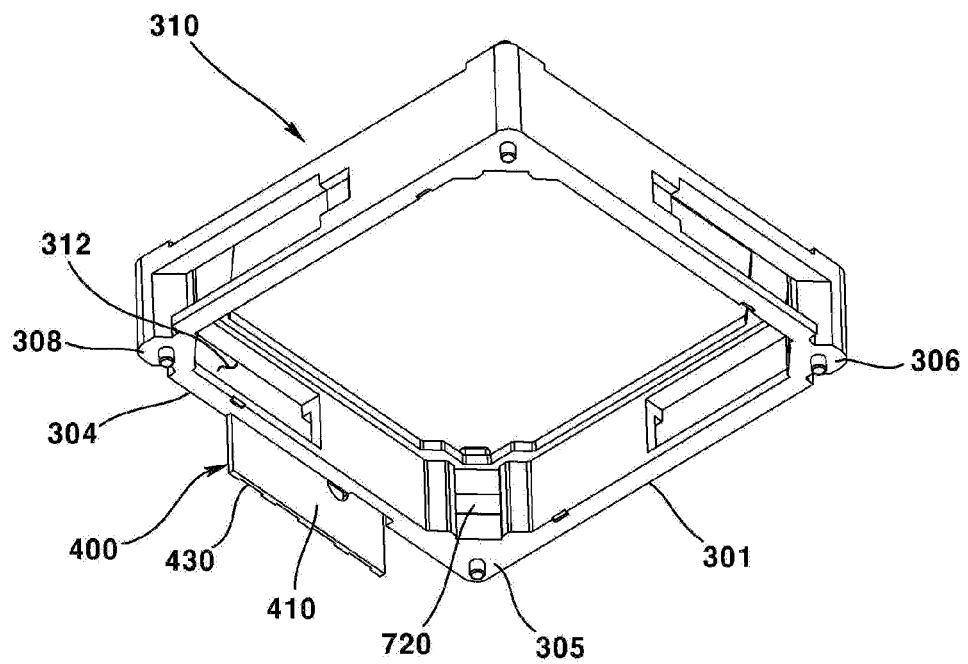
Figure 8:
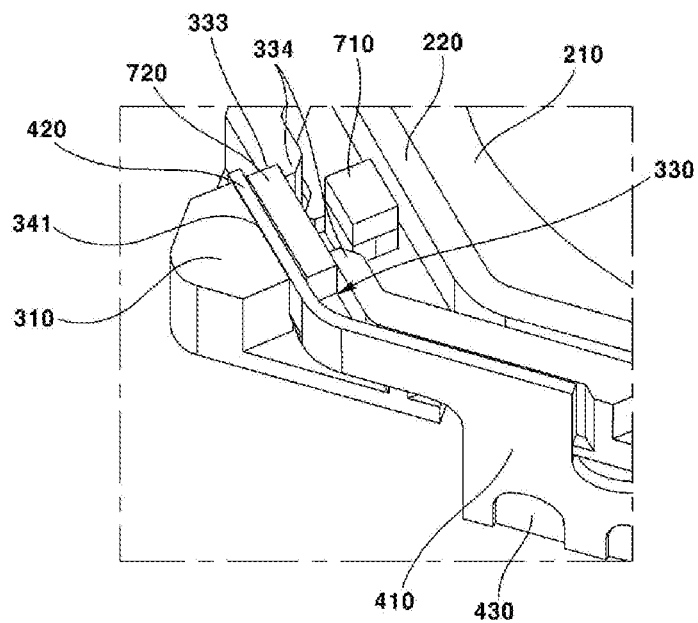
Figure 9:
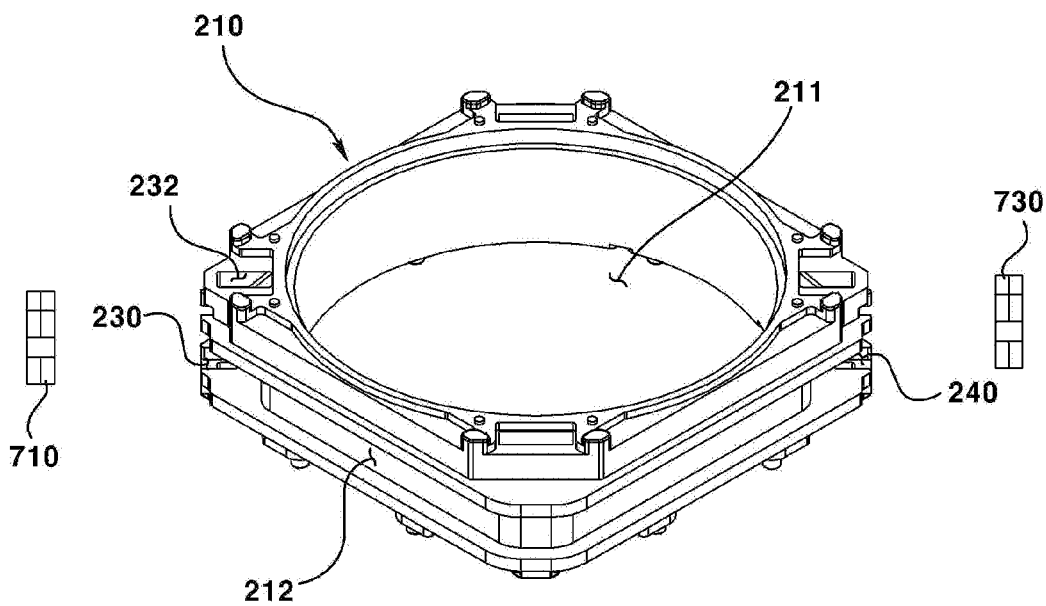
Figure 10:
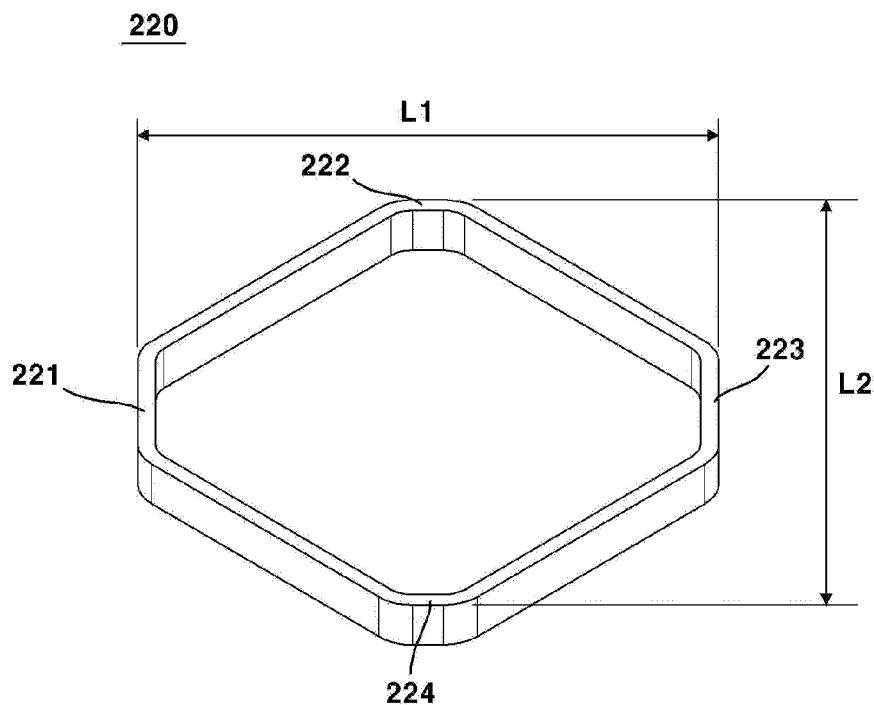
Figure 11:
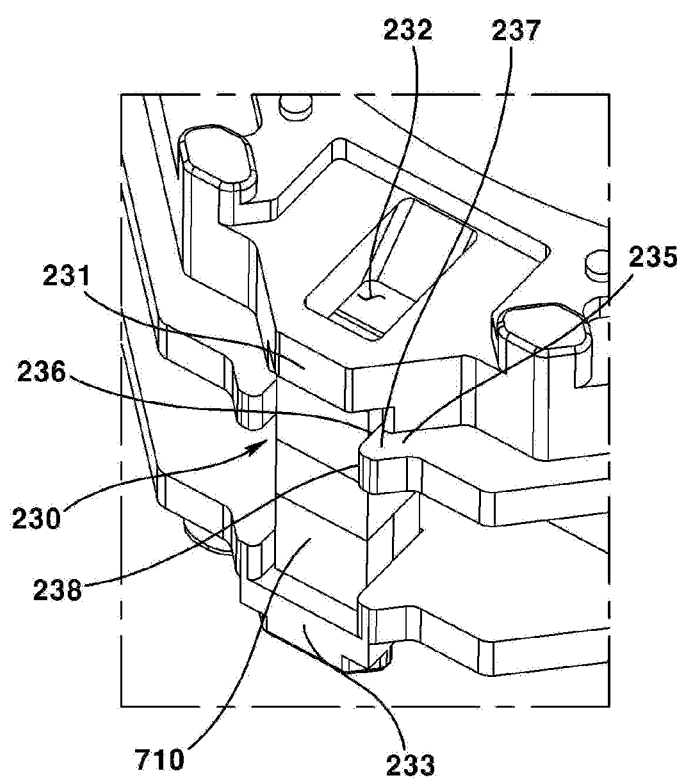
Figure 12:
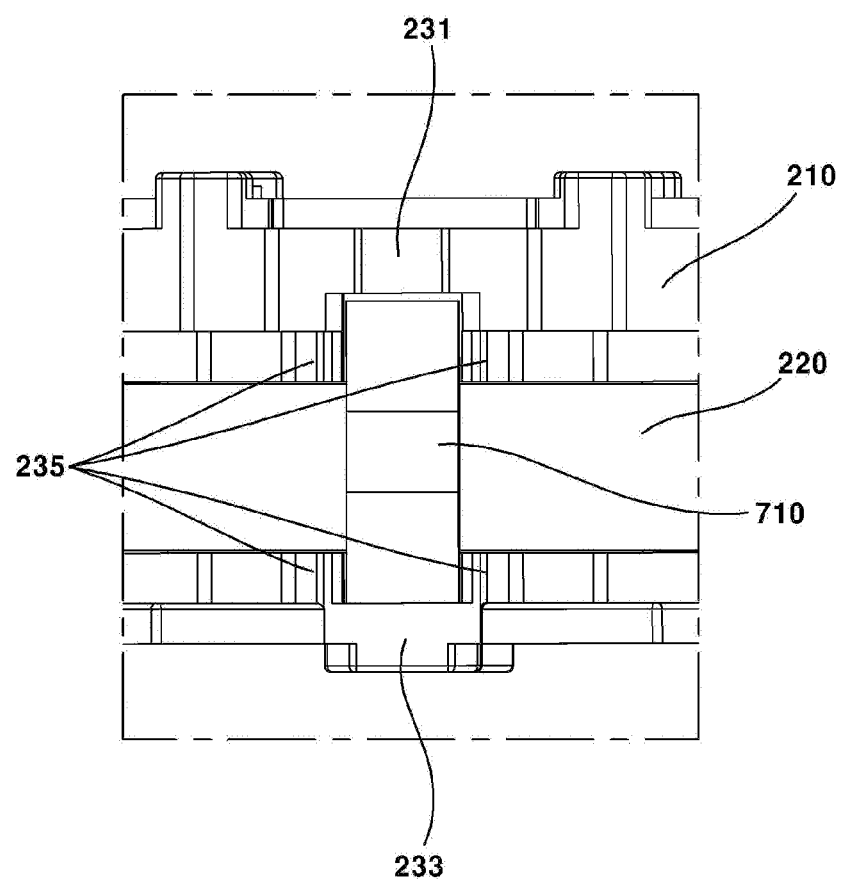
Figure 13:
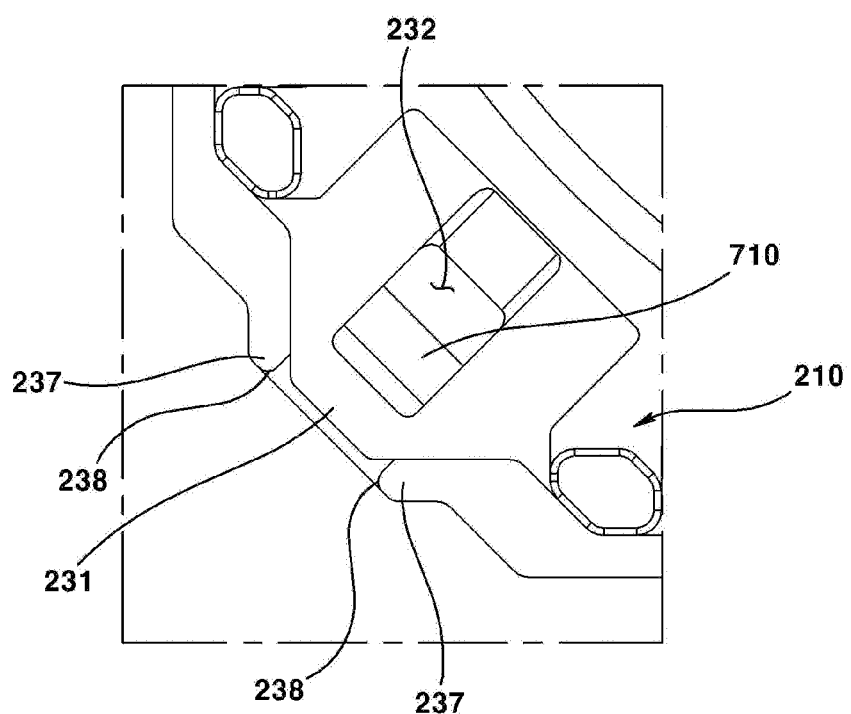
Figure 14:
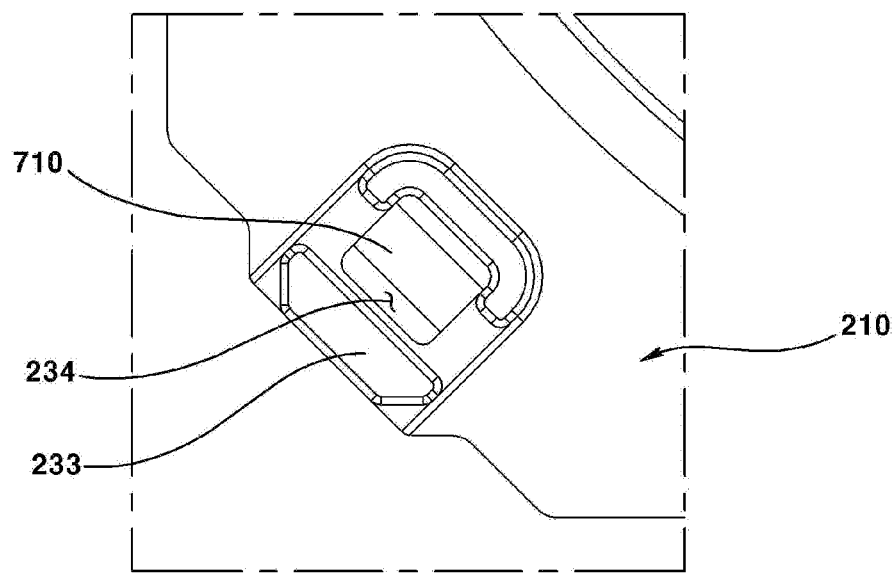
Figure 15:
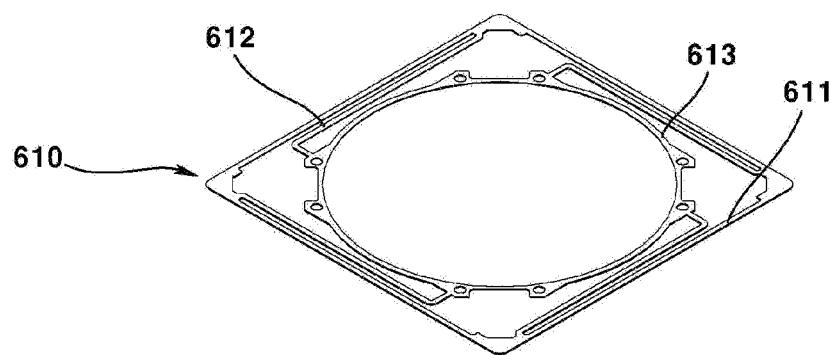
Figure 15:
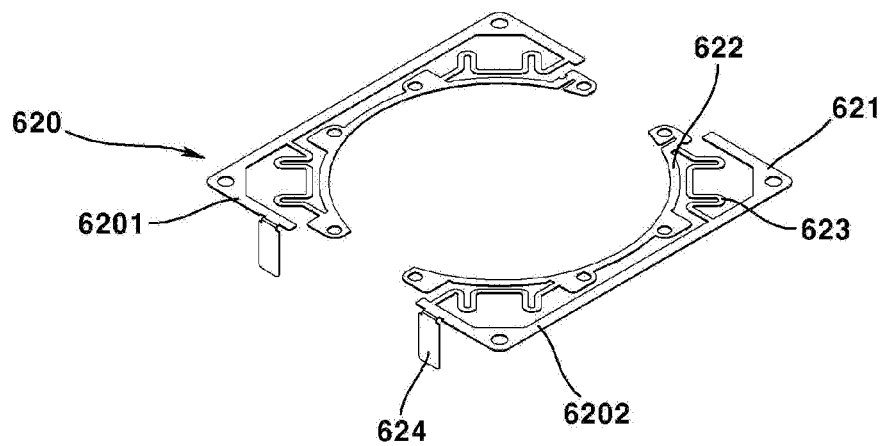
Figure 16:
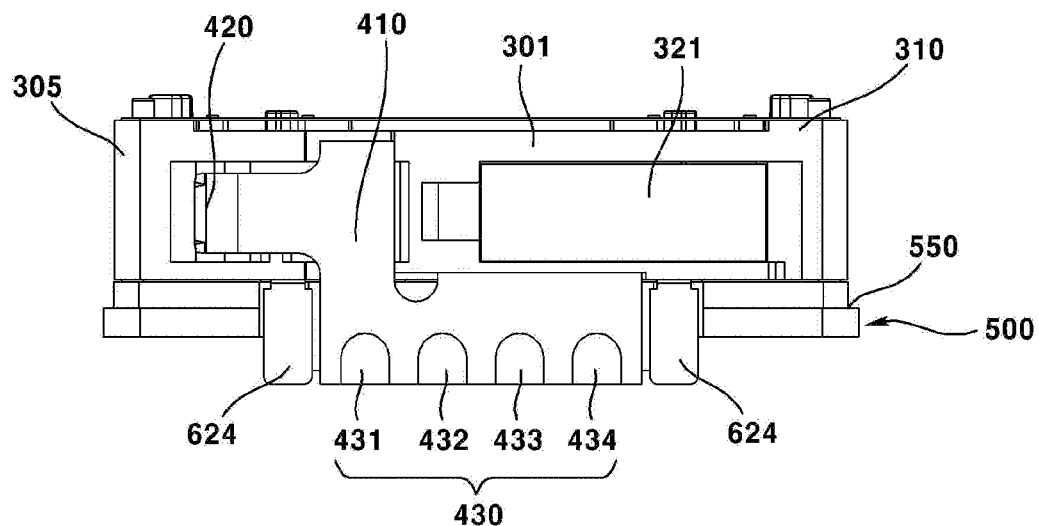
Figure 17:
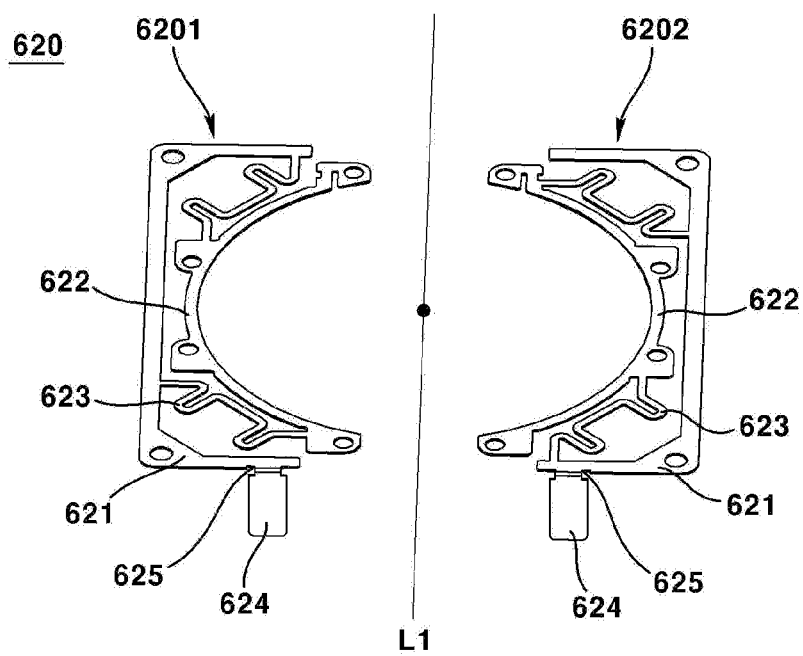
Figure 18:
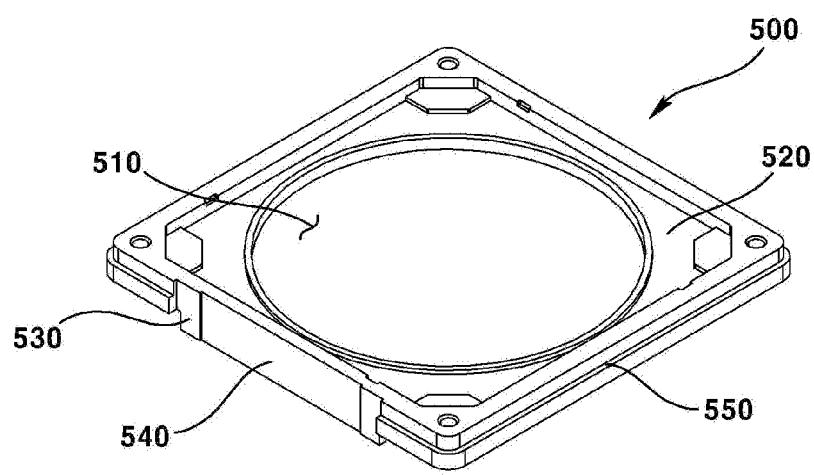

FIG. 1 is a perspective view of a lens driving device according to an exemplary embodiment of the present invention, FIG. 2 is an exploded perspective view illustrating a lens driving device according to an exemplary embodiment of present invention, FIG. 3 is a cross-sectional view taken along line A-A' of FIG. 1, FIG. 4 is a partially enlarged cross-sectional view illustrating a portion of FIG. 3, FIG. 5 is a perspective view illustrating a housing of a lens driving device according to an exemplary embodiment of the present invention, FIG. 6 is a perspective view illustrating a coupled state between a housing of a lens driving device and a substrate according to an exemplary embodiment of the present invention, FIG. 7 is a bottom perspective view illustrating a coupled state between a housing of a lens driving device and a substrate according to an exemplary embodiment of the present invention, FIG. 8 is a perspective view illustrating a coupled state between a housing of a lens driving device and a sensor, and a coupled state between a sensing magnet and a bobbin according to an exemplary embodiment of the present invention while omitting some portions of housing and bobbin, FIG. 9 is an exploded perspective view of a bobbin, a sensing magnet and a compensation magnet of a lens driving device according to an exemplary embodiment of present invention, FIG. 10 is a perspective view of a driving coil in a lens driving device according to an exemplary embodiment of present invention, FIG. 11 is a perspective view illustrating a coupled state between a sensing magnet of lens driving device and a bobbin according to an exemplary embodiment of the present invention, FIG. 12 is a perspective view illustrating a coupled state among a sensing magnet of lens driving device, a driving coil and a bobbin according to an exemplary embodiment of the present invention, FIG. 13 is a plane view illustrating a coupled state between a sensing magnet of lens driving device and a bobbin according to an exemplary embodiment of the present invention, FIG. 14 is a bottom view illustrating a coupled state between a sensing magnet of lens driving device and a bobbin according to an exemplary embodiment of the present invention, FIG. 15 is an exploded perspective view of a support member in a lens driving device according to an exemplary embodiment of present invention, FIG. 16 is a lateral view illustrating a lens driving device according to an exemplary embodiment of present invention, while omitting some portions of the lens driving device, FIG. 17 is a perspective view illustrating a lower support member of a lens driving device according to an exemplary embodiment of present invention, and FIG. 18 is a perspective view illustrating a base of a lens driving device according to an exemplary embodiment of present invention.

The lens driving device may include a cover member (100), a mover (200), a stator (300), a substrate (400), a base (500), a support member (600) and a sensing unit (700). However, any one or more of the cover member (100), the mover (200), the stator (300), the substrate (400), the base (500), the support member (600) and the sensing unit (700) may be omitted or changed from the lens driving device according to the exemplary embodiment of the present invention.

The cover member (100) may form an exterior look of the lens driving device. The cover member (100) may take a bottom-opened cubic shape. However, the present invention is not limited thereto.

The cover member (100) may be formed with a metal material. To be more specific, the cover member (100) may be formed with a metal plate. In this case, the cover member (100) can shield an EMI (Electro Magnetic Interference). Because of the characteristics of the cover member (100) thus described, the cover member (100) may be called an "EMI shield can". The cover member (100) may shield the electromagnetic waves generated from an outside of the lens driving device from entering into the cover member (100). Furthermore, the cover member (100) may prevent the electromagnetic waves generated from inside of the cover member (100) from being emitted to an outside of the cover member (100). However, the material of the cover member (100) is not limited thereto.

The cover member (100) may include an upper plate (101) and a lateral plate (102). The cover member (100) may include an upper plate (101) and a lateral plate (102) extended downwardly from an outside of the upper plate (101). A lower end of the lateral plate (102) at the cover member (100) may be mounted on a terminal part (550) of base (500). The cover member (100) may be mounted at an inner lateral surface on the base (500) by being in close contact, in part or in whole, with a lateral surface of base (500). A inner space formed by the cover member (100) and the base (500) may be disposed with a mover (200), a stator (300) and a support member (600). Through this type of structure, the cover member (100) may protect an inner element from the outside shock or, at the same time, prevent the infiltration of outside pollution materials. However, a lower end at the lateral plate (102) of cover member (100) may be directly coupled with a PCB disposed at a lower side of base (500).

The cover member (100) may include an opening (110) and a rotation prevention part (120). However, any one or more of the opening (110) and the rotation prevention part (120) may be omitted or changed from the cover member (100).

The opening (110) may be formed at an upper plate (101) of cover member (100). The opening (110) may expose the lens module toward an upper side. The opening (110) may be formed at the upper plate (101) to expose the lens module. The opening (110) may be with a shape corresponding to that of the lens module. The opening (110) may be formed larger in size than a diameter of the lens module to allow the lens module to be assembled with the bobbin (210) through the opening (110). Meantime, the light introduced into through the opening (110) may pass through the lens module. At this time, the light having passed the lens module may be obtained by the image sensor as an image.

The rotation prevention part (120) may be extended from an inner side of the upper plate (101) to a lower side. The rotation prevention part (120) can prevent the bobbin (210) from rotating. The rotation prevention part (120) may be extended from an inner circumferential surface of upper plate (101) at the cover member (100) to prevent the bobbin (210) from rotating. A portion of the rotation prevention part (120) may be accommodated into a groove concavely formed on an upper surface of bobbin (210). The rotation prevention part (120) may be so formed as to be accommodated into a groove of bobbin (210) as to allow at least of a lateral part of the rotation prevention part (120) to be in contact with the bobbin (210) when the bobbin (210) is rotated. Through this structure, the rotation prevention part (120) can prevent the bobbin (210) from rotating.

The mover (200) may be movably supported relative to the stator (300). The mover (200) may move to an optical axis direction. The mover (200) may move integrally with a lens module through an electromagnetic interaction with the stator (300). The mover (200) may perform an auto focusing function by integrally moving with the lens module. The mover (200) may include a bobbin (210) and a driving coil (220). However, any one or more of the bobbin (210) and the driving coil (220) may be omitted or changed from the mover (200).

The bobbin (210) may be disposed at an inside of housing (310). The bobbin (210) may be accommodated into a groove (311) of housing (310). The bobbin (210) may be disposed at a groove (311) of housing (310). The bobbin (210) may be spaced apart from the housing (310). The bobbin (210) may be disposed at an inside of housing (310). The bobbin (210) may be disposed with a driving coil (220). The bobbin (210) may be disposed at an external circumferential surface thereof with the driving coil (220). The bobbin (210) may be coupled by a support member (600). The bobbin (210) may be coupled at an upper surface with an upper support member (610). The bobbin (210) may be coupled at a lower surface with a lower support member (620). The bobbin (210) may be disposed with a sensing magnet (710). The bobbin (210) may be disposed with a compensation magnet (730). The bobbin (210) may be disposed at one side with the sensing magnet (710) and may be disposed at the other side with the compensation magnet (730). The bobbin (210) may be coupled with the lens module. The bobbin (210) may be coupled at an inner circumferential surface with an external circumferential surface of lens module. The bobbin (210) may be moved to an optical axis direction relative to the housing (310).

The bobbin (210) may include a hole (211), a coil reception groove (212), a sensing magnet reception part (230) and a compensation magnet reception part (240). However, any one or more of the hole (211), the coil reception groove (212), the sensing magnet reception part (230) and the compensation magnet reception part (240) may be omitted or changed from the bobbin (210).

The hole (211) may be coupled by the lens module. The hole (211) may be formed at an inner surface with a screw thread of a shape corresponding to that formed at an outside of the lens module. That is, the hole (211) may be screw-coupled with the lens module. An adhesive may be interposed between the lens module and the bobbin (210). At this time, the adhesive may be an epoxy hardened by heat or UV. That is, the lens module and the bobbin (210) may be coupled by a UV-hardening epoxy and/or heat-hardening epoxy.

The coil reception groove (212) may be formed by being recessed inwardly from an outside of the bobbin (210). The coil reception groove (212) may take a shape corresponding to that of the driving coil (220). The coil reception groove (212) may be formed by being disposed at a position more inner side than that of the sensing magnet reception groove (239). In this case, the sensing magnet (710) accommodated into the sensing magnet reception groove (239) may be disposed at a position more outside than that of the driving coil (220) accommodated into the coil reception groove (212). The coil reception groove (212) may be wound or mounted with a driving coil (220). The coil reception groove (212) may be continuously formed along an outside of the bobbin (210), or may be formed by being spaced apart at a predetermined distance. The coil reception groove (212) may be formed by allowing a portion of outside of the bobbin (210) to be inwardly recessed. At this time, the driving coil (220) may be directly wound on the coil reception groove (212). As a modification, the coil reception groove (212) may be formed by allowing an upper side or a lower side to be opened. At this time, the driving coil (220) may be inserted into and coupled with the coil reception groove (212) through the opened portion while being in a pre-wound state.

An upper coupling part (213) may be coupled with the upper support member (610). The upper coupling part (213) may be coupled with an inner lateral part (612) of upper support member (610). The upper coupling part (213) may be protrusively formed on an upper surface of bobbin (210). The protrusion of the upper coupling part (213) may be coupled by being inserted into a groove or a hole of the inner lateral part (612). At this time, the protrusion of the upper coupling part (213) may be melted in a state of being inserted into a hole of the inner lateral part (612) to fix the upper support member (610).

A lower coupling part (214) may be coupled with the lower support member (620). The lower coupling part (214) may be coupled with an inner lateral part (622) of the lower support member (620). The lower coupling part (213) may be protrusively formed at a lower surface of bobbin (210). For example, the protrusion of the lower coupling part (214) may be coupled by being inserted into a groove or a hole of an inner lateral part (622). At this time, the protrusion of the lower coupling part (214) may be melted in a state of being inserted into a hole of the inner lateral part (622) to fix the lower support member (620).

A sensing magnet reception part (230) may be formed at one side of bobbin (210). The sensing magnet reception part (230) may accommodate at least one portion of sensing magnet (710). The sensing magnet reception part (230) may be formed by being recessed into the bobbin (210). The sensing magnet reception part (230) may be symmetrically formed based on an optical axis of compensation magnet reception part (240).

The sensing magnet reception part (230) may include an upper support part (231), an upper open hole (232), a lower support part (233), a lower open hole (234), a lateral support part (235), a support surface (236), a protrusion (237), a round part (238) and a sensing magnet reception groove (239). However, any one or more of the upper support part (231), the upper open hole (232), the lower support part (233), the lower open hole (234), the lateral support part (235), the support surface (236), the protrusion (237), the round part (238) and the sensing magnet reception groove (239) may be omitted or changed from the sensing magnet reception part (230).

The upper support part (231) may be disposed at an upper side of an upper surface of sensing magnet (710). The upper support part (231) may be formed with an upper open hole (232). The upper support part (231) may support an upper surface of sensing magnet (710). A press-fitting tolerance between the upper support part (231) and an upper surface of sensing magnet (710) may be 20 μm.

The upper open hole (232) may be formed at the upper support part (231). The upper open hole (232) may be formed at the upper support part (231) by passing through the upper support part (231). The upper open hole (232) may expose a portion of upper surface of sensing magnet (710) to an upper side. An adhesive may be infused into an upper surface of sensing magnet (710) through the upper open hole (232).

The lower support part (233) may be disposed at a lower side of a lower surface of sensing magnet (710). The lower support part (233) may be formed with a lower open hole (234). The lower support part (233) may support a lower surface of sensing magnet (710). An interference-fit tolerance between the lower support part (232) and a lower surface of sensing magnet (710) may be 20 μm.

The lower open hole (234) may be formed at the lower support part (233). The lower open hole (234) may be formed at the lower support part (233) by passing through the lower support part (233). The lower open hole (234) may expose a portion of lower surface of sensing magnet (710) to a lower side. An adhesive may be infused into a lower surface of sensing magnet (710) through the lower open hole (234).

The lateral support part (235) may support both lateral surfaces of sensing magnet (710). The lateral support part (235) may include a support surface (236), a protrusion (237) and a round part (238). The lateral support part (235) may be respectively disposed at an upper surface and a lower surface of sensing magnet (710). The lateral support part (235) disposed at a lower surface of sensing magnet (710) may be disposed with a height of 0.25 mm. The lateral support part (235) disposed at an upper surface of sensing magnet (710) may be disposed with a height of 0.44 mm.

The support surface (236) may face the both lateral surfaces of sensing magnet (710). The support surface (236) may be in contact with the both lateral surfaces of sensing magnet (710). The support surface (236) may support at least one portion of both lateral surfaces of sensing magnet (710).

The protrusion (237) may be protruded toward an outside when heading to a sensing magnet (710) side. The protrusion (237) may be disposed at a more outwardly position than that of the sensing magnet (710).

The round part (238) may be formed in a round manner at an area where the support surface (236) and an external surface of protrusion meet. The round part (238) may guide the sensing magnet (710) to be easily inserted into a sensing magnet reception groove (239) when the sensing magnet (710) is inserted from a lateral side of bobbin (210). That is, the round part (238) may guide that sensing magnet (710) to be inserted into the sensing magnet reception groove (239).

The sensing magnet reception groove (239) may be formed by being inwardly recessed from an outside of the bobbin (210). The sensing magnet reception groove (239) may take a shape corresponding to that of sensing magnet (710). The sensing magnet reception groove (239) may accommodate at least one portion of sensing magnet (710).

The compensation magnet reception part (240) may be formed at the bobbin (210). The compensation magnet reception part (240) may accommodate at least one portion of compensation magnet (730). The compensation magnet reception part (240) may be formed at the other side of bobbin corresponding to an opposite side of one side of bobbin (210) formed by the sensing magnet reception part (230). The compensation magnet reception part (240) may be symmetrically formed with the sensing magnet reception part (230) based on an optical axis. In this case, the sensing magnet (710) accommodated into the sensing magnet reception part (230) and the compensation magnet (730) accommodated into the compensation magnet reception part (240) may be symmetrical in terms of magnetism. Through this structure, an electromagnetic balance may be realized between the sensing magnet (710) and the compensation magnet (730). As a result, an influence affecting the electromagnetic interaction between the sensing magnet (710) and the driving coil (220) can be minimized. The compensation magnet reception part (240) may be formed with a size and shape corresponding to those of the sensing magnet reception part (230). The compensation magnet reception part (240) may be disposed at a position corresponding to that of the sensing magnet reception part (230) based on an optical axis.

The driving coil (220) may be disposed at the bobbin (210). The driving coil (220) may be formed on the bobbin (210). The driving coil (220) may face the driving magnet (320). The driving coil (220) may interact with the driving magnet (320). The driving coil (220) may electromagnetically interact with the driving magnet (320). The driving coil (220) may move the bobbin (210) relative to the housing (310) through the electromagnetic interaction with the driving magnet (320). The driving coil (220) may be overlapped with the sensing magnet (710) to a direction perpendicular to the optical axis. The driving coil (220) may be disposed at an inside of the sensing magnet (710).

The driving coil may include at least one coil part. The driving coil (220) may be formed with a single coil to be guided to a coil reception groove (212) and may be wound on an outer circumferential surface of bobbin (210). Furthermore, as a modification, the driving coil (220) may be independently formed with four coil parts whereby the driving coil (220) may be disposed at an external surface of bobbin (210) to allow adjacent two coil parts to mutually form a 90°.

The driving coil (220) may include a pair of lead cables (not shown) in order to supply an electric power. The pair of lead cables of driving coil (220) may be electrically connected to a first support unit (6201) and a second support unit (6202), both of which are a classification element of the lower support member (620).

A distal end of one side of the driving coil (220) may be electrically connected to the PCB through the first support unit (6201). The other end of one side of the driving coil (220) may be electrically connected to the PCB through the second support unit (6202). Alternatively, the driving coil (220) may receive the power through the upper support member (610). When a power is supplied to the driving coil (220), an electromagnetic field may be formed about the driving coil (220). As a modification, the bobbin (210) may be disposed with the driving magnet (320), and the housing (310) may be disposed with the driving coil (220). That is, the driving coil (220) and the driving magnet (320) may be disposed by exchanging mutual positions.

The driving coil (220) may include first to fourth corner parts (221, 222, 223, 224). The driving coil (220) may include a first corner part (221) adjacently disposed with the sensing magnet (710), a third corner part (223) adjacently disposed with the compensation magnet (730) and second and fourth corner parts (222, 224) interposed between the first corner part (221) and the third corner part (223). At this time, a distance (see L1 of FIG. 10) between the first corner part (221) and the third corner part (223) may be shorter than a distance (see L2 of FIG. 10) between second corner part (222) and the fourth corner part (224). An external side of the first corner part (221) of the driving coil (220) may be disposed with the sensing magnet (710) and an external side of the third corner part (223) may be disposed with the compensation magnet (730).

The stator (300) may be disposed at an external side of rotor (200). The stator (300) may be selectively spaced apart from the rotor (200). The stator (300) may be supported by a base (500) disposed thereunder. However, it may be explained that the rotor (200) includes the base (500) as a fixing member. The stator (300) may be disposed at an inside space of cover member (100). The stator (300) can move the rotor (200) through an electromagnetic interaction. The stator (300) may include a housing (310) and a driving magnet (320). However, any one or more of the housing (310) and the driving magnet (320) may be omitted or changed from the stator (300).

The housing (310) may be spaced apart from the bobbin (210). The housing (310) may be disposed at an outside of bobbin (210). The housing (310) may be disposed with a driving magnet (320). The housing (310) may be coupled by a substrate (400). The housing (310) may be disposed at an upper side of base (500). The housing (310) may be disposed on a base (500). The housing (310) may be coupled by a support member (600). The housing (310) may be coupled at an upper surface with an upper support member (610). The housing (310) may be disposed at a lower surface with a lower support member (620). The housing (310) may take a shape corresponding to that of an inner lateral surface of cover member (100). A first corner part (305) of housing (310) may be disposed with a sensor (720). The housing (310) may be formed with an insulation material. The housing (310) may be formed with an injection material in consideration of productivity. As a modification, the housing (310) may be omitted and a driving magnet (320) may be directly fixed to the cover member (100).

The housing (310) may include first to fourth lateral surfaces (301, 302, 303, 304). The first to fourth lateral surfaces (301, 302, 303, 304) may be continuously disposed. The housing (310) may include first to fourth corner parts (305, 306, 307, 308). The first to fourth corner parts (305, 306, 307, 308) may be disposed among the first to fourth lateral surfaces (301, 302, 303, 304). The housing (310) may include a lateral surface (301), a first corner part (305) disposed at one side of first lateral surface (301), a second corner part (306) disposed at the other side of first lateral surface (301). The housing (310) may include a first lateral surface (301), a second lateral surface (302) adjacent to the first lateral surface (301), a third lateral surface (303) adjacent to the second lateral surface (302), a fourth lateral surface (304) adjacent to the third lateral surface (303), a first corner part (305) interposed between the first lateral surface (301) and the second lateral surface (302), a second corner part (306) interposed between the second lateral surface (302) and the third lateral surface (303), a third corner part (307) interposed between third lateral surface (303) and the fourth lateral surface (304) and a fourth corner part (308) interposed between the fourth lateral surface (304) and the first lateral surface (301). The housing (310) may include first to fourth lateral parts. The housing (310) may include first to fourth corner parts (305, 306, 307, 308) disposed among the first to fourth lateral parts.

The housing (310) may include a hole (311), a magnet coupling part (312), a sensor reception part (330), a sensor substrate reception part (340) and a bond infusion hole (350). However, any one or more of the hole (311), the magnet coupling part (312), the sensor reception part (330), the sensor substrate reception part (340) and the bond infusion hole (350) may be omitted or changed from the housing (310).

The hole (311) may be formed at the housing (310). The hole (311) may be accommodated into the bobbin (210). The hole (311) may be movably disposed with the bobbin (210). The hole (311) may take a shape corresponding to that of bobbin (210). An inner circumferential surface of housing (310) forming the hole (311) may be spaced apart from an outer circumferential surface of bobbin (210).

The magnet coupling part (312) may be formed at a lateral surface of housing (310). The magnet coupling part (312) may be formed with a shape corresponding to that of driving magnet (320). The magnet coupling part (312) may fix the driving magnet (320) by accommodating the driving magnet (320). The magnet coupling part (312) may be formed by passing through a lateral surface of housing (310). Alternatively, the magnet coupling part (312) may be formed by being recessed at an inner surface of housing (310). The magnet coupling part (312) may be disposed by being leaned toward a second corner part (306) side and a fourth corner part (308) side. That is, the magnet coupling part (312) may be disposed more nearer to the second corner part (306) and the fourth corner part (308) than the first corner part (305) and the third corner part (307). Through this structure, an electromagnetic interference between the driving magnet (320) coupled with the magnet coupling part (312) and the sensing magnet (710) and/or the compensation magnet (730) can be minimized.

The upper coupling part (313) may be coupled with the upper support member (610). The upper coupling part (313) may be coupled with an outer lateral part (611) of upper support member (610). The upper coupling part (313) may be protrusively formed from an upper surface of housing (310). For example, the protrusion of upper coupling part (313) may be coupled by being inserted into a groove or a hole of the outer lateral part (611). At this time, the protrusion of upper coupling part (313) may be melted while being inserted into a hole of the outer lateral part (611) to fix the upper support member (610).

The lower coupling part may be coupled with the lower support member (610). The lower coupling part may be coupled with an outer lateral part (621) of lower support member (620). The lower coupling part may be protrusively formed from a lower surface of housing (310). The protrusion of lower coupling part may be coupled by being inserted into a groove of a hole of outer lateral part (621). At this time, the protrusion of lower coupling part may fix the lower support member (620) by being melted in a state of being inserted into a hole of outer lateral part (621). Alternatively, the outer lateral part (621) of lower support member (620) may be fixed in a method of being insertedly pressed between a lower surface of housing (310) and an upper surface of base (500).

The sensor reception part (330) may be formed at the housing (310). The sensor reception part (330) may accommodate at least one portion of sensor (720). The sensor reception part (330) may be formed by being inwardly opened at the housing (310). The sensor reception part (330 may include a lower guide part (331), an upper guide part (332), a lateral guide part (333) and an inner guide part (334). However, any one or more of the lower guide part (331), the upper guide part (332), the lateral guide part (333) and the inner guide part (334) may be omitted from the sensor reception part (330).

The lower guide part (331) may contact a lower surface of sensor (720). The lower guide part (331) may surface-contact at least one surface of lower surface of sensor (720). The lower guide part (331) may support a lower surface of sensor (720). The lower guide part (331) may prevent the sensor (720) from moving to a lower side. The lower guide part (331) may face a lower surface of sensor (720).

The upper guide part (332) may contact an upper surface of sensor (720). The upper guide part (332) may surface-contact at least one surface of upper surface of sensor (720). The upper guide part (332) may support an upper surface of sensor (720). The upper guide part (332) may prevent the sensor (720) from moving to an upper side. The upper guide part (332) may face an upper surface of sensor (720).

The lateral guide part (333) may contact the other lateral surface of both lateral surfaces of sensor (720). The lateral guide part (333) may surface-contact at least one portion of lateral surface of sensor (720). The lateral guide part (333) may support the other lateral surface of both lateral surfaces of sensor (720). The lateral guide part (333) may prevent the sensor (720) from moving to the other lateral side of both lateral sides. The lateral guide part (333) may face the other lateral side of both lateral sides. The movement of sensor (720) to one lateral side direction of both lateral side directions may be prevented by the substrate (400) being press-fitted to the housing (310). The movement of sensor (720) to the other lateral side direction of both lateral side directions may be prevented by the lateral guide part (333).

The inner guide part (334) may contact one portion of sensor (720). The inner guide part (334) may contact a portion of edge at an inner surface of sensor (720). The inner guide part (334) may surface-contact at least one portion of inner surface at the sensor (720). The inner guide part (334) may support an inner surface of sensor (720). The inner guide part (334) may prevent the sensor from being moved to an inner side. The inner guide part (334) may face an inner surface of sensor (720).

The sensor substrate reception part (340) may be formed on the housing (310). The sensor substrate reception part (340) may accommodate at least one portion of substrate (400). The sensor substrate reception part (340) may be formed with a shape to correspond to that of at least one portion of substrate (400). The sensor substrate reception part (340) may be formed by allowing a portion of housing (310) to be recessed. The sensor substrate reception part (340) may be formed by allowing an outer lateral surface of housing (310) to be recessed inwardly. The sensor substrate reception part (340) may be spaced apart from the magnet coupling part (312). The sensor substrate reception part (340) may include a coupling surface (341) and a slant surface (342). However, any one or more of the coupling surface (341) and the slant surface (342) may be omitted or changed from the sensor substrate reception part (340).

The coupling surface (341) may contact an outer surface of substrate (400). The coupling surface (341) may support an outer surface of substrate (400). The slant surface (342) may be so slantly formed as to allow an upper surface of substrate (400) contacted to the coupling surface (341) and a lower surface to be bent inwardly. The slant surface (342) may apply a pressure to at least one portion of substrate (400) inwardly through the slant structure. The slant surface (342) may be formed by being spaced apart on an upper surface and a lower surface of coupling surface (341). The slant surface (342) formed on an upper surface of coupling surface (341) may be more recessed toward an outside from an upper side while advancing to a lower side. The slant surface (342) formed on a lower surface of coupling surface (341) may be inwardly protruded while advancing to an upper side from a lower side.

The sensor substrate reception part (340) may include a first reception groove (316), a second reception groove (317) and a third reception groove (318). However, any one or more of the first reception groove (316), the second reception groove (317) and the third reception groove (318) may be omitted or changed from the sensor substrate reception part (340). The sensor substrate reception part (340) may include a first reception groove (316) formed by being recessed from an inner lateral surface of first corner part (305) at the housing (310) toward an outside. The sensor substrate reception part (340) include a second reception groove (317) formed by being recessed from an outer lateral surface of first lateral part (301) at the housing (310) toward an inside. The sensor substrate reception part (340) may include a third reception groove (318) formed by being recessed from a lower surface of first lateral surface (301) at the housing (310) toward an upper side.

The first reception groove (316) may be formed by being recessed from an inner lateral surface of first corner part (305) at the housing (310) to an outside. The first reception groove (316) may accommodate at least one portion of sensor (720). The first reception groove (316) may be formed with a shape corresponding to that of sensor (720). The first reception groove (316) and the second reception groove (318) may communicate each other. The first, second and third reception grooves (316, 317, 318) may communicate each other. The first, second and third reception grooves (316, 317, 318) may accommodate at least one portion of the substrate (400) and the sensor (720).

The second reception groove (317) may be formed by being recessed from outer lateral surface of first lateral surface (301) of housing (310) toward an inner side. The second reception groove (317) may accommodate at least one portion of substrate (400). The second reception groove (317) may accommodate a body part (410) of substrate (400). The second reception groove (317) may be formed with a shape corresponding to that of at least one portion of substrate (400).

The third reception groove (318) may be formed by being recessed from a lower surface of first lateral surface (301) of housing (310) to an upper side. The third reception groove (318) may accommodate at least one portion of substrate (400). The third reception groove (318) may be formed by being more recessed to an upper side than the first reception groove (316). The third reception groove (318) may accommodate at least one portion of substrate (400).

The bond infusion hole (350) may be formed between a lateral guide part (333) and a coupling surface (341). An adhesive may be infused between the substrate (400) and the housing (310) through the bond infusion hole (350). The adhesive may be infused between an outer surface of substrate (400) and the coupling surface (341) through the bond infusion hole (350).

The driving magnet (320) may be formed at a housing (310). The driving magnet (320) may be disposed at the housing (310). The driving magnet (320) may face the driving coil (220). The driving magnet (320) may move the bobbin (210) through an interaction with the driving coil (220). The driving magnet (320) may move the bobbin (210) through an electromagnetic interaction with the driving coil (220). The driving magnet (320) may be fixed to the magnet coupling part (312) of housing (w310). The driving magnet (320) may be adhered to the housing (310) by an adhesive. The driving magnet (320) may include at least one magnet. The driving magnet (320) may include first to fourth magnet units (321, 322, 323, 324), each spaced apart from the other. The driving magnet (320) may include a first magnet unit (321) disposed at the first lateral surface (301), a second magnet unit (322) disposed at the second lateral surface (302), a third magnet unit (323) disposed at a third lateral surface (303) and a fourth magnet unit (324) disposed at the fourth lateral surface (304). The first to fourth magnet units (321, 322, 323, 324) may be spaced apart from each other. The first to fourth magnet units (321, 322, 323, 324) may be disposed at the housing (310) to allow two adjacent magnet units to form an 90° angle therebetween. The first magnet unit (321) may be symmetrically disposed with the third magnet unit (323) based on a center of housing (310). The second magnet unit (322) may be symmetrically formed with the fourth magnet unit (324) based on a center of housing (310).

The first magnet unit (321) may be disposed to be closer to the second corner part (306) than the first corner part (305). A center of first magnet unit (321) may be closer to the second corner part (306) than the first corner part (305) of housing (310). That is, the first magnet unit (321) may be disposed to be more leaned toward a second corner part (306) side. A center of second magnet unit (322) may be closer to the second corner part (306) than the third corner part (307) of housing (310). That is, the second magnet unit (322) may be disposed to be more leaned toward a second corner part (306) side. A center of third magnet unit (323) may be closer to the fourth corner part (308) than the third corner part (307) of housing (310). That is, the third magnet unit (323) may be disposed to be more leaned toward a fourth corner part (308) side.

A center of fourth magnet unit (324) may be closer to the fourth corner part (308) than the first corner part (305) of housing (310). That is, the fourth magnet unit (324) may be disposed to be more leaned toward a fourth corner part (308) side. In this case, an electromagnetic interference between the first to fourth magnets (321, 322, 323, 324) and the sensing unit can be minimized. That is, an arranged space of sensing magnet (710) can be secured through a shape and arranged structure of driving magnet (320) according to an exemplary embodiment.

The driving magnet (320) may be formed with four flat plate magnets. The driving magnet (320) may be disposed at a lateral surface of housing (310) and the sensor (720) may be disposed at a corner part of housing (310). The driving magnet (320) may be disposed at a lateral surface of housing (310) to be closer to a corner at one side.

The substrate (400) may be disposed at the housing (310). The substrate (400) may be coupled with the housing (310). The substrate (400) may be coupled by the sensor (720). The substrate (400) may be mounted with the sensor (720). The substrate (400) may be so formed as to be formed at a lateral surface of one side of housing (310) and a corner. The substrate (400) may be so formed as allow the sensor (720) mounted on the substrate (400) to be disposed at a corner of housing (310). At least one portion of substrate (400) may be accommodated into a sensor substrate reception part (340) of housing (310). The substrate (400) may be press-fitted into the sensor substrate reception part (340) of housing (310). The substrate (400) may be fixed by an adhesive while being inserted into a sensor substrate reception part (340) of housing (310). The substrate (400) may be such that a body part (410) may be disposed at an outside of housing (310) while being inserted into the sensor substrate reception groove (340) and a sensor mounting part (420) may be disposed at an inner side of housing (310). Through this structure, a terminal part (430) disposed at a lower side of body part (410) may be easy to be electrically connected to an outside element, and the sensor (720) mounted on an inner lateral surface of sensor mounting part (420) can detect the sensor magnet (710) disposed at an inner side at a high output. A portion of substrate (400) may be extended along a lateral surface at one side of base (500). The portion of substrate (400) and at least one portion of terminal part (624) may be extended along a lateral surface at one side of base (500). The portion of substrate (400) may be disposed at a second reception part (540) of base (500). The substrate (400) may be an FPCB (Flexible Printed Circuit Board). However, the present invention is not limited thereto. A portion of the substrate (400) may be interposed between a terminal part (624) of first support unit (6201) and a terminal part (624) of second support unit (6202).

The substrate (400) may be disposed at an inner surface with a sensor (720). An external surface of substrate (400) may contact a coupling surface (341) of housing (310). The external surface of substrate (400) may contact a coupling surface (341) of housing (310). The external surface of substrate (400) may be supported to the coupling surface (341) of housing (310). The external surface of substrate (400) may be pressed to an inner side by the slant surface (342) of housing (310) to an upper surface and a lower surface. The external surface of substrate (400) may be bent to an inner side from an upper surface and a lower surface by the slant surface (342) of housing (310). Through this structure, the sensor (720) disposed at an inner side of substrate (400) may be pressed into an inner side. The sensor (720) pressed into the inner side is supported by an inner guide part (334) of housing (310) to strongly fix the sensor (720). That is, the substrate (400) is pressed into an inner side by the slant surface (342) of housing (310), whereby the sensor (720) may be fixed at a normal position while being pressed to the inner guide part (334), even if there is an error in thickness of substrate (400) per product, or even if there is an error on the sensor reception part (330) of housing (310).

The substrate (400) may include a body part (410), a sensor mounting part (420) and a terminal part (430). However, any one or more of the body part (410), the sensor mounting part (420) and the terminal part (430) may be omitted or changed from the substrate (400).

The body part (410) may be accommodated into the sensor substrate reception part (340) of housing (310). The body part (410) may not be overlapped with the driving magnet (320) to a direction perpendicular to an optical axis. A lateral surface at one side of body part (410) may be extended with the sensor mounting part (420). A lateral surface at the other side of body part (410) may be press-fitted into the housing (310). In the present exemplary embodiment, because a lateral surface at the other side of body part (410) is press-fitted (coupled by interference fit) into the housing (310), the sensor can be coupled with the housing (310), only by mounting the sensor (720) on the sensor mounting part (420), and inserting the sensor mounting part (420) into the housing (310) and interference-fitting the body part (410) into the housing (310).

The sensor mounting part (420) may be extended from the body part (410) onto a lateral surface of one side. The sensor mounting part (420) may be coupled by the sensor (720). The sensor mounting part (420) may be mounted with the sensor (720). The sensor mounting part (420) may be bent from the body part (410). The sensor mounting part (420) may be accommodated into the sensor substrate reception part (340) of housing (310).

The terminal part (430) may be downwardly extended from the body part (410). The terminal part (430) may be extended downwardly from a center of a lateral surface of one side of housing (310). The terminal part (430) may be exposed to an outside. At least one portion of terminal part (430) may be more protruded downwardly than the cover member (100). The terminal part (430) of substrate (400) may be disposed at a terminal part (624) of lower support member (620).

The base (500) may be disposed at a lower side of bobbin (210). The base (500) may be disposed at a lower side of housing (310). The base (500) may support the stator (300). The base (500) may be disposed at a lower side with a PCB. The base (500) may function as a sensor holder protecting an image sensor mounted on the PCB.

The base (500) may include a hole (510), a body part (520), a first reception part (530), a second reception part (540), a terminal part (550) and a foreign object collection part. However, any one or more of the hole (510), the body part (520), the first reception part (530), the second reception part (540), the terminal part (550) and the foreign object collection part may be omitted or changed from the base (500).

The hole (510) may be formed at a position corresponding to that of hole (211) of bobbin (210). That is, the hole (510) may be formed to overlap with the lens module to an optical axis direction. The hole (510) may be coupled with an infrared filter. However, as a modification, an infrared filter may be coupled to a separate sensor holder disposed at a lower side of base (500).

The body part (520) may be disposed at a lower side of bobbin (210). The body part (520) may be disposed at a lower side of housing (310). The body part (520) may support the housing (310). The body part (520) may be coupled with the cover member (100). The body part (520) may be disposed at an upper surface of PCB.

The first reception part (530) may be formed by being inwardly recessed from a lateral surface of an outside of the body part (520) at the base (500). The first reception part (530) may accommodate at least one portion of terminal part (624) of the lower support member (620). The first reception part (530) may surface-contact the terminal part (624). That is, the terminal part (624) may be extended along the first reception part (530). The first reception part (530) may be disposed at both sides of second reception part (540).

The second reception part (540) may be formed by being inwardly recessed from a lateral surface of an outside of the body part (520) at the base (500). The second reception part (540) may be formed by being more inwardly recessed from a lateral surface of an outside of the body part (520) at the base (500) than the first reception part (530). That is, The second reception part (540) may be formed by being inwardly recessed from the first reception part (530). The second reception part (540) may accommodate at least one portion of terminal part (430) of substrate (400). The second reception part (540) may be surface-contacted by terminal part (430) of substrate (400). That is, the terminal part (430) of substrate (400) may be extended along the second reception part (540). The second reception part (540) may be interposed between two mutually spaced-apart first reception parts (530).

The terminal part (550) may support the cover member (100). The terminal part (550) may support a lower end of the lateral plate (102) of cover member (100). The terminal part (550) may be accommodated with the lateral plate (102) of cover member (100). The terminal part (550) may be protrusively formed from a lateral surface of body part (510) to an outside. An adhesive may be coated between the cover member (100) accommodated on the terminal part (550) and a lateral surface of base (500).

The foreign object collection part may collect foreign objects introduced into the cover member (100). The foreign object collection part may be disposed at an upper surface of base (500). The foreign object collection part may include an adhesive material. The foreign object collection part may collect foreign objects in an inner space formed by the cover member (100) and the base (500).

The support member (600) may be coupled to the bobbin (210). The support member (600) may be coupled with the housing (310). The support member (600) may be coupled with the bobbin (210) and the housing (310). The support member (600) may be coupled to the base (500). At least one portion of support member (600) may have elasticity. The support member (600) may include an elastic member. The support member (600) may movably support the bobbin (210). The support member (600) may elastically support the bobbin (210). The support member (600) may movably support the rotor (200) relative to the stator (300). The support member (600) may movably support the bobbin (210) relative to the housing (310). The support member (600) may movably support the bobbin (210) relative to the base (500). The support member (600) may be disposed with a damper (not shown).

The support member (600) may include an upper support member (610) and a lower support member (620). However, any one or more of the upper support member (610) and the lower support member (620) may be omitted or changed from the support member (600).

The upper support member (610) may be coupled to an upper surface of bobbin (210) and to an upper surface of housing (310). The upper support member (610) may be integrally formed. At least one portion of upper support member (610) may have elasticity. The upper support member (610) may include an external part (611), an internal part (612) and a connection part (613). However, any one or more of the external part (611), an internal part (612) and a connection part (613) may be omitted or changed from the upper support member (610).

The external part (611) may be coupled with the housing (310). The external part (611) may be integrally formed. The external part (611) may be substantially formed with a square shape. The external part (611) may be coupled with the housing (310) at four areas.

The internal part (612) may be coupled with the bobbin (210). The internal part (612) may be integrally formed. The internal part (612) may be substantially formed with a round shape. The internal part (612) may be coupled with the bobbin (210) at eight areas.

The connection part (613) may connect the external part (611) and the internal part (612). The connection part (613) may be formed by being bent at least twice. The connection part (613) may have elasticity. The connection part (613) may elastically connect the external part (611) and the internal part (612).

The lower support member (620) may be coupled with a lower surface of bobbin (210) and with a lower surface of housing (310). At least one portion of lower support member (620) may have elasticity. The lower support member (620) may supply an electric power to the driving coil (220) by being divided to a pair of lower support member (620). The lower support member (620) may include first and second support units (6201, 6202). The lower support member (620) may include the first and second support units (6201, 6202), each spaced apart and electrically connected to the driving coil (220). However, any one or more of the first and second support units (6201, 6202) may be omitted or changed from the lower support member (620).

The lower support member (620) may include an external part (621), an internal part (622), a connection part (623) and a terminal part (624). However, any one or more of the external part (621), the internal part (622), the connection part (623) and the terminal part (624) may be omitted or changed from the lower support member (620).

The external part (621) may be coupled with the housing (310). The external part (621) may be formed with two pieces, each being spaced apart from the other. The external part (621) may be fixed between the housing (310) and the base (500). The external part (621) may include a hole coupled with a protrusion downwardly protruded from a lower surface of housing (310).

The internal part (622) may be coupled with the bobbin (210). The internal part (622) may be formed in two pieces, each spaced apart from the other. The internal part (622) may be substantially formed with a semi-circular shape. The internal part (622) may be coupled with the bobbin (210) at eight (8) areas.

The connection part (623) may connect the external part (621) and the internal part (622). The connection part (623) may be bent at least twice. The connection part (623) may have elasticity. The connection part (623) may elastically connect the external part (621) and the internal part (622).

The terminal part (624) may be extended from the external part (621). The terminal part (624) may be extended by being downwardly bent from the external part (621). A lower end of terminal part (624) may be coupled with a PCB. At least one portion of terminal part (624) may be extended along a lateral surface of one side of base (500). At least one portion of terminal part (624) may be disposed at the first reception part (530). In the present exemplary embodiment, because the PCB mounted with an image sensor is disposed with a terminal part (624) directly connecting the lower support member (620), a conductive line can simplified and shortened over the lower support member (620) being electrically connected to the PCB through a substrate (400) to thereby reduce resistance generated in the course of supplying an electricity for AF driving. Furthermore, in the present exemplary embodiment, there is no process of coupling the lower support member (620) to the substrate (400) whereby workability can be enhanced and enhanced peak and increased productivity can be expected. Furthermore, reliability of produced products can be secured.

The sensing unit (700) may be provided by detecting position information of lens module for autofocus feedback function. The sensing unit (700) may include a sensing magnet (710) and a sensor (720). The sensing magnet (710) may be disposed at one side of bobbin (210). The sensor (720) may detect the sensing magnet (710) by being disposed at the housing (310). Meantime, the compensation magnet (730) is a member disposed to form a magnetic balance with the sensing magnet (710) and therefore may be interpreted as a member included in the sensing unit (700). Alternatively, the compensation magnet (730) may be interpreted as being a separate member from the sensing unit (700).

The sensing unit (700) may include a sensing magnet (710) and a sensor (720). However, any one or more of the sensing magnet (710) and the sensor (720) may be omitted or changed from the sensing unit (700).

The sensing magnet (710) may be disposed at the bobbin (210). The sensing magnet (710) may be formed at the bobbin (210). The sensing magnet (710) may be detected by the sensor (710). The sensing magnet (710) may be disposed at a corner of bobbin (210). The sensing magnet (710) may be disposed at a first corner part (221) of bobbin (210). The sensing magnet (710) may be so disposed as to face the first corner part (305) of housing (310). The sensing magnet (710) may be disposed on an imaginary straight line based on a center of bobbin (210). The sensing magnet (710) may be symmetrical with the compensation magnet (730) based on a center of bobbin (210). The sensing magnet (710) may have magnetism corresponding to that of the compensation magnet (730). The sensing magnet (710) may be disposed at one side of bobbin (210). The sensing magnet (710) may be overlapped with the driving coil (220) to a direction perpendicular to an optical axis.

The sensing magnet (710) may be disposed at an outside of driving coil (220). The sensing magnet (710) may be interposed between the driving coil (220) and the sensor (720). In this case, a distance between the sensing magnet (710) and the sensor (720) can be closer over a case where the sensing magnet (710) is disposed at an inside of the driving coil (220) to thereby increase a detection value detected by the sensor (720). The sensing magnet (710) may be disposed in consideration of relative position so that the sensing magnet (710) can use only a section where four poles are magnetized to allow a Hall output to be outputted in a positive number. The sensing magnet (710) may be so formed as to allow an upper inner side to have S pole, an upper outer side to have N pole, an inner lower side to have N pole and an outer lower side to have S pole, for example, as illustrated in FIG. 4.

An upper surface and a lower surface of sensing magnet (710) may be fixed to the bobbin (210). The upper surface of sensing magnet (710) may be fixed to the bobbin (210). The lower surface of sensing magnet (710) may be fixed to the bobbin (210). A portion of upper surface of sensing magnet (710) may be fixed to the bobbin (210). The other remaining portion of upper surface of sensing magnet (710) may be opened. A portion of lower surface of sensing magnet (710) may be fixed to the bobbin (210). The other remaining portion of lower surface of sensing magnet (710) may be opened. The upper surface and a lower surface of sensing magnet (710) may be correspondingly form-fitted (形合) to the bobbin (210). The upper surface and a lower surface of sensing magnet (710) may be coupled to the bobbin (210). At least one portion of upper surface of sensing magnet (710) and at least one portion of lower surface of sensing magnet (710) may be fixed to the bobbin (210) using an adhesive. At least one portion of upper surface of sensing magnet (710) may be fixed to the bobbin (210) using an adhesive. At least one portion of lower surface of sensing magnet (710) may be fixed to the bobbin (210) using an adhesive. At least one portion of upper surface of sensing magnet (710) and at least one portion of lower surface of sensing magnet (710) may be coupled to the bobbin (210) using an adhesive. In the present exemplary embodiment, because both an upper surface and a lower surface of sensing magnet (710) are fixed to the bobbin (210), a position of sensing magnet (710) to an optical axis direction (vertical direction, z axis direction, horizontal direction) may be constantly maintained in all products even if amount of adhesive coated between the sensing magnet (710) and the bobbin (210) is not constant per product in the course of manufacturing process.

At least one portion of upper surface of sensing magnet (710) may be exposed to an upper side through an upper open hole (232). The upper surface of sensing magnet (710) may be fixed to the bobbin (210) by an adhesive infused through the upper open hole (232). The lower surface of sensing magnet (710) may be fixed to the bobbin (210) by an adhesive infused through a lower open hole (234). The adhesive infused through the upper open hole (232) and the lower open hole (234) may be penetrated between the magnet (710) and the bobbin (210) by the osmotic pressure.

The sensing magnet (710) may be spaced apart from the driving coil (220). The sensing magnet (710) may be spaced apart from the driving coil (220) by 80 μm. In this case, even if there is a defect in the winding of driving coil (220), the sensing magnet (710) can be spaced apart from the driving coil (220).

An upper end of sensing magnet (710) may be disposed at a position higher than an upper end of coil (220). The lower end of sensing magnet (710) may be disposed at a position lower than a lower end of coil (220). The sensor (720), the sensing magnet (710) and the coil (220) may be arranged on an imaginary straight line.

The sensor (720) may be disposed at the housing (310). The sensor (720) may be formed at the housing (310). The sensor may be disposed at a corner part of housing (310). The sensor (720) may be formed at a first corner part (305) of housing (310). The sensor (720) may be disposed at the substrate (400). The sensor (720) may be coupled with the substrate (400). The sensor (720) may be electrically connected to the substrate (400). The sensor 9720) may be mounted on the substrate (400). The sensor (720) may be coupled to the substrate (400) by an SMT (Surface Mounter Technology). The sensor (720) may be mounted on a sensor mounting part (420) of substrate (400). The sensor (720) may detect the sensing magnet (710). The sensor (720) may be disposed at a first corner part (305) of housing (310). The sensor (720) may be disposed on an imaginary straight line connecting the first corner part (305) and a third corner part (307). That is, the sensor (710), the sensing magnet (720) and the compensation magnet (730) may be all disposed on an imaginary straight line connecting the first corner part (305) and the third corner part (307) of housing (310). The sensor (720) may include a Hall sensor (Hall IC) detecting a magnetic field of magnet.

The Hall sensor may be fixed to the housing (310) and the sensing magnet (710) may be fixed to the bobbin (210). When the sensing magnet (710) is moved along with the bobbin (210), a magnetic flux density detected by the Hall element inside the Hall sensor may be changed in response to a relative position of Hall sensor and the sensing magnet (710). The Hall sensor may detect a position of lens module using an output voltage of Hall sensor proportional to a magnetic flux density that changes in response to the relative position of Hall sensor and sensing magnet (710).

An upper surface and a lower surface of sensor (720) may be fixed to the housing (310). The upper surface of sensor (720) may be fixed to the housing (310). The lower surface of sensor (720) may be fixed to the housing (310). A portion of upper surface of sensor (720) may be fixed to the housing (310). The remaining other portion of upper surface of sensor (720) may be opened. A portion of lower surface of sensor (720) may be fixed to the housing (310). The remaining portion of lower surface of sensor (720) may be opened. The upper surface and the lower surface of sensor (720) may be correspondingly form-fitted (形合) to the housing (310). The upper surface and the lower surface of sensor (720) may be coupled to the housing (310). At least one portion of upper surface of sensor (720) and at least one portion of lower surface of sensor (720) may be fixed to the housing (310) using an adhesive. At least one portion of upper surface of sensor (720) may be fixed to the housing (310) using an adhesive. At least one portion of lower surface of sensor (720) may be fixed to the housing (310) using an adhesive. At least one portion of upper surface of sensor (720) and at least one portion of lower surface of sensor (720) may be coupled to the housing (310) using an adhesive. In the present exemplary embodiment, because both the upper surface and a lower surface of sensor (720) are fixed to the housing (310), a position of sensor (720) to an optical axis direction (vertical direction, z axis direction, horizontal direction) may be constantly maintained in all products even if amount of adhesive coated between the sensor (720) and the housing (310) is not constant per product in the course of manufacturing process.

One lateral surface of both lateral surfaces of sensor (720) may be opened. One lateral surface of both lateral surfaces of sensor (720) may not be coupled to the housing (310). One lateral surface of both lateral surfaces of sensor (720) may not be contacted to the housing (310). The other lateral surface of both lateral surfaces of sensor (720) may be fixed by being in close contact with the housing (310). The other lateral surface of both lateral surfaces of sensor (720) may be surface-contact a lateral guide part (333) of housing (310). The characteristics thus described may be generated because the sensor (7200 is slidingly coupled to the housing (310) from a lateral direction. That is, in the present exemplary embodiment, the sensor (720) may be coupled by being inserted between a lower guide part (331) and an upper guide part (332) from a lateral side of housing (310) using a sliding method while being coupled to the substrate (400).

An least one surface among the upper surface, a lower surface, the other lateral surface (opposite to one surface) of the both lateral surfaces and an inner surface may be fixed to the housing (310) by an adhesive. An least one surface among the upper surface, a lower surface, the other lateral surface (opposite to one surface) of the both lateral surfaces and an inner surface may be coupled to the housing (310) by an adhesive. An least one surface among the upper surface, a lower surface, the other lateral surface (opposite to one surface) of the both lateral surfaces and an inner surface may be directly contacted to the housing (310) by an adhesive.

The lens driving device according to an exemplary embodiment may further comprise a compensation magnet (730). The compensation magnet (730) may be provided to implement a magnetic force balance with the sensing magnet (710). The compensation magnet (730) may be disposed at the bobbin (210). The compensation magnet (730) may be accommodated into a compensation magnet reception part (240) of bobbin (210). The compensation magnet (730) may be disposed to be symmetrical with the sensing magnet (710) base on a center of optical axis. The compensation magnet (730) may be symmetrical with the sensing magnet (710) based on a center of optical axis. The compensation magnet (730) may be formed with a magnetism corresponding to that of sensing magnet (710). The compensation magnet (730) may be disposed at the other side of bobbin (210) corresponding to an opposite side of one side of bobbin (210) where the sensing magnet (710) is situated. The compensation magnet (730) may be disposed on an imaginary straight line connecting the first corner part (305) and the third corner part (307). The compensation magnet (730) may be symmetrically disposed based on a center of the sensing magnet (710) and the bobbin (210). Through this structure, there may be implemented an electromagnetic balance between the sensing magnet (710) and the compensation magnet (730). As a result, an influence affected to the electromagnetic interaction between the sensing magnet (710) and the driving coil (220) may be minimized.

In the exemplary embodiment, the sensing magnet (710) and the sensor (720) may be assembled on a normal position to an optical axis direction. The sensing magnet (710) and the sensor (720) in the exemplary embodiment are elements for autofocus feedback, such that it is necessary to accurately detect the movement to an optical axis direction of bobbin (210) fixed by the lens module. Meantime, the problem was that the sensing magnet (710) and the sensor (720) were conventionally assembled by being deviated to an optical axis direction from a normal position in response to manufacturing dimensions, errors, assembly tolerance and amount of coated adhesive. In this case, the movement of bobbin (210) to an optical axis direction is detected to be erroneous, the auto focus feedback was not properly operated. In the present exemplary embodiment, as explained above, the sensing magnet (710) and the sensor (720) are assembled on a normal position to the optical axis direction, whereby the conventional problem can be overcome.

Hereinafter, operation of camera module according to an exemplary embodiment will be described.

To be more specific, the auto focus function of camera module according to an exemplary embodiment will be explained.

When an electric power is supplied to a driving coil (220), the driving coil (220) may move relative to the driving magnet (320) through the electromagnetic interaction between the driving coil (220) and the driving magnet (320). At this time, the bobbin (210) coupled by the driving coil (220) may integrally move with the driving coil (220). That is, the bobbin (210) coupled therein with the lens module may move to an optical axis direction relative to the housing (310). This movement of bobbin (210) may result in the lens module moving closely to or distantly from the image sensor, whereby the focus adjustment on a subject can be implemented by supplying an electric power to the driving coil (220) according to the present exemplary embodiment of the present invention.

Meanwhile, the camera module according to the present exemplary embodiment of the present invention may be applied with an auto focus feedback in order to implement a more accurate auto focus function. The sensor (720) disposed at the housing (310) may detect a magnetic field of sensing magnet (710) fixed to the bobbin (2210). Thus, when the bobbin (210) implements a relative movement to the housing (310), a distance between the sensor (720) and the sensing magnet (710) may be changed to thereby change the amount of magnetic field detected by the sensor (720). The sensor (720) may transmit a detection value to the controller by detecting a movement of optical axis direction of bobbin (210) or a position of bobbin (210) using the abovementioned method. The controller may determine whether to implement an additional movement relative to the bobbin (210) through the received detected value. These series of processes are generated in real time, whereby the auto focus function of camera module according to the present exemplary embodiment can be more accurately performed through the auto focus feedback.

The abovementioned exemplary embodiments have been explained by an autofocus function-enabled AF models. However, in modifications to the exemplary embodiments, the housing (310) and the bobbin (210) may be spaced apart, and the lateral support member may movably support the housing (310) relative to the bobbin (210), and an OIS coil part may be disposed to face the driving magnet (320) at an upper surface of base (500). That is, the modifications to the exemplary embodiments may be implemented with an OIS function along with the auto focus function.

FIGS. 19 to 31 illustrate a second exemplary embodiment of present invention.

Hereinafter, any one of the driving coil (1220) and the driving magnet (1320) may be called a "first driving part", and remaining one may be called a "second driving part". Hereinafter, in an exemplary embodiment of the present invention, although a structure of the driving coil (1220) being disposed at the bobbin (1210) and the driving magnet (1320) being disposed at the housing (1310) is to be explained, the driving coil (1220) may be disposed at the housing (1310) and the driving magnet (1320) may be disposed at the bobbin (1210) according to a modification of the present invention.

Hereinafter, one of a driving magnet (1320), a sensing magnet (1710) and a compensation magnet (1720) may be called a "first magnet" and another may be called a "second magnet" and the remaining one may be called a "third magnet".

Although the exemplary embodiments in the following description have explained that a lower support member (1620) is electrically connected to a substrate (1400), any one or more of the lower support member (1620) and the upper support member (1610) may be electrically connected to the substrate (1400) as a modification to the present invention. The electrically conductive structure between the upper support member (1610) and the substrate (1400) in the modification of the present invention may be inferably applied to an explanation of an electrically conductive structure between the lower support member (1620) and the substrate (1400). Hereinafter, a first pad (1441) and a second pad (1442) may be collectively called a "terminal (1441, 1442)".

Hereinafter, configuration of lens driving device according to a first exemplary embodiment of present invention will be described with reference to accompanying drawings.

Figure 19:
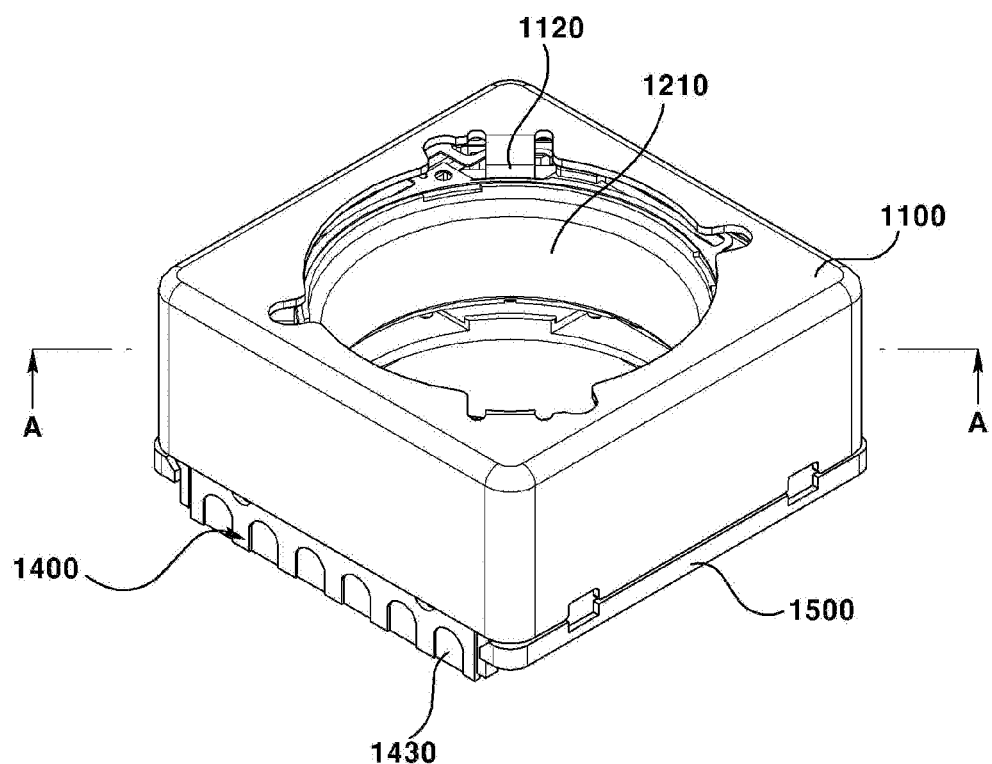
FIGS. 19 to 31 are illustrations of second exemplary embodiment of the present invention.
Figure 20:
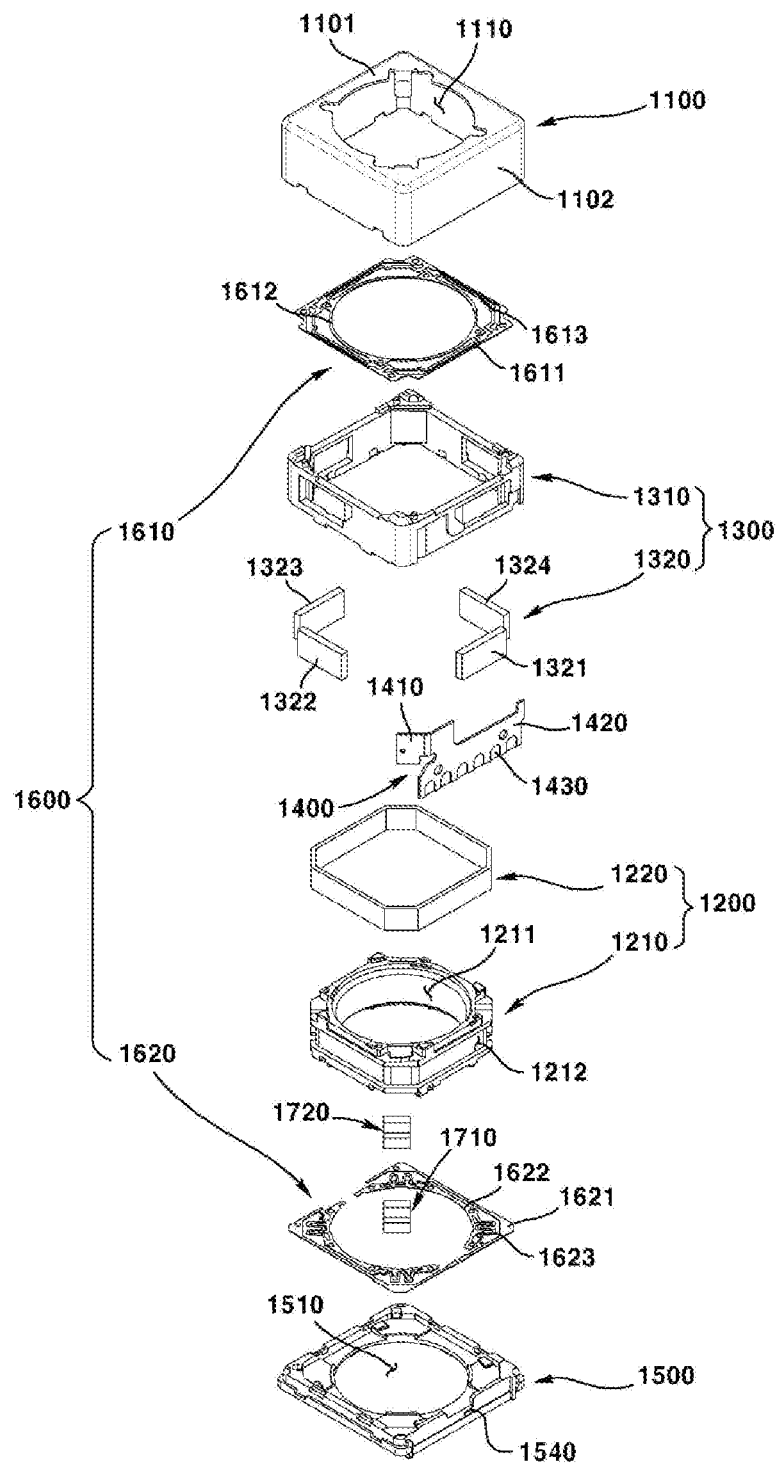
Figure 21:
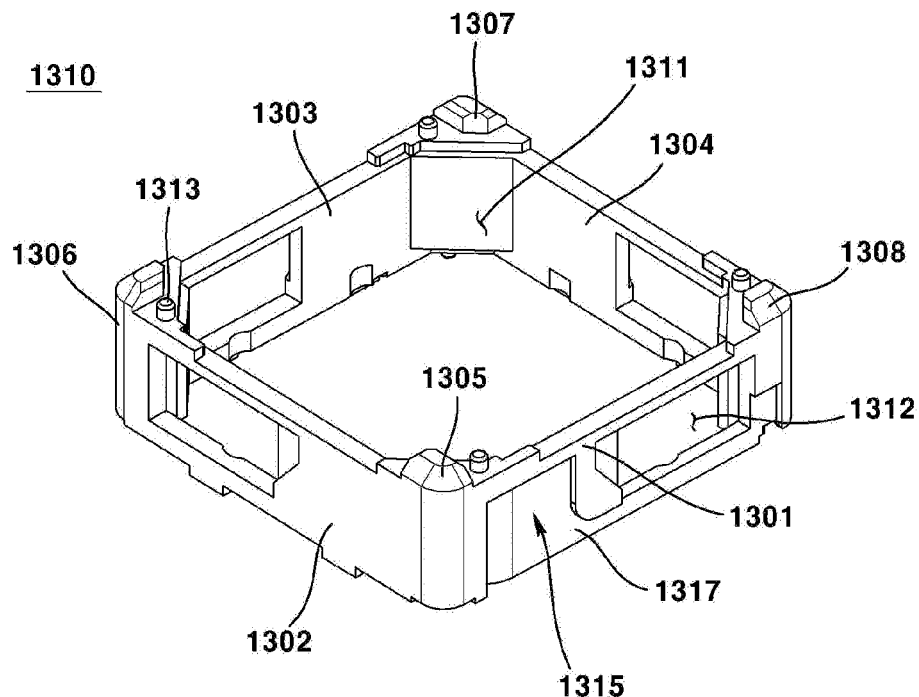
Figure 22:
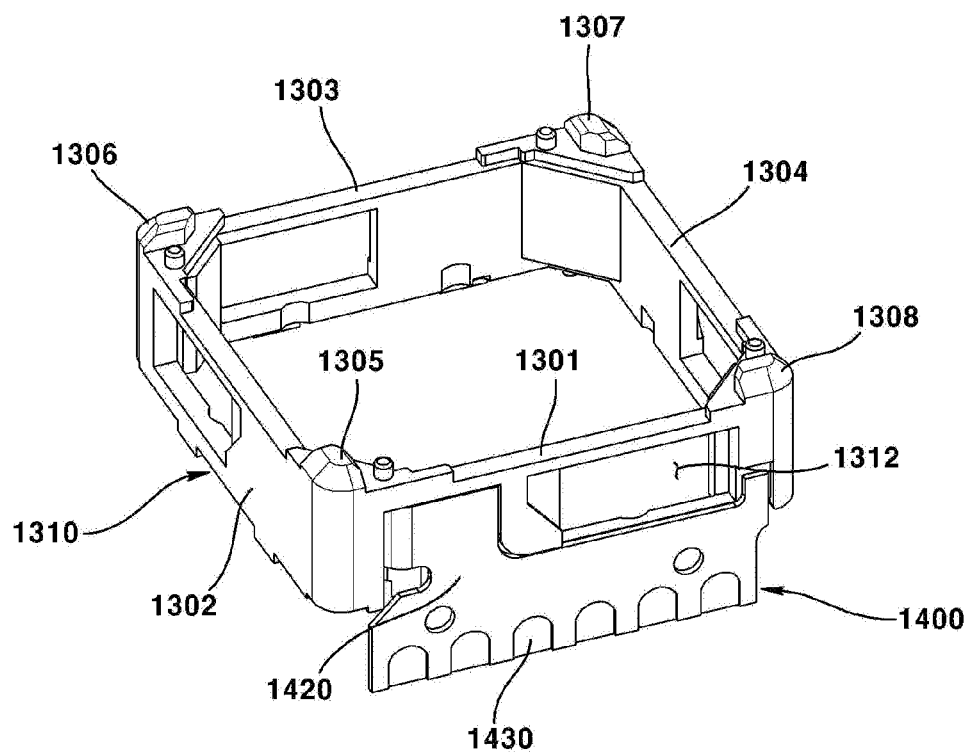
Figure 23:
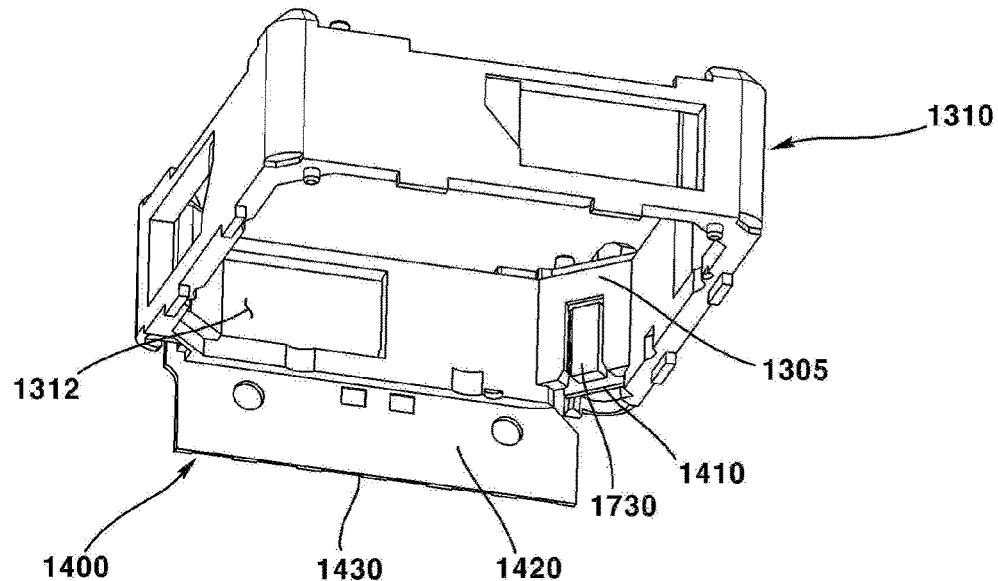
Figure 24:
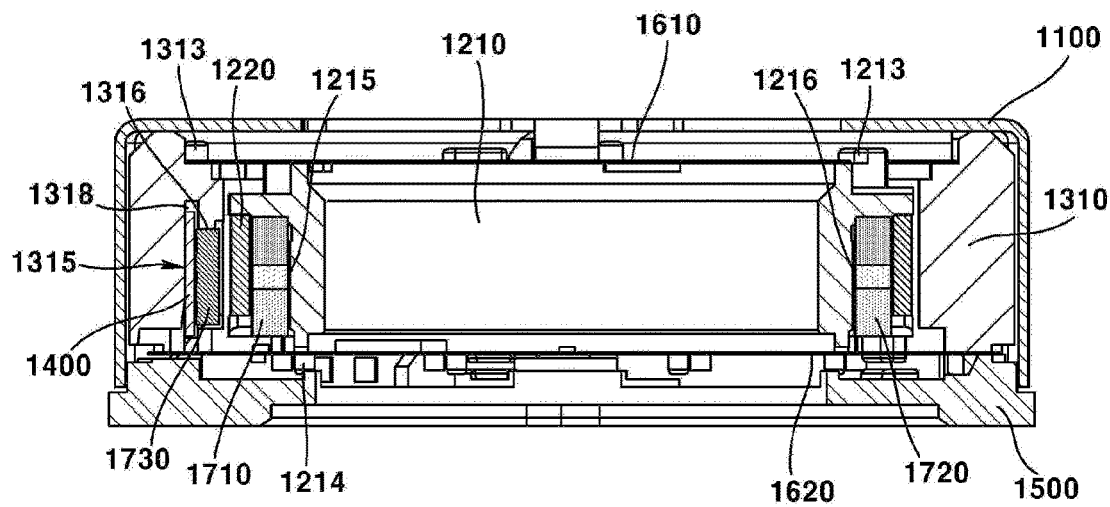
Figure 25:
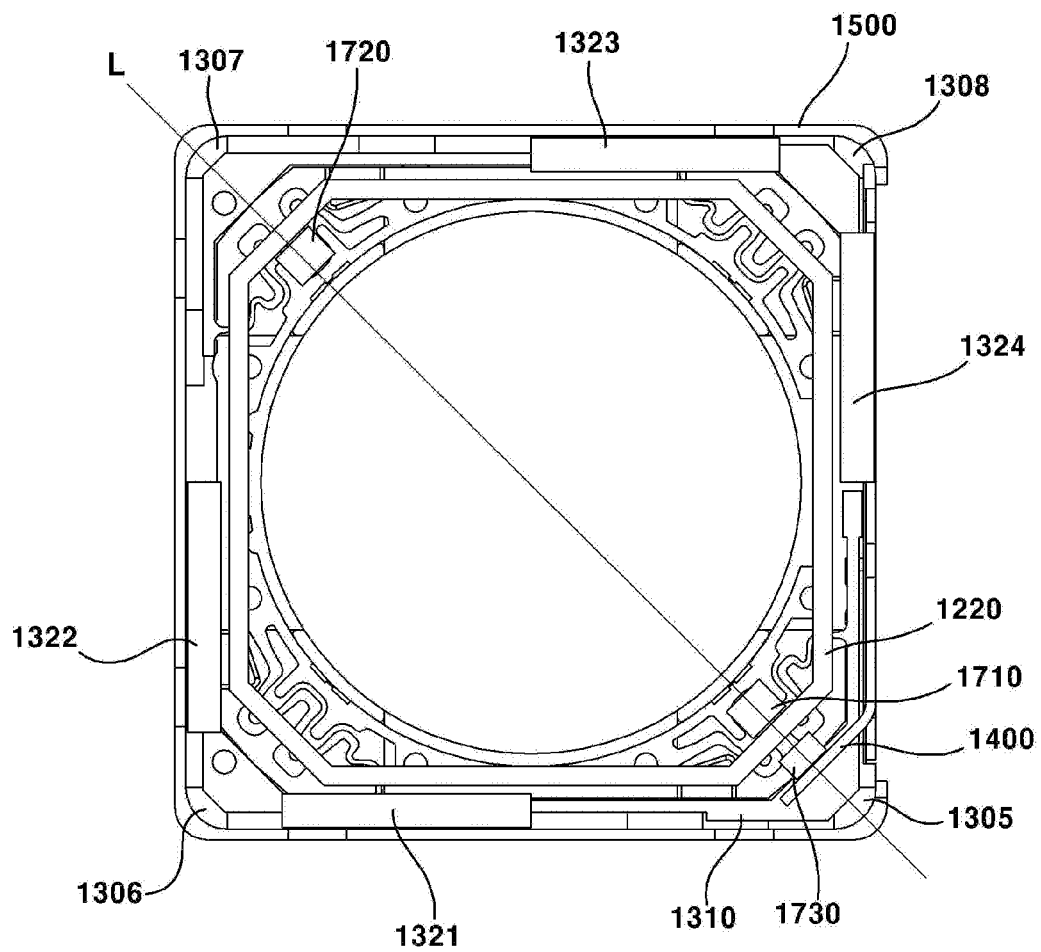
Figure 26:
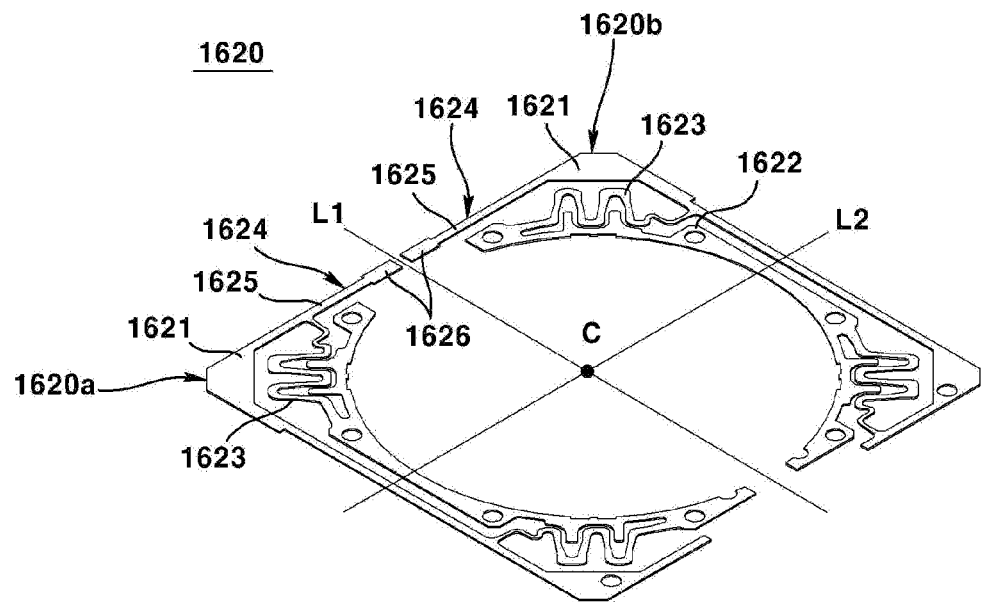
Figure 27:
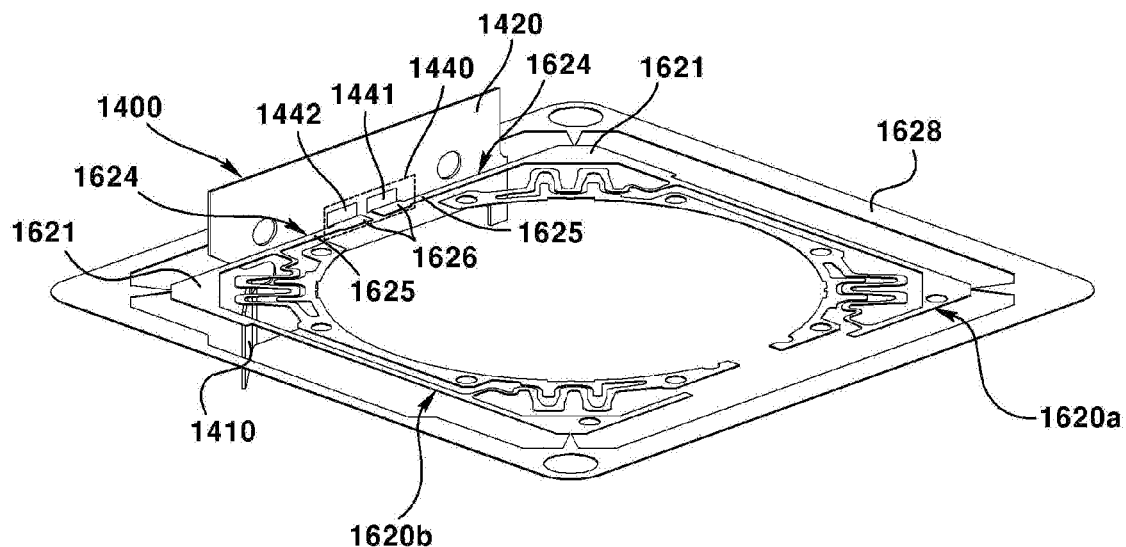
Figure 28:
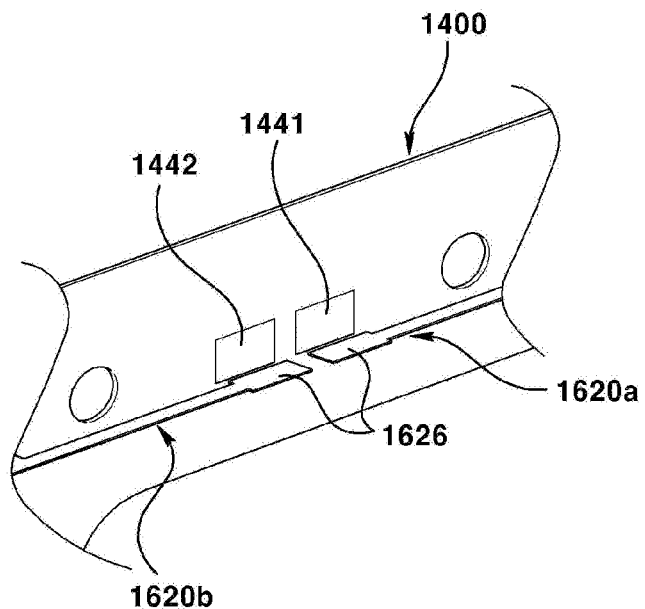

FIG. 19 is a perspective view illustrating a lens driving device according to a first exemplary embodiment of present invention, FIG. 20 is an exploded perspective view illustrating a lens driving device according to a first exemplary embodiment of present invention, FIG. 21 is a perspective view illustrating a housing of a lens driving device according to an exemplary embodiment of present invention, FIG. 22 is a perspective view illustrating a coupled state between a housing of a lens driving device and a substrate according to a first exemplary embodiment of the present invention, FIG. 23 is a bottom perspective view illustrating a coupled state between a housing of a lens driving device and a substrate according to a first exemplary embodiment of the present invention, FIG. 24 is a cross-sectional view taken along line A-A of FIG. 1, FIG. 25 is a plane view illustrating some elements of a lens driving device according to a first exemplary embodiment of present invention, FIG. 26 is a perspective view illustrating a lower support member of a lens driving device according to a first exemplary embodiment of the present invention, FIG. 27 is a bottom perspective view illustrating a coupled state between a lower support member of a lens driving device and a substrate according to a first exemplary embodiment of the present invention, and FIG. 28 is a bottom perspective view illustrating some elements of a lens driving device according to a first exemplary embodiment of present invention.

The lens driving device according to a first exemplary embodiment of present invention may include a cover member (1100), a mover (1200), a stator (1300), a substrate (1400), a base (1500), a support member (1600) and a sensing unit. However, any one or more of the cover member (1100), the mover (1200), the stator (1300), the substrate (1400), the base (1500), the support member (1600) and the sensing unit may be omitted or changed from the lens driving device according to the present exemplary embodiment. Particularly, the sensing unit may be omitted as an element for auto focus feedback function.

The cover member (1100) may form an exterior look of the lens driving device. The cover member (1100) may take a bottom-opened cubic shape. However, the present invention is not limited thereto.

The cover member (1100) may be formed with a metal material. To be more specific, the cover member (1100) may be formed with a metal plate. In this case, the cover member (1100) can shield an EMI (Electro Magnetic Interference). Because of the characteristics of the cover member (1100) thus described, the cover member (1100) may be called an "EMI shield can". The cover member (1100) may shield the electromagnetic waves generated from an outside of the lens driving device from entering into the cover member (1100). Furthermore, the cover member (1100) may prevent the electromagnetic waves generated from inside of the cover member (0100) from being emitted to an outside of the cover member (1100). However, the material of the cover member (1100) is not limited thereto.

The cover member (1100) may include an upper plate (1101) and a lateral plate (1102). The cover member (1100) may include an upper plate (1101) and a lateral plate (1102) extended downwardly from an outside of the upper plate (1101). A lower end of the lateral plate (1102) at the cover member (1100) may be mounted on a base (1500). The cover member (1100) may be mounted at an inner lateral surface on the base (1500) by being in close contact, in part or in whole, with a lateral surface of base (1500). An inner space formed by the cover member (1100) and the base (1500) may be disposed with a mover (1200), a stator (1300) and a support member (1600). Through this type of structure, the cover member (1100) may protect an inner element from the outside shock or, at the same time, prevent the infiltration of outside pollution materials. However, a lower end at the lateral plate (1102) of cover member (1100) may be directly coupled with a PCB disposed at a lower side of base (1500).

The cover member (1100) may include an opening (1110) formed at the upper plate (1101) to expose the lens module. The opening (1110) may be formed with a shape corresponding to that of the lens module. The opening (110) may be formed to be larger in size than a diameter of the lens module to allow the lens module to be assembled through the opening (1110). Meantime, a light introduced into through the opening (1110) may pass through the lens module. At this time, the light having passed the lens module may be obtained by an image sensor as an image.

The cover member (1100) may include a rotation prevention part (1120) extended from an inner side of the upper plate (101) to a lower side to prevent the bobbin (1210) from rotating. The rotation prevention part (1120) may be accommodated into a groove of bobbin (1210) to allow at least one portion of lateral surface of rotation prevention part (1120) to be in contact with the bobbin (1210) when the bobbin (1210) rotates.

The mover (200) may include a bobbin (1210) and a driving coil (1220). The mover (1200) may include a bobbin (1210) coupled by the lens module. The mover (1200) may include a bobbin (1210) disposed at an inside of the housing (1310). The mover (1200) may include a driving coil (1220) disposed at the bobbin (1210). The mover (1200) may include a driving coil (1220) facing a driving magnet (1320). The mover (1200) may integrally move along with the lens module through an electromagnetic interaction with the stator (1300).

The bobbin (1210) may be disposed at an inside of the housing (1310). The bobbin (1210) may be disposed with a driving coil (1220). The bobbin (1210) may be coupled with the support member (1600). An upper surface of bobbin (1210) may be coupled by an upper support member (1610). A lower surface of bobbin (1210) may be coupled with a lower support member (1610). The bobbin (1210) may be disposed with a sensing magnet (1710). The bobbin (1210) may be disposed at one side with a sensing magnet (1710), and may be disposed at the other side with a compensation magnet (1720). The bobbin (1210) may be coupled with the lens module. An inner surface of bobbin (1210) may be coupled with an outer surface of lens module. The bobbin (1210) may move to an optical axis direction relative to the housing (1310).

The bobbin (1210) may include a lens coupling part (1211), a first driving part coupling part (1212), an upper coupling part (1213), a lower coupling part (1214), a sensing magnet reception part (1215) and a compensation magnet reception part (1216).

The bobbin (1210) may include a lens coupling part (1211) formed thereinside. The lens coupling part (1211) may be coupled with the lens module.

An inner peripheral surface of lens coupling part (1211) may be formed with a screw thread in a shape corresponding to that of a screw thread formed at an outer peripheral surface of the lens module. That is, the lens coupling part (1211) may be screw-connected with the lens module. An adhesive may be interposed between the lens module and the bobbin (1210). At this time, the adhesive may be an epoxy cured by a UV or heat. Furthermore, the lens module and the bobbin (210) may be bonded by a UV-curing and/or a heat-curing epoxy.

The bobbin (1210) may include a first driving part coupling part (1212) wound by or mounted with a driving coil (1220). The first driving part coupling part (1212) may be integrally formed with an outer circumferential surface of bobbin (1210). Furthermore, the first driving part coupling part (1212) may be continuously formed along the outer circumferential surface of bobbin (1210) or may be spaced apart at a predetermined distance. For example, the first driving part coupling part (1212) may be formed by allowing a portion of the outer circumferential surface of bobbin (1210) to be correspondingly recessed with a shape of the driving coil (1220). At this time, the driving coil (1220) may be directly wound on the first driving part coupling part (1212). As a modification, the first driving part coupling part (1212) may be formed with an upper side or a lower side being opened. At this time, the driving coil (1220) may be insertedly coupled with the first driving part coupling part (1212) through the opened area while being in a pre-wound state.

The bobbin (1210) may include an upper coupling part (1213) coupled with the upper support member (1610). The upper coupling part (1213) may be coupled with an internal part (1612) of upper support member (1610). For example, a protrusion of upper coupling part (1213) may be coupled by being inserted into a hole or a groove of the internal part (1612). At this time, the protrusion of upper coupling part (1213) may be melted while being inserted into the hole of internal part (1612) to thereby fix the upper support member (1610).

The bobbin (1210) may include a lower coupling part (1214) coupled with the lower support member (1620). The lower coupling part (1214) may be coupled with an internal part (1622) of lower support member (1620). For example, a protrusion of lower coupling part (1214) may be coupled by being inserted into a hole or a groove of the internal part (1622). At this time, the protrusion of lower coupling part (1214) may fix the lower support member (1620) by being melted while being inserted into the hole of the internal part (1622).

The bobbin (1210) may include a sensing magnet reception part (1215) accommodated by a sensing magnet (1710). The sensing magnet reception part (1215) may be integrally formed at one side of bobbin (1210). The sensing magnet reception part (1215) may accommodate the sensing magnet (1710). The sensing magnet reception part (1215) may be formed by being inwardly recessed from the first driving part coupling part (1212).

The bobbin (1210) may include a compensation magnet reception part (1216) accommodated by a compensation magnet (1720). The compensation magnet reception part (1216) may be formed at the other side of bobbin (1210) corresponding to an opposite side of one side of the bobbin (1210) formed by the sensing magnet reception part (1215). The compensation magnet reception part (1216) may accommodate the compensation magnet (1720). The compensation magnet reception part (1216) may be formed by being inwardly recessed from the first driving part coupling part (1212). The compensation magnet reception part (1216) may be disposed to be symmetrical with the sensing magnet reception part (1215) from a center of bobbin (1210). In this case, the magnetism of sensing magnet (1710) accommodated into the sensing magnet reception part (1215) and the magnetism of compensation magnet (1720) accommodated into the compensation magnet reception part (1216) may be symmetrical. Through this structure, an electromagnetic balance may be realized between the sensing magnet (1710) and the compensation magnet (1720). As a result, an influence may be minimized that is affected by the sensing magnet (1710) to an electromagnetic interaction between the driving coil (1220) and the driving magnet (1320).

The driving coil (1220) may be disposed at the bobbin (1210). The driving coil (1220) may face the driving magnet (1320). The driving coil (1220) may interact with the driving magnet (1320). The driving coil (1220) may electromagnetically interact with the driving magnet (1320). The driving coil (1220) may move the bobbin (1210) relative to the housing (1310) through the electromagnetic interaction with driving magnet (1320). The driving coil (1220) may be overlapped with the sensing magnet (1710) to a direction perpendicular to an optical axis. The driving coil (1220) may be disposed at an outside of the sensing magnet (1710).

The driving coil (1220) may include at least one coil. The driving coil (1220) may be guided to the first driving part coupling part (1212) by being formed with a single coil to be wound on an outside of the bobbin (1210). Furthermore, as a modification, the driving coil (1220) may be formed with four independent coils to allow being disposed at an outside of bobbin (1210) so that two adjacent coils can mutually form a 90° angle.

The driving coil (1220) may include a pair of lead cables (not shown) in order to supply an electric power. The pair of lead cables of driving coil (1220) may be electrically connected to a first support unit (1620a) and a second support unit (1620b), both of which are classification elements of the lower support member (1620).

A distal end of one side of the driving coil (1220) may be electrically connected to a substrate (1740) through the first support unit (1620a). The other end of one side of the driving coil (1220) may be electrically connected to the substrate (1740) through the second support unit (1620b). Alternatively, the driving coil (1220) may receive the power through the upper support member (1610). Meantime, when a power is supplied to the driving coil (1220), an electromagnetic field may be formed about the driving coil (1220). As a modification, the bobbin (1210) may be disposed with the driving magnet (1320), and the housing (1310) may be disposed with the driving coil (1220). That is, the driving coil (1220) and the driving magnet (1320) may be disposed by exchanging mutual positions.

The stator (1300) may be disposed at an outside of mover (1200). The stator (1300) may be selectively spaced apart from the mover (1200). The stator (1300) may be supported by the base (1500) disposed at a lower side. However, it may be also explained that the base (1500) is a fixed member and the stator (1300) includes the base (1500). The stator (1300) may be disposed at an inner space of the cover member (1100). The stator (1300) may move the mover (1200) through the electromagnetic interaction.

The stator (1300) may include a housing (1310) disposed at an outside of bobbin (1210). The stator (1300) may include a driving magnet (1320) disposed opposite to the driving coil (1220) and fixed to the housing (1310). The housing (1310) may be spaced apart from the bobbin (1210). The housing (1310) may be disposed at an outside of bobbin (1210). The housing (1310) may be coupled with the substrate (1400). The housing (1310) may be disposed with a driving magnet (1320). The housing (1310) may be coupled with the support member (1600). The housing (1310) may be coupled at an upper surface with an upper support member (1610). The housing (1310) may be coupled at a lower surface with a lower support member (1620). The housing (1310) may be formed with a shape corresponding to that of an inner surface of cover member (1100). The housing (1310) may be formed with an insulation material. The housing (1310) may be formed with an injection mold in consideration of productivity. The housing (1310) may be fixed on the base (1500). Alternatively, the housing (1310) may be omitted and the driving magnet (1320) may be directly fixed to the cover member (1100).

The housing (1310) may include continuously disposed first to second lateral surfaces (1301, 1302, 1303, 1304). The housing (1310) may include first to fourth corner parts (1305, 1306, 1307, 1308), each spaced apart from the other. The housing (1310) may include a first corner part (1305) disposed between first and second lateral surfaces (1301, 1302). The housing (1310) may include a second corner part (1306) interposed between the second and third lateral surfaces (1302, 1303). The housing (1310) may include a third corner part (1307) interposed between the third and fourth lateral surfaces (1303, 1304). The housing (1310) may include a fourth corner part (1308) interposed between the fourth and first lateral surfaces (1304, 1301). At this time, the first corner part (1305) may be disposed with a sensor (1730). However, the present invention is not limited thereto.

The housing (1310) may include an inner space (1311), a second driving part coupling part (1312), an upper coupling part (1313), a lower coupling part (not shown) and a sensor substrate reception part (1315). The housing (1310) may be opened at an upper side and a lower side to movably accommodate the bobbin (1210) to an optical axis direction. The housing (1310) may include therein an inner space (1311). The inner space (1311) may be movably disposed with a bobbin (1210). That is, the inner space (1311) may be formed with a shape corresponding to that of the bobbin (1210). Furthermore, an inner surface of housing (1310) forming the inner space (1311) may be spaced apart from an outer surface of the bobbin (1210).

The housing (1310) may include at a lateral surface a second driving part coupling part (1312) formed in a shape corresponding to that of the driving magnet (1320) to accommodate the driving magnet (1320). The second driving part coupling part (1312) may fix the driving magnet (1320) by accommodating the driving magnet (1320). The second driving part coupling part (1312) may be formed by passing through a lateral surface of housing (1310). Alternatively, the second driving part coupling part (1312) may be formed by being recessed on an inner surface of housing (1310). The second driving part coupling part (1312) may be disposed by being leaned toward a second corner part (1306) side and to a fourth corner part (1308) side. Through this structure, an electromagnetic interference between the driving magnet (1320) coupled to the second driving part coupling part (1312) and the sensing magnet (1710) and/or the compensation magnet (1720) may be minimized.

The housing (1310) may include an upper coupling part (1313) coupled with the upper support member (1610). The upper coupling part (1313) may be coupled with an external part (1611) of upper support member (1610). For example, a protrusion of the upper coupling part (1313) may be coupled by being inserted into a hole or a groove of the external part (1611). At this time, the protrusion of upper coupling part (1313) may be melted to fix the upper support member (1610) while being inserted into a hole of the external part (1611).

The housing (1310) may include a lower coupling part coupled with the lower support member (1620). The lower coupling part may be coupled with an external part (1621)

of lower support member (1620). At this time, the protrusion of lower coupling part may be melted to fix the lower support member while being inserted into a hole of an external part (1621). Alternatively, the external part (1621) of lower support member (1620) may be inserted between a lower surface of housing (1310) and an upper surface of base (1500) and fixed by a pressing method.

The housing (1310) may be formed with a sensor substrate reception part (1315). The sensor substrate reception part (1315) may be formed on the housing (1310). The sensor substrate reception part (1315) may accommodate at least one portion of substrate (1400). The sensor substrate reception part (1315) may include a first reception groove (1316) formed by being outwardly recessed from an inner surface of first corner part (1305). The sensor substrate reception part (1315) may include a second reception groove (1317) formed by being inwardly recessed from an outer surface of first lateral surface (1301) of housing (1310). The sensor substrate reception part (1315) may include a third reception groove (1318) formed by being upwardly recessed from a lower surface of first lateral surface (1301) of housing (1310).

The first reception groove (1316) may be formed by being outwardly recessed from an inner surface of first corner part (1305) of housing (1310). The second reception groove (1317) may be formed by being inwardly recessed from an outer surface of first lateral surface (1301) of housing (1310). The first reception groove (1316) and the second reception groove (1317) may be mutually communicated. The third reception groove (1318) may be formed by being upwardly recessed from a lower surface of first lateral surface (1301) of housing (1310). The first, second and third reception grooves (1316, 1317, 1308) may be mutually communicated. The first, second and third reception grooves (1316, 1317, 1308) may accommodate at least one portion of substrate (1400) and the sensor (1730).

The driving magnet (1320) may be disposed at the housing (1310). The driving magnet (1320) may face the driving coil (1220). The driving magnet (1320) may move the bobbin (1210) by interacting with the driving coil (1220). The driving magnet (1320) may move the bobbin (1210) through an electromagnetic interaction with the driving coil (1220). The driving magnet (1320) may be fixed to the second driving part coupling part (1312) of housing (1310). The driving magnet (1320) may be adhered to the housing (1310) using an adhesive.

The driving magnet (1320) may include at least one magnet. The driving magnet (1320) may include first to fourth magnets (1321, 1322, 1323, 1324). The driving magnet (1320) may include a first magnet (1321) disposed at the first lateral surface (1301), a second magnet (1322) disposed at the second lateral surface (1302), a third magnet (1323) disposed at the third lateral surface (1303) and a fourth magnet (1324) disposed at the fourth lateral surface (1304). The first to fourth magnets (1321, 1322, 1323, 1324) may be mutually spaced apart. The first to fourth magnets (1321, 1322, 1323, 1324) may be disposed at the housing (1310) to allow two adjacent magnets to form a 90° thereamong. The first magnet (1321) may be symmetrically formed with the third magnet (1323) based on a center of housing (1310). The second magnet (1322) may be symmetrically formed with the fourth magnet (1324) based on a center of housing (1310). The center of first magnet (1321) may be disposed closer to the fourth corner part (1308) than the first corner part (1305) of housing (1310). That is, the center of the first magnet (1321) may be leaned toward a fourth corner part (1308) side.

The center of second magnet (1322) may be disposed closer to the second corner part (1306) than the first corner part (1305) of housing (1310). That is, the center of the second magnet (1322) may be leaned toward a second corner part (1306) side. The center of third magnet (1323) may be disposed closer to the second corner part (1306) than the third corner part (1307) of housing (1310). That is, the center of the third magnet (1323) may be leaned toward a second corner part (1306) side. The center of fourth magnet (1324) may be disposed closer to the fourth corner part (1308) than the third corner part (1307) of housing (1310). That is, the center of the fourth magnet (1324) may be leaned toward a fourth corner part (1308) side. In this case, an electromagnetic interference between the first to fourth magnets (1321, 1322, 1323, 1324) and the sensing unit may be minimized. That is, an arrangement space of sensing magnet (1710) may be secured through a shape and an arrangement structure of driving magnet (1320) according to the present exemplary embodiment.

The substrate (1400) may be disposed at the housing (1310). The substrate (400) may be disposed at an outside of a lower support member (1620). At this time, an inner surface of substrate (1400) and an outside of lower support member (1620) may be coupled. The substrate (1400) may be mounted with a sensor (1730). At least of one portion of substrate (1400) may be accommodated into a sensor substrate reception part (1315) formed at the housing (1310). The substrate (1400) may be electrically connected to a distal end of one side of the driving coil (1220) by the first support unit (1620a). The substrate (1400) may be electrically connected to a distal end of the other side of the driving coil (1220) by the second support unit (1620b). That is, the substrate (1400) may supply electricity to the driving coil (1220) through the lower support member (1620).

The substrate (1400) may include a body part (1420) accommodated into the second reception groove (1317) of housing (1310). The substrate (1400) may include a terminal part (1430) extended downwardly from the body part (1420). The substrate (1400) may include a sensor mounting part (1410) bent from the body part (1420) to be accommodated into the first reception groove (1316) and mounted with the sensor (1730). The substrate (400) may be an FPCB (Flexible Printed Circuit Board). However, the present invention is not limited thereto.

The substrate (1400) may be inserted from a lower side to the sensor substrate reception part (1315) of housing (1310). The substrate (1400) may be fixed by an adhesive (not shown) while being inserted into the sensor substrate reception part (1315) of housing (1310). The substrate (1400) may be such that the body part (1420) may be disposed at an outside of housing (1310) while being inserted into the sensor substrate reception part (1315) and the sensor mounting part (1410) may be disposed at an inside of housing (1310). Through this structure, the terminal part (1430) disposed at a lower side of body part (1420) can be easy in being coupled for electrical conduction with outside elements, and the sensor (1730) mounted on an inner surface of sensor mounting part (1410) can monitor at a high output the sensing magnet (1710) disposed at an inside.

The sensor mounting part (1410) may be accommodated into a first reception groove (1316) of housing (1310) by being bent from the body part (1420). The sensor mounting part (1410) may be mounted with a sensor (1730). The body part (1420) may be accommodated into a second reception groove (1317) of housing (1310). The body part (1420) may not be overlapped with the driving magnet (1320) to a direction perpendicular to an optical axis. The terminal part (1430) may be downwardly extended from the body part (1420). The terminal part (1430) may be exposed to an outside.

The substrate (1400) may include a first pad (1441) coupled with a coupling part (1624) of first support unit (1620a). The substrate (1400) may include a second pad (1442) spaced apart from the first pad (1441) and coupled with the coupling part (1624) of second support unit (1620b). The first and second pads (1441, 1442) may be disposed at an inside of substrate (1400). The first and second pads (1441, 1442) may be disposed within an integral first area (1440) where conductive lines not electrically connected with the first and second pads (1441, 1442) are not situated.

As illustrated in FIG. 27, in order for the first and second pads (1441, 1442) to be disposed within the first area (1440), the first and second pads (1441, 1442) are required to be adjacently disposed. Furthermore, the first area (1440) may be disposed at a center part of body part (1420) of substrate (1400). The first area (1440) may take a shape of a square, for example. However, the present invention is not limited thereto.

In order to collectively call the first and second pads (1441, 1442), terminals (1441, 1442) may be used. An area of a terminal (1441, 1442) may be such that an area of a lower surface of coupling part (1624) is greater than an area of an upper surface of coupling part (1624) based on a center of coupling part (1624). An area of terminal (1441, 1442) may be such that an area of lower surface is greater than an area of upper surface based on a center of coupling part (1624). Through this structure, a soldering coupling between the lower surface of coupling part (1624) and the terminals (1441, 1442) can be implemented. However, the terminals (1441, 1442) may be disposed only at a lower surface of coupling part (1624). At this time, the terminals (1441, 1442) may be spaced apart from the coupling part (1624).

The base (1500) may be disposed at a lower side of bobbin (1210). The base (1500) may be disposed at a lower surface of housing (1310). The base (1500) may support the stator (1300). The base (1500) may be disposed at a lower side with a PCB. The base (1500) may function as a sensor holder protecting an image sensor mounted on the PCB. The base (1500) may include a through hole (1510), a terminal reception part (1540) and a foreign object collection part (not shown). The base (1500) may include a through hole (1510) at a position corresponding to that of a lens coupling part (1211) of bobbin (1210). Meantime, the through hole (1510) of base (1500) may be coupled with an infrared filter. The infrared filter may be coupled to a separate sensor holder disposed at a lower surface of base (1500). The base (1500) may include a terminal reception part (1540) to accommodate at least one portion of terminal part (1430) of substrate (1400). The terminal reception part (1540) may accommodate at least one portion of terminal part (1430) of substrate (1400). The terminal reception part (1540) may be formed by being inwardly recessed from an outside of base (1500). The terminal part (1430) accommodated into the terminal reception part (1540) may be so disposed as to expose a terminal.

The base (1500) may include a foreign object collection part to collect foreign objects introduced into the cover member (1100). The foreign object collection part may be disposed at an upper surface of base (1500), may include an adhesive material and may collect foreign objects inside an inner space formed by the cover member (1100) and the base (1500).

The support member (1600) may be coupled with the bobbin (1210) and the housing (1310). At least one portion of the support member (1600) may have elasticity. The support member (1600) may elastically support the bobbin (1210). The support member (1600) may include an elastic member. The support member (1600) may movably support the bobbin (1210) relative to the housing (1310). The support member (1600) may movably support the mover (1200) relative to the stator (1300). The support member (1600) may movably support the bobbin (1210) relative to the base (1500).

The support member (1600) may include an upper support member (1610) and a lower support member (1620). The lower support member (1620) may be disposed with a damper. The support member (1600) may include an upper support member (1610) coupled to an upper surface of bobbin (1210) and to an upper surface of housing (1310). The upper support member (1610) may be coupled to an upper surface of bobbin (1210) and to an upper surface of housing (1310). An internal part (1612) of upper support member (1610) may be coupled with an upper coupling part (1213) of bobbin (1210). An external part (1611) of upper support member (1610) may be coupled with an upper coupling part (1313) of housing (1310). The upper support member (1610) may elastically support the bobbin (1210) relative to the housing (1310).

The upper support member (1610) may include an external part (1611), an internal part (1612) and a connection part (1613), for example. The upper support member (1610) may include an external part (1611) coupled with the housing (1310), an internal part (1612) coupled with the bobbin (1210) and a connection part (1613) elastically connecting the external part (1611) and the internal part (1612).

The support member (1600) may include a lower support member (1620) coupled with a lower surface of bobbin (1210) and to a lower surface of housing (1310). The lower support member (1620) may be coupled to the bobbin (1210) and the housing (1310). The lower support member (1620) may be coupled to a lower surface of bobbin (1210) and to a lower surface of housing (1310). An internal part (1622) of lower support member (1620) may be coupled with a lower coupling part (1214) of bobbin (1210). An external part (1621) of lower support member (1620) may be coupled with a lower coupling part of housing (1310). However, the external part (1621) of lower support member (1620) may be fixed by being pressed between a lower surface of housing (1310) and an upper surface of bobbin (1210). The lower support member (1620) may elastically support the bobbin (1210) relative to the housing (1310).

The lower support member (1620) may be divisibly disposed with a pair to supply electricity to the driving coil (1220). The lower support member (1620) may include a pair of support units (1620a, 1620b) each spaced apart from the other. The lower support member (1620) may include a pair of support units (1620a, 1620b) in order to supply electricity to the driving coil (1220). The lower support member (1620) may include a pair of support units (1620a, 1620b), each spaced apart from the other, and each electrically connected to the driving coil (1220).

The lower support member (1620) may include an external part (1621), an internal part (1622), a connection part (1623) and a coupling part (1624). The lower support member (1620) may include an external part (1621) coupled with a housing (1310), an internal part (1622) coupled with a bobbin (1210), and a connection part (1623) elastically connecting the external part (1621) and the internal part (1622). The lower support member (1620) may include a coupling part (1624) coupled with the substrate (1400). Each of the first and second support units (1620*a*, 1620*b*) may include an external part (1621) coupled with the housing (1310). Each of the first and second support units (1620*a*, 1620*b*) may include an internal part (1622) coupled with the bobbin (1210). Each of the first and second support units (1620*a*, 1620*b*) may include a connection part (1623) connecting the external part (1621) and the internal part (1622). Each of the first and second support units (1620*a*, 1620*b*) may include a coupling part (1624) extended from the external part (1621) to an extension direction of external part (1621).

The coupling part (1624) may be coupled with the substrate (1400). The coupling part (1624) may include an extension part (1625) extended from the external part (1621). The coupling part (1624) may include a pad part (1626) disposed at a distal end of the extension part (1625) and having a width wider than the extension part (1625). That is, in the present exemplary embodiment, the pad part (1626) of support member (1600) for being coupled with the substrate (1400) may be expanded over the conventional pad part. Thus, workability can be improved by the pad part (1626) having a larger area and soldering between the pad part (1626) and the substrate (1400) can be made to be excellent. The coupling part (1624) may be extended to a position corresponding to that of terminal (1441, 1442) of substrate (1400). The terminal (1441, 1442) of substrate (1400) and the coupling part (1624) may be electrically connected. The terminal (1441, 1442) of substrate (1400) and the coupling part (1624) may be coupled by being soldered.

The coupling part (1624) may be extended along an inner surface of substrate (1400). The coupling part (1624) may be more extended than a distal end of the internal part (1622). The coupling part (1624) of first support unit (1620*a*) and the coupling part (1624) of second support unit (1620*b*) may be extended to allow each distal end to be mutually adjacent. However, the coupling part (1624) of first support unit (1620*a*) and the coupling part (1624) of second support unit (1620*b*) may not be mutually touched.

A worker may perform a soldering operation to the pad part (1626) of lower support member (1620) and to the first and second pads (1441, 1442) of substrate (1400) in a state of the substrate (1400) of lower support member (1620) being flipped over as shown in FIG. 27. At this time, in the present exemplary embodiment, because the coupling part (1624) of first support unit (1620*a*) and the coupling part (1624) of second support unit (1620*b*) are adjacent disposed, the soldering work by the worker can be easily performed. This effect may be easily understood when compared with an imaginary comparative example where the coupling part (1624) of first support unit (1620*a*) and the coupling part (1624) of second support unit (1620*b*) are disposed at both distal ends of substrate (1400). Meantime, a support part (1628) illustrated in FIG. 27 is a structure for transportation of lower support member (1620), and may be removed in the process of being assembled with the lens driving device.

As illustrated in FIG. 26, the external part (1621) and the coupling part (1624) of lower support unit (1620*a*) may be symmetrical with the external part (1621) of second support unit (1620*b*) and the coupling part (1624) based on a center of a first imaginary line (L1) which is an imaginary straight line passing a center (C) of the lower support member (1620). The external part (1621) and the coupling part (1624) of lower support unit (1620*a*) may be asymmetrical with the external part (1621) of second support unit (1620*b*) and the coupling part (1624) based on a center of a second imaginary line (L2) which is an imaginary straight line orthogonal at a center (C) of the lower support member (1620) with the first imaginary straight line.

That is, only one distal end of one side between a distal end of one side and a distal end of the other side at the first support unit (1620*a*) may be disposed with the coupling part (1624). Likewise, only one distal end of one side between a distal end of one side and a distal end of the other side at the second support unit (1620*b*) may be disposed with the coupling part (1624). That is, the external part (1621) at a side not coupled with the substrate (1400) may not be disposed with the coupling part (1624), because the coupling part (1624) is extended to be coupled with the first and second pads (1441, 1442) disposed at a center part of substrate (1400).

The external part (1621) of first support unit (1620*a*) and the coupling part (1624) may be symmetrical with the external part (1621) of second support unit (1620*b*) and the coupling part (1624) based on an imaginary surface including an optical axis. The external part (1621) of first support unit (1620*a*) and the coupling part (1624) may be asymmetrical with the external part (1621) of second support unit (1620*b*) and the coupling part (1624) based on an imaginary surface including an optical axis.

The lower support member (1620) may be so disposed as to correspond to an upper end of the first and second pads (1441, 1442) as illustrated in FIG. 28, as a first example. That is, an external end of pad part (1626) of lower support member (1620) may be in contact with an upper end of first and second pads (1441,1442). In this case, the worker may perform the soldering operation at a lower side by flipping the lower support member (1620) and the substrate (1400), as illustrated in FIG. 27. Through this structure, in the present exemplary embodiment, a soldering area for the pad part (1626) of lower support member (1620) and to the first and second pads (1441, 1442) may be maximally secured. Because of this structure, in the present exemplary embodiment, workability to the coupling between the pad part (1626) of lower support member (1620) and to the first and second pads (1441, 1442) may be enhanced. Furthermore, reliability of electrical connection between the lower support member (1620) and the substrate (1400) can be secured.

The sensing unit may be provided to detect position information of lens module for auto focus feedback function. The sensing unit may include a sensing magnet (1710) and a sensor (1730). The sensing magnet (1710) may be disposed at one side of bobbin (1210). The compensation magnet (1720) may be disposed at the other side of bobbin (1210). The sensor (1730) may be disposed at the housing (1310) to detect the sensing magnet (1710).

The sensing magnet (1710) may be disposed at the bobbin (1210). The sensing magnet (1710) may be detected by the sensor (1730). The sensing magnet (1710) may be so disposed as to face the first corner part (1305) of housing (1310). The sensing magnet (1710) may be disposed on an imaginary line (L of FIG. 25) which is an imaginary straight line connecting the first corner part (1305) and the third corner part (1307). The sensing magnet (1710) may have a magnetism corresponding to that of the compensation magnet (1720). The sensing magnet (1710) may be disposed at one side of bobbin (1210). The sensing magnet (1710) may be overlapped with the driving coil (1220) to a direction perpendicular to an optical axis. The sensing magnet (1710) may be disposed at an inside of driving coil (1220). The sensing magnet (1710) may be disposed in consideration of relative position with the sensor (1730) in order to be used only at a section where four poles are magnetized and a Hall output is discharged in a positive number.

The compensation magnet (1720) may have a magnetism corresponding to that of sensing magnet (1710). The compensation magnet (1720) may be disposed at the other side of bobbin (1210) corresponding to an opposite side of one side of bobbin (1210) disposed with the sensing magnet (1710). The compensation magnet (1720) may be disposed on an imaginary straight line (L) connecting the first corner part (1305) and the third corner part (1307). The compensation magnet (1720) may be so disposed as to be symmetrical with the sensing magnet (1710) base on a center of bobbin (1210). Through this structure, an electromagnetic balance between the sensing magnet (1710) and the compensation magnet (1720) may be realized. As a result, an influence applied to the electromagnetic interaction between the driving coil (1220) of sensing magnet (1710) and the driving magnet (1320) can be minimized.

The sensor (1730) may be disposed at the substrate (1400). The sensor (1730) may detect the sensing magnet (1710). The sensor (1730) may be disposed on an imaginary straight line (L) connecting the first corner part (1305) and the third corner part (1307). That is, the sensor (1730), the sensing magnet (1710) and the compensation magnet (1720) may be all disposed on the imaginary line (L). The sensor (1730) may be mounted on the substrate (1400). The sensor (1730) may be mounted on a sensor mounting part (1410) of substrate (1400). The sensor (1730) may include a Hall sensor (Hall IC) detecting a magnetic field of a magnet.

The Hall sensor may be fixed on the housing (1310) and the sensing magnet (1710) may be fixed on the bobbin (1210). When the sensing magnet (1710) moves together with the bobbin (1210), a magnetic flux density detected by the Hall IC inside the Hall sensor may be changed in response to the relative position of the Hall sensor and the sensing magnet (1710). The Hall sensor may detect a position of lens module using an output voltage of Hall sensor in proportion to a magnetic flux density value that changes in response to a relative position of the Hall sensor and the sensing magnet (1710).

The sensor (1730) may be electrically connected with the substrate (1400). A conductive line electrically connected to the sensor (1730) may not pass through a first area (1440). That is, the conductive line of substrate (1400) connected to the sensor (1730) may avoid the first area (1440). In the present exemplary embodiment, the size of first area (1440) may be minimized for this characteristic. That is, the first and second pads (1441, 1442) may be maximally adjacent while maintaining a spaced-apart state inside the minimized first area (1440).

Hereinafter, the lens driving device according to a second exemplary embodiment of present invention will be described with reference to FIG. 29.

Figure 29:
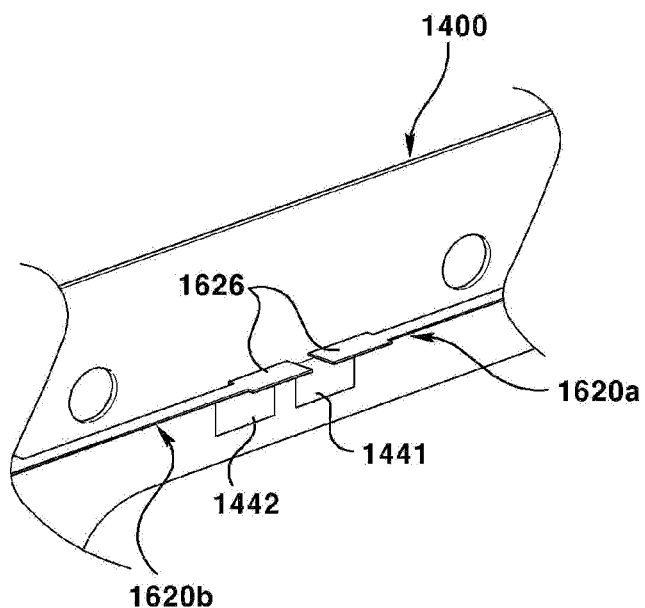

FIG. 29 is a bottom perspective view illustrating some elements of a lens driving device according to a second exemplary embodiment of present invention.

The lens driving device according to a second exemplary embodiment of present invention may be different from the first exemplary embodiment in terms of position of first and second pads (1441, 1442). Thus, hereinafter, the difference of the lens driving device according to the second exemplary embodiment from that of the first exemplary embodiment will be focused in explanation and any content excepted from the explanation may be inferably applied from the explanation of first exemplary embodiment.

In the second exemplary embodiment, the lower support member (1620) may be disposed to correspond to a lower end of first and second pads (1441, 1442). That is, an external end of the pad part (1626) of the lower support member (1620) may contact a lower end of the first and second pads (1441, 1442). Through this structure, in the present exemplary embodiment, a soldering area for the pad part (1626) of lower support member (1620) and the first and second pads (1441, 1442) can be maximally secured. Because of this structure, in the present exemplary embodiment, workability to the coupling between the pad part (1626) of lower support member (1620) and to the first and second pads (1441, 1442) may be enhanced. Furthermore, reliability of electrical connection between the lower support member (1620) and the substrate (1400) can be secured. Meantime, in the second exemplary embodiment, a worker may perform the soldering operation at an upper side of the lower support member (1620) and the first and second pads (1441, 1442). An area of terminals (1441, 1442) may be such that an area of an upper surface of coupling part (1624) is greater than an area of lower surface of coupling part (1624) based on the coupling part (1624). The area of terminals (1441, 1442) may be such that an area of an upper side is greater than an area of lower side based on the coupling part (1624). In this structure, a soldering operation may be performed to an upper surface of coupling part (1624) and the terminals (1441, 1442).

Hereinafter, the lens driving device according to a third exemplary embodiment of present invention will be described with reference to FIG. 30.

Figure 30:
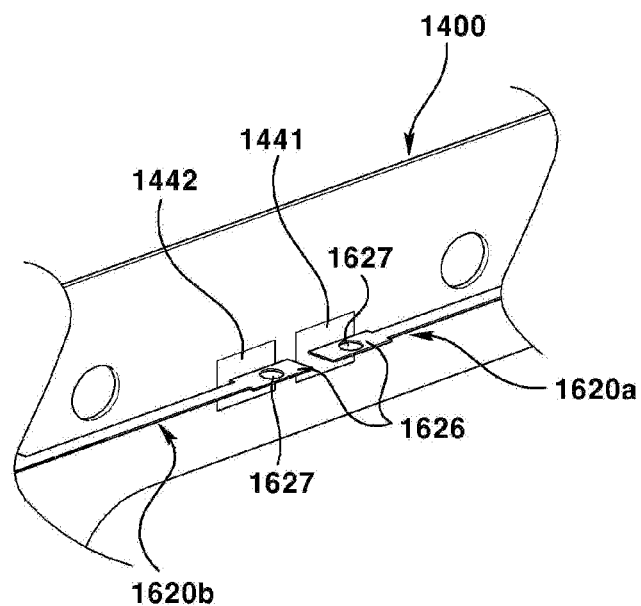

FIG. 30 is a bottom perspective view illustrating some elements of a lens driving device according to a third exemplary embodiment of present invention.

The lens driving device according to a third exemplary embodiment of present invention may be different from the first exemplary embodiment in terms of position of first and second pads (1441, 1442) and/or shape of lower support member (1620). Thus, hereinafter, the difference of the lens driving device according to the third exemplary embodiment from that of the first exemplary embodiment will be focused in explanation and any content excepted from the explanation may be inferably applied from the explanation of first exemplary embodiment.

In the third exemplary embodiment, the lower support member (1620) may be disposed to correspond to a center of the first and second pads (1441, 1442). In this case, a worker may perform the soldering operation at a lower end by flipping the lower support member (1620) and the substrate (1400) as in the first exemplary embodiment. Furthermore, the worker may also perform the soldering operation at an upper side of the lower support member (1620) and the first and second pads (1441, 1442).

An area of terminals (1441, 1442) may be such that an area of lower surface of coupling part (1624) and an area of upper surface of coupling part (1624) may be same based on the coupling part (1624). An area of terminals (1441, 1442) may be such that an area of lower side of coupling part (1624) and an area of upper side of coupling part (1624) may be same based on the coupling part (1624). In this structure, a soldering coupling may be performed to a lower surface and/or upper surface of coupling part (1624) and to the terminals (1441, 1442).

The lower support member (1620) may include a coupling hole (1627) coupled with at least one portion of coupling member that couples the lower support member (1620) and the first and second pads (1441, 1442). Alternatively, the lower support member (1620) may include a coupling groove coupled with at least one portion of coupling member that couples the lower support member (1620) and the first and second pads (1441, 1442). Here, the coupling member may be a soldering part. However, the present invention is not limited thereto, and any member capable of electrically connecting the lower support member (1620) and the first and second pads (1441, 1442) may be used. Meantime, the coupling hole (1627) may be so formed as to pass through a portion of pad part (1626) of lower support member (1620). The coupling groove may be formed by being recessed to the other side from a distal end of one of the pad part (1626) of lower support member (1620). The coupling hole (1627) of the coupling groove may function as a passage of coupling member. That is, as in the third exemplary embodiment, even if the lower support member (1620) is disposed to correspond to a center of the first and second pads (1441, 1442), the coupling member may evenly flow into an upper surface and a lower surface of lower support member (1620) for adhesion by the coupling hole (1627) and/or the coupling groove of the lower support member (1620). Furthermore, the fixing force of lower support member (1620) of coupling member can be enhanced by the coupling hole (1627) and/or the coupling groove.

Hereinafter, the lens driving device according to a fourth exemplary embodiment of present invention will be described with reference to FIG. 31.

Figure 31:
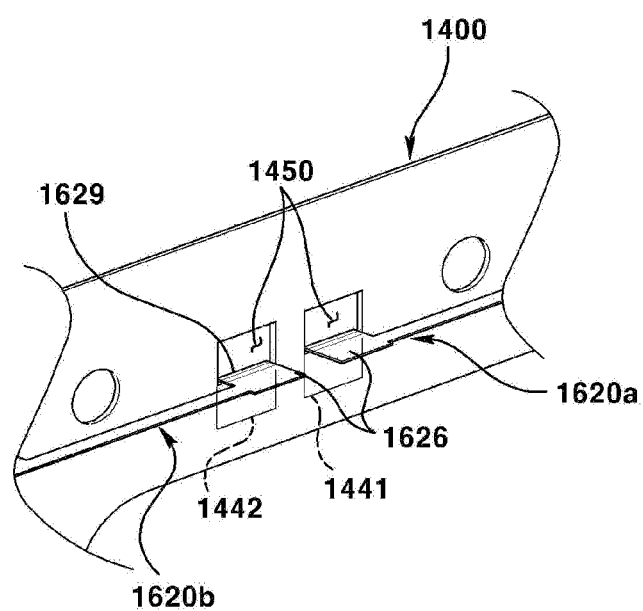

FIG. 31 is a bottom perspective view illustrating some elements of a lens driving device according to a fourth exemplary embodiment of present invention.

The lens driving device according to a fourth exemplary embodiment of present invention may be different from the first exemplary embodiment in terms of position of first and second pads (1441, 1442) and/or presence or absence of through hole (1450) of substrate (1400). Thus, hereinafter, the difference of the lens driving device according to the fourth exemplary embodiment from that of the first exemplary embodiment will be focused in explanation and any content excepted from the explanation may be inferably applied from the explanation of first exemplary embodiment.

In the fourth exemplary embodiment, the first and second pads (1441, 1442) may be disposed at an outer surface of substrate (1400). The substrate (1400) may include a through hole (1450) adjacently formed with the first and second pads (1441, 1442). A lower end of the first and second pads (1441, 1442) may correspond to an upper end of the through hole (1450). In the fourth exemplary embodiment, the pad part (1626) of lower support member (1620) may be formed with a protrusion (1629) outwardly protruded through the through hole (1450). Through this structure, the protrusion (1629) and the first and second pads (1441, 1442) disposed at an outside of substrate (1400) may be coupled. The coupling between the protrusion (1629) and the first and second pads (1441, 1442) may be implemented by soldering. In the fourth exemplary embodiment, workability may be enhanced because a worker can perform the coupling process between two members from an outside of the substrate (1400) and the lower support member (1620).

Hereinafter, a camera module according to an exemplary embodiment will be described. To be more specific, an auto focus function of camera module will be described according to an exemplary embodiment.

When a power is supplied to the driving coil (1220), the driving coil (1220) may perform movement relative to the driving magnet (1320) in response to an electromagnetic interaction between the driving coil (1220) and the driving magnet (1320). At this time, the bobbin (1210) coupled with the driving coil (1220) may integrally move with the driving coil (1220). That is, the bobbin (1210) coupled at an inner side with the lens module may move to an optical axis direction relative to the housing (1310). The said movement of bobbin (1210) may result in the lens module closing in or distancing from an image sensor such that in the present exemplary embodiment, supply of electricity to the driving coil (1220) may perform a focus adjustment to a subject.

Meantime, an auto focus feedback may be applied in order to implement a more accurate realization of auto focus function of the camera module according to the exemplary embodiment. The sensor (1730) disposed at the housing (1310) may detect a magnetic field of sensing magnet (1710) fixed to the bobbin (1210). Thus, when the bobbin (1210) performs a relative movement to the housing (1310), a distance between the sensor (1730) and the sensing magnet (1710) may be changed to change an amount of magnetic field detected by the sensor (1730). The sensor (1730) may detect a movement amount of bobbin (1210) to an optical axis direction or position of bobbin (1210) and transmit the detection value to the controller. The controller may determine whether to perform an additional movement relative to the bobbin (1210) through the received detection value. These types of processes are generated in real time, whereby an auto focus function of the camera module can be more accurately performed through the auto focus feedback according to the present exemplary embodiment.

As noted from the foregoing, the exemplary embodiments have explained the present invention using an AF model capable of performing an auto focus function. However, in a modification to the present exemplary embodiment, the housing (1310) and the base (1500) may be spaced apart and the lateral support member may movably support the housing (1310) relative to the base (1500), an upper surface of base (1500) may be disposed with an OIS coil part to face the driving magnet (1320). That is, in the modification to the present exemplary embodiment, the OIS function and the auto focus function can be simultaneously performed.

FIGS. 32 to 49 illustrate the third exemplary embodiment of the present invention.

These and other aspects of various embodiments of the present invention will become more apparent upon consideration of the following description and explanation with reference to the accompanying drawings. In the explanation of exemplary embodiments, when each layer (membrane), area, pattern or structures are described to be formed "on" or "under" the each layer (membrane), area, pattern, pad or structures, the exemplary term "on" or "under" can encompass both an element being referred to as being disposed or formed "directly on" and an element being referred to as being indirectly disposed or formed using an intervening elements. Furthermore, reference to "on" or "under" of each layer is based on the given drawings. Furthermore, like reference numerals refer to the like elements throughout.

Now, a lens driving device, a camera module including the same and an optical device according to the exemplary embodiments will be described with reference to the accompanying drawings. For the convenience of explanation, although the lens driving device according to an exemplary embodiment will be explained using a Cartesian coordinate system (x, y, z), other coordinate system may be used for explanation, and therefore, the present invention is not limited thereto. X axis and y axis on each drawing may mean a direction perpendicular to z axis which is an optical axis, where z axis direction, which is an optical axis direction, may be called a "first direction" and x axis direction may be called a "second direction" and y axis direction may be called a "third direction".

The "auto focus function" applied to a small camera module of a mobile device such as a smart phone and a tablet PC is a function of capturing a focus of an image of a subject on a surface of an image sensor. The auto focus function may be variably configured, and the lens driving device according to an exemplary embodiment can perform an auto focus function by moving an optical module comprised of at least one sheet of lens to a first direction.

Figure 32:
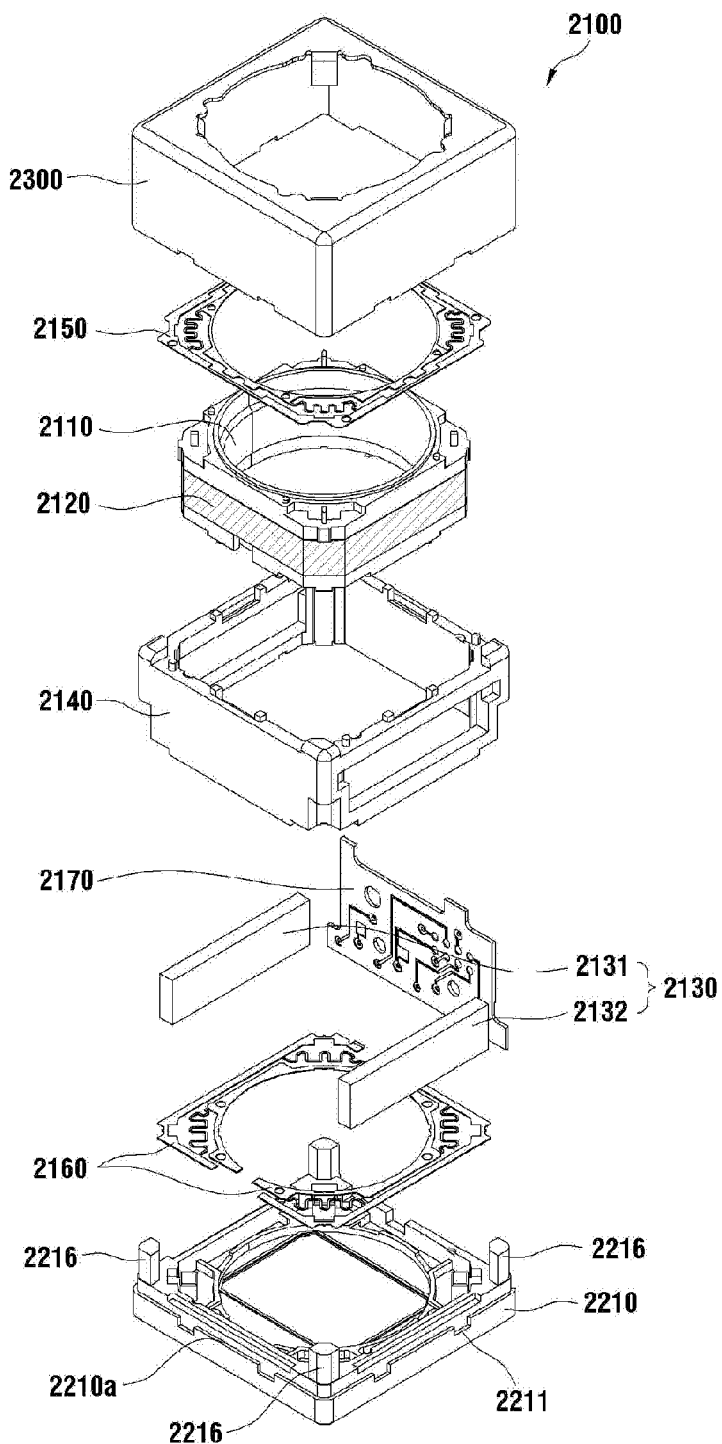
Figure 33:
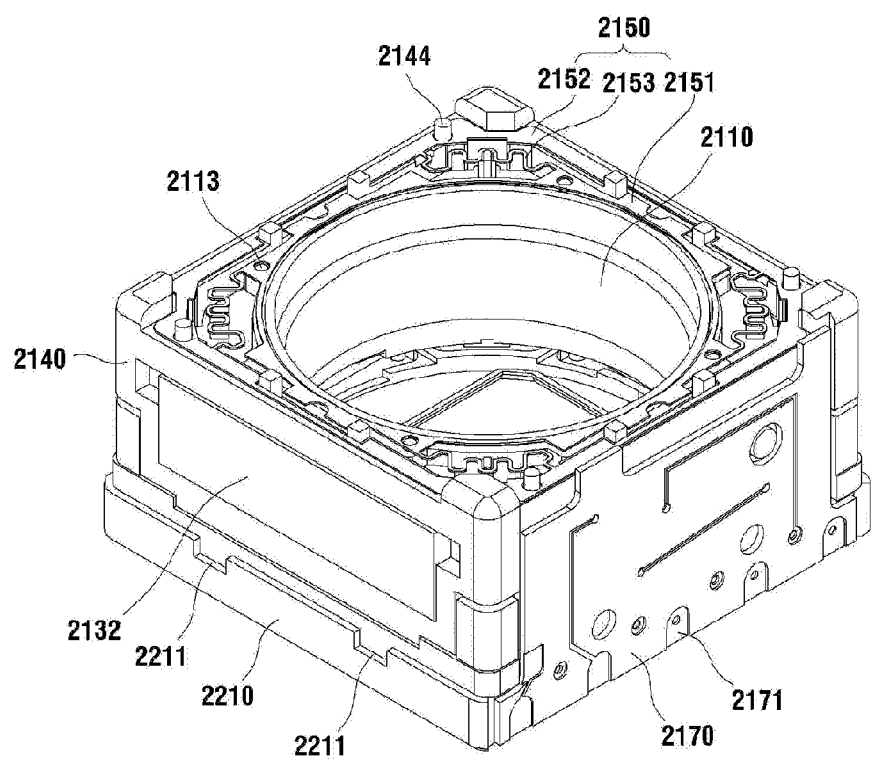

FIG. 32 is an exploded perspective view of a lens driving device (2100) according to an exemplary embodiment of present invention, and FIG. 33 is a coupled perspective view of a lens driving device (2100) except for a cover member (1100) of FIG. 32.

Referring to FIGS. 31 and 32, the lens driving device (2100) may include a cover member (2300), a bobbin (2110), a coil (2120), a magnet (2130), a housing (2140), an upper elastic member (2150), a lower elastic member (2160), a circuit substrate (2170), a first damper member (2180), a second damper member (2190) and a base (2210).

The cover member (2300) can accommodate, in a reception space formed along with the base (2210), a bobbin (2110), a coil (2120), a magnet (2130), a housing (2140), an upper elastic member (2150), a lower elastic member (2160), a circuit substrate (2170) and a first damper member (2180).

The cover member (2300) may take a shape of a box where a lower surface is opened and an upper end and a lateral wall are included. A lower surface of cover member (2300) may contact an upper surface and a lateral wall of base (2210). An upper end of cover member (2300) may take a polygonal shape, a square shape or a pentagonal shape, for example.

The cover member (2300) may be formed at an upper end with a hollow hole exposing a lens (not shown) coupled with the bobbin (2110) to an outside light. Furthermore, the hollow hole of the cover member (2300) may be additionally formed with a window formed with a light transmitting material in order to prevent foreign objects from entering an inside of the camera module. The material of cover member (2300) may be non-magnetic material such as SUS in order to prevent attachment with the magnet (2130), but may function as a yoke by forming with a magnetic material.

Figure 34:
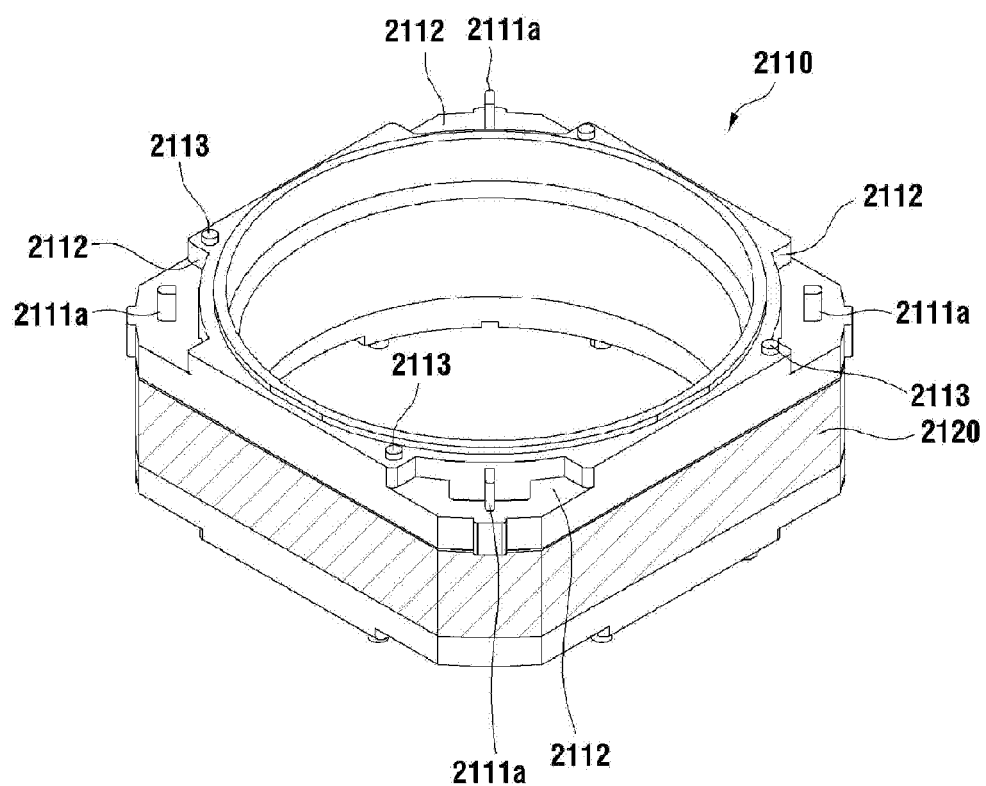
Figure 35:
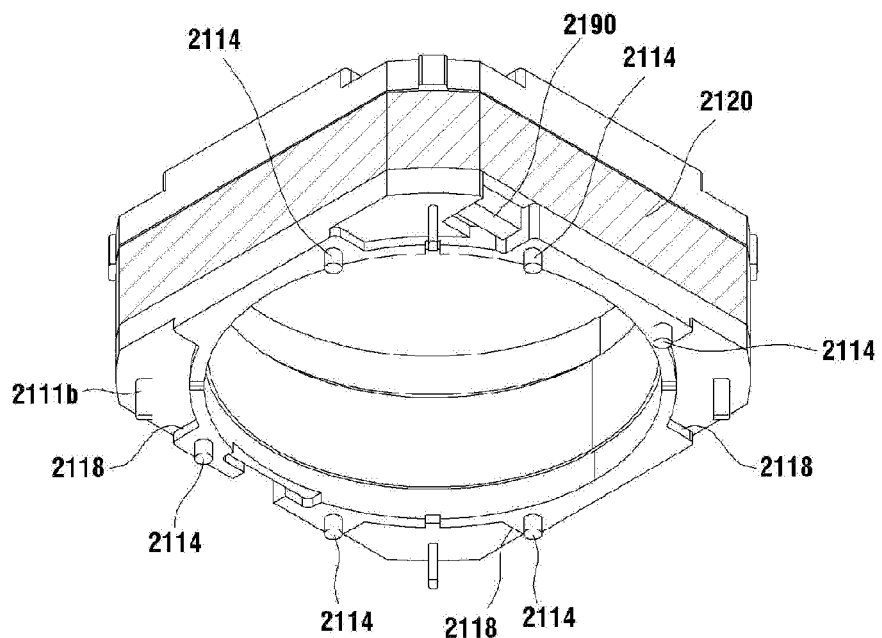

FIG. 34 is a first coupled perspective view of between a bobbin (2110) and a coil (2120) illustrated in FIG. 32, and FIG. 35 is a second coupled perspective view of between a bobbin (2110) and a coil (2120) illustrated in FIG. 32.

Referring to FIGS. 34 and 35, the bobbin (2110) may be disposed at an inside of housing (2140) and may move to a first direction, e.g., a z axis direction in response to an electromagnetic interaction between the coil (2120) and the magnet (2130). An inner surface of bobbin (2110) may be mounted with a lens or a lens barrel (not shown) mounted with at least one lens. The lens barrel may be coupled to an inner surface of bobbin (2110) using various methods.

The bobbin (2110) may be formed with a hollow hole to mount a lens or a lens barrel. The hollow hole may take a shape corresponding to that of a mounted lens or lens barrel, and may take a round shape, an oval shape or a polygonal shape, for example, but the present invention is not limited thereto. The bobbin (2110) may include at least one upper support protrusion (2113) disposed at an upper surface and coupled with an inner frame (2151) of upper elastic member (2150), and at least one lower support protrusion (2114) disposed at a lower surface and coupled with an inner frame (2161) of lower elastic member (2160). The upper support protrusion (2113) and the lower support protrusion (2114) of bobbin (2110) may respectively have a cylindrical shape or a prism shape, but the present invention is not limited thereto.

The bobbin (2110) may include an upper escape groove (2112) provided at one area of an upper surface corresponding to connection part (2153) of upper elastic member (2150). Furthermore, the bobbin (2110) may include a lower escape groove (2118) provided at one area of a lower surface corresponding to connection part (2163) of lower elastic member (2160). When the bobbin (2110) is moved to a first direction by the upper escape groove (2112) and the lower escape groove (2118) of bobbin (2110), a spatial interference between the connection parts (2153, 2163) of upper and lower elastic members (2150, 2160) and the bobbin (2110) can be removed, whereby the connection parts (2153, 2163) of upper and lower elastic members (2150, 2160) can be easily deformed. In another exemplary embodiments, the upper escape groove (2112) or the lower escape groove (2118) of bobbin (2110) may be omitted.

The upper escape groove (2112) or the lower escape groove (2118) of bobbin (2110) may be disposed near a corner of bobbin (2110), but the present invention is not limited thereto, and may be disposed near to a lateral side of upper surface of bobbin (2110) disposed between corners of bobbin (2110) in response to shape and/or position of the connection parts (2153, 2163) of upper and lower elastic members (2150, 2160).

The bobbin (2110) may be provided at an outer surface with at least one coil reception groove (not shown) disposed or formed with a coil (2120). The shape and the number of coil reception groove may correspond to the shape and number of coil disposed at an outside of bobbin (2110). An upper surface of bobbin (2110) may be provided with a first protrusion (2110a) corresponding to the connection part (2153) of upper elastic member (2150). For example, the first protrusion part (2110a) of bobbin (2110) may be protruded from a floor of the upper escape groove (2112).

For example, the first protrusion part (2110a) may guide a bent portion of connection part (2153) of upper elastic member (2150). The first protrusion part (2110a) of bobbin (2110) may have a shape same as or corresponding to that of the bent shape of connection part (2153) of upper elastic member (2150). For example, the first protrusion part (2110a) of bobbin (2110) may take a polygonal shape, a round shape or a semi-circular shape, but the present invention is not limited thereto.

The first protrusion part (2110a) of bobbin (2110) may take a lateral surface having a same curvature as that of bent portion of connection part (2153) of upper elastic member (2150). For example, at least one portion of the lateral surface of first protrusion part (2110a) of bobbin (2110) may take a same curvature as that of the bent portion of connection part (2153) of upper elastic member (2150). The number of first protrusion part (2110a) of bobbin (2110) may be the same as or more than that of the connection part (2153) of upper elastic member (2150).

A lower surface of bobbin (2110) may be provided with a second protrusion (2110b) corresponding to the connection part (2163) of lower elastic member (2160). For example, the second protrusion part (2110b) of bobbin (2110) may be protruded from a floor of the lower escape groove (2118). For example, the second protrusion part (2110b) of bobbin (2110) may guide a bent portion of connection part (2163) of lower elastic member (2160). The second protrusion part (2110b) of bobbin (2110) may take a shape identical to or matching to the bent shape of connection part (2163) of lower elastic member (2160). For example, the second protrusion part (2110b) of bobbin (2110) may a polygonal shape, a round shape or a semi-circular shape, but the present invention is not limited thereto.

The second protrusion part (2110b) of bobbin (2110) may take a lateral surface having a same curvature as that of bent portion of connection part (2163) of lower elastic member (2160). For example, at least one portion of the lateral surface of second protrusion part (2110b) of bobbin (2110) may take a same curvature as that of the bent portion of connection part (2163) of lower elastic member (2160). The number of second protrusion part (2110b) of bobbin (2110) may be the same as or more than that of the connection part (2163) of lower elastic member (2160).

Although FIGS. 34 and 35 have illustrated that the bobbin (2110) is disposed with first and second protrusion parts, the bobbin according to another exemplary embodiment may be disposed with any one of the first and second protrusion parts.

Next, explanation will be provided for coil (2120).

The coil (2120) may be disposed at an outside of bobbin (2110) and may perform an electromagnetic interaction with the magnet (2130) disposed at the housing (2140). The coil (2120) may form an electromagnetic force through the electromagnetic interaction with the magnet (2130) when a driving signal, for example, a driving current is supplied, and the formed electromagnetic force may move the bobbin (2110) to a first direction. Furthermore, because the bobbin (2110) may be elastically supported by the upper and lower elastic members (2150, 2160), the auto focusing function can be implemented by the electromagnetic force generated by electromagnetic interaction between the coil (2120) and the magnet (2130).

For example, the coil (2120) may be wound to wrap an outer surface of bobbin (2110) to allow rotating to a clockwise direction or to a counterclockwise direction based on an optical axis. The coil in another exemplary embodiment may be embodied in a coil ring shape wound to a clockwise direction or to a counterclockwise direction based on an axis perpendicular to the optical axis, and the number of coils may be the same as that of the magnet (2130), but the present invention is not limited thereto.

For example, the coil may be arranged within a coil reception groove of bobbin (2110), but the present invention is not limited thereto. The coil (2120) may be electrically connected to at least one of upper elastic member (2150) and lower elastic member (2160).

Next, explanation will be given to the housing.

The housing (2140) may support the magnet (2130) and accommodate the bobbin (2110) therein in order to allow the bobbin (2110) to move to a first direction parallel with the optical axis. The housing (2140) may support a circuit substrate (2170).

Figure 36:
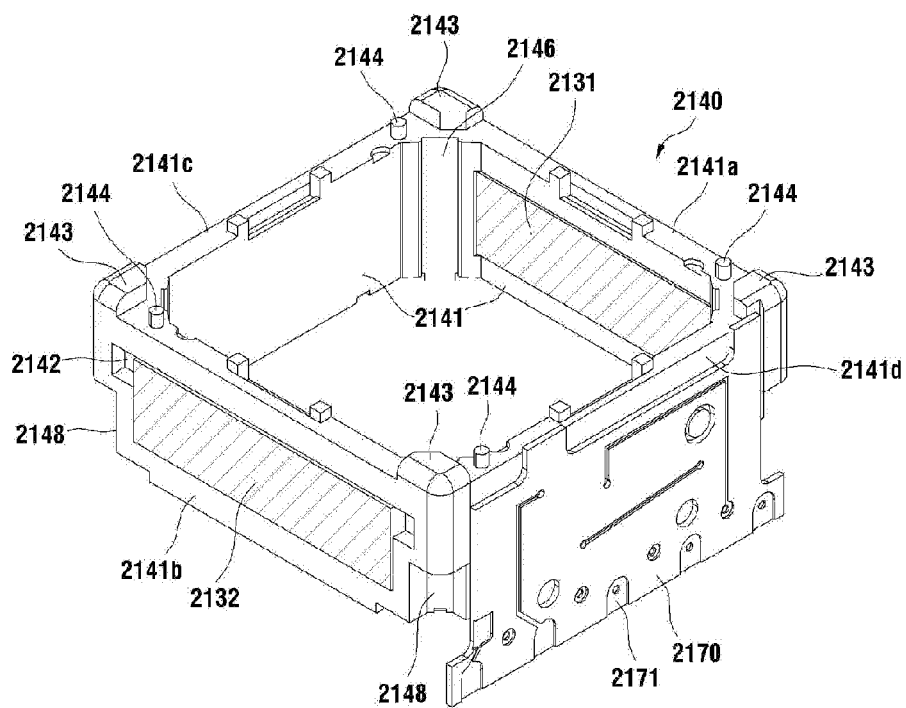

FIG. 36 is a coupled perspective view of between a housing (2140) and a circuit substrate (2170) illustrated in FIG. 32.

Referring to FIG. 36, the housing (2140) may generally a hollow-holed pillar shape. For example, the housing (2140) may be disposed with a polygonal (e.g., square or pentagonal) or round hollow hole. The housing (2140) may include a plurality of lateral parts (2141a to 2141d). The housing (2140) illustrated in FIG. 36 includes four lateral parts, but the present invention is not limited thereto, and may include more than four lateral parts.

At least one of the lateral parts (2141a to 2141d) of housing (2140) may be disposed with a magnet (2130). For example, at least one of the lateral parts (2141a to 2141d) of housing (2140) may be formed with a magnet groove (2142) accommodated, arranged or fixed by the magnet (2130). Although FIG. 36 has illustrated that the magnet groove (2142) takes a shape of a through groove, the present invention is not limited thereto, and may take a concavely grooved shape.

The magnet (2140) according to another exemplary embodiment may be disposed on at least one of an inner surface or an outer surface of the lateral parts (2141a to 2141d) of housing (2140). The housing (2140) may include at least one first stopper (2143) protruding from an upper surface. Furthermore, the upper surface of housing (2140) may be formed with at least one upper frame support protrusion (2144) coupled by an outer frame (2152) of the upper elastic member (2150). A lower surface of housing (2140) may be formed with at least one lower frame support protrusion (2147) coupled by an outer frame (2162) of the lower elastic member (2160).

Corners of lateral parts (2141a to 2141d) of housing (2140) may be formed with a lower guide groove (2148) inserted, coupled or fastened by the guide member (2216) of base (2210). A coupled position of housing (2140) on the base (2210) may be guided by the guide member (2216) of base (2210) and the lower guide groove (2148) when the housing (2140) is accommodated or disposed on an upper surface of base (2210). Furthermore, the housing (2140) may be prevented from being disengaged from a to-be-mounted reference position due to vibration generated during the operation of lens driving device (2100) or by a worker's mistake during the coupling process.

Next, the magnet (2130) will be explained.

The magnet (2130) may be disposed on a housing (2140) in order to face or correspond to the coil (2120). For example, the magnet (2130) may be disposed at a magnet groove (2142) provided on the lateral parts (2141a to 2141d) of housing (2140) in order to overlap with the coil (2120) from an initial position of mover to a direction perpendicular to an optical axis.

The mover may be an AF mover and the AF mover may include a bobbin (2110), and elements mounted on the bobbin (2110) and moving along with the bobbin (2110). For example, the AF mover may include at least a bobbin (2110) and a lens (not shown) mounted on the bobbin (2110), and the mover may further include a coil (2120) according to an exemplary embodiment.

Here, the initial position may be an initial position of mover while no power is applied to the coil (2120), or may be a position where the mover is to be laid when the upper and lower elastic members (2150, 2160) are deformed only by the weight of mover. The mover, e.g., the bobbin (2110) at the initial position may be in a state of being distanced from a stator, e.g., the housing (2140) by the upper and lower elastic members (2150, 2160). The lateral parts (2141a to 2141d) of housing (2140) according to another exemplary embodiment may not be formed with the magnet groove, and the magnet (2130) may be arranged on any one of an outside or an inside of the lateral parts (2141a to 2141d) of housing (2140). The shape of magnet (2130) may be a shape corresponding to that of the lateral parts (2141a to 2141d) of housing (2140), e.g., a cubic shape but the present invention is not limited thereto.

The magnet (2130) may be formed in one body, and may be a single pole magnetized magnet or a both-pole magnetized magnet where a surface opposite to the coil (2120) is arranged with an S pole and an outside surface is arranged with a N pole. However, the present invention is not limited thereto, and it may be possible to configure the pole direction of magnet in a reverse way.

The magnet (2130) may include two driving magnets (2131, 2132) each arranged to face the other on the housing (2140). For example, the first and second driving magnets (2131, 2132) may be arranged on the mutually-facing first and second lateral parts (2141a, 2141b) among the lateral parts (2141a to 2141d) of housing (2140), but the present invention is not limited thereto. The driving magnet may exceed more than two pieces, according to another exemplary embodiment. Although FIG. 32 has illustrated that the magnet (2130) is disposed at the housing (2140), the housing (2140) may be omitted in another exemplary embodiment, and the magnet (2130) may be disposed or arranged on a cover member (2300), and the upper and lower elastic members (2150, 2160) may be connected to the cover member (2300) or may be connected or coupled with a frame connected or coupled with the cover member (2300).

Next, the circuit substrate (2170) will be explained.

The circuit substrate (2170) may be disposed, coupled or mounted on the housing (2140) and may be electrically connected to at least one of the upper and lower elastic members (2150, 2160). The circuit substrate (2170) may be a PCB, e.g., an FPCB. The circuit substrate (2170) may be fixed, supported or arranged on any one of the plurality of lateral parts (2141a to 2141d) of housing (2140). For example, the circuit substrate (2170) may be arranged on a lateral part (e.g., 2140d) among the plurality of lateral parts (2141a to 2141d) of housing (2140) where the driving magnets (2131, 2132) are not disposed. The circuit substrate (2170) may be disposed with a plurality of terminals (2171) and may supply an electric signal to the coil (2120) by receiving the electric signal from outside. For example, the circuit substrate (2170) may include terminals for providing a driving signal, e.g., a driving current for driving the coil (2120).

Next, the upper and lower elastic members (2150, 2160) will be explained.

The upper and lower elastic members (2150, 2160) may be coupled with the bobbin (2110) and the housing (2140) and may elastically support the bobbin (2110). Furthermore, any one of the upper and lower elastic members (2150, 2160) may be electrically connected to the coil (2120) and the circuit substrate (2170).

Figure 37:
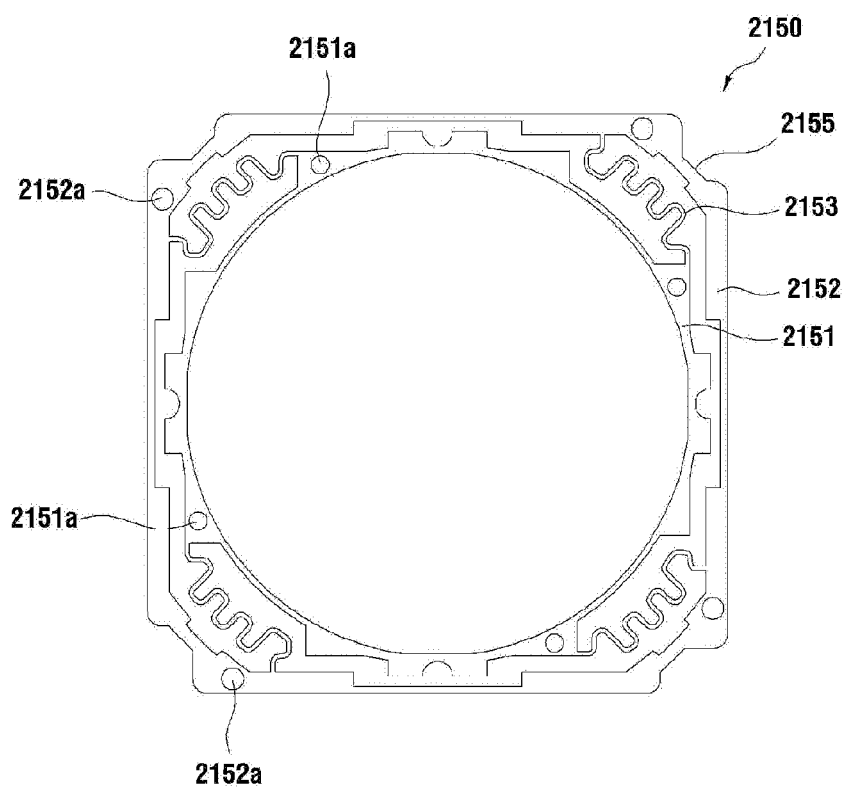
Figure 38:
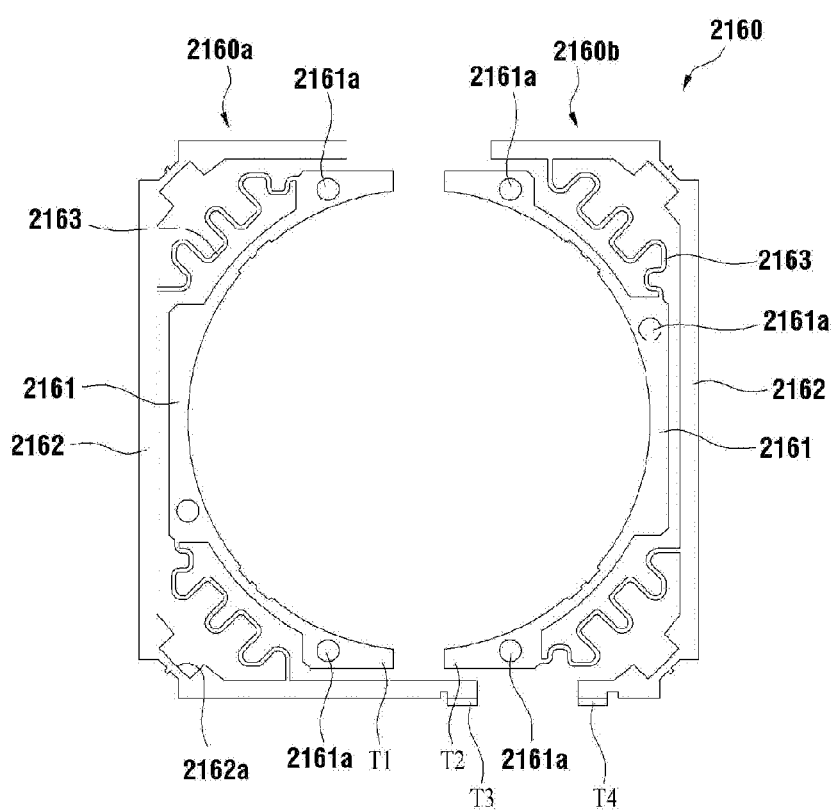

FIG. 37 is a plain view of an upper elastic member illustrated in FIG. 32, and FIG. 38 is a plane view of a lower elastic member illustrated in FIG. 32.

Referring to FIGS. 37 and 38, the upper elastic members (2150) may include an inner frame (2151) coupled with an upper support protrusion (2113) of bobbin (2110), an outer frame (2152) coupled with an upper frame support protrusion (2144) of housing (2140) and a connection part (2153) connecting the inner frame (2151) and the outer frame (2152). The lower elastic members (2160) may include an inner frame (2161) coupled with a lower support protrusion (2114) of bobbin (2110), an outer frame (2162) coupled with a lower frame support protrusion (2147) of housing (2140) and a connection part (2163) connecting the inner frame (2161) and the outer frame (2162).

Each of the connection part (2153) of upper elastic member (2150) and the connection part (2163) of lower elastic member (2160) may be bent at least once to form a pattern of predetermined shape. The bobbin (2110) may be elastically (flexibly) supported at a rising and/or falling operation to a first direction through position change and fine deformation of the connection part (2153) of upper elastic member (2150) and the connection part (2163) of lower elastic member (2160). Each inner frame (2151, 2161) of upper and lower elastic members (2150, 2160) may be provided with a through hole (2151a, 2161a) coupled with the upper and lower support protrusions (2113, 2114) of bobbin (2110). Each outer frame (2152, 2162) of upper and lower elastic members (2150, 2160) may be provided with a through hole (2152a, 2162a) coupled with the upper and lower support protrusions (2144, 2147) of housing (2140).

For example, each of the upper and lower elastic members (2150, 2160) may be bonded with the bobbin (2110) using heat fusion and/or adhesive, and each of the upper and lower elastic members (2150, 2160) may be bonded with the housing (2140).

At least one of the upper and lower elastic members (2150, 2160) may be divided to more than two pieces, and each of the elastic members divided to more than two pieces may include the abovementioned inner frame, the outer frame and the connection frame. However, the present invention is not limited thereto. For example, the lower elastic member (2160) may include first and second lower elastic members (2160a, 2160b), each mutually, electrically divided and spaced apart.

A distal end of the inner frame (2161) of the first lower elastic member (2160a) may be provided with a first contact part (T1) electrically connected to a distal end of the coil (2120), and an inner frame (2161) of the second lower elastic member (2160b) may be provided with a second contact part (T2) electrically connected to the other end of the coil (2120).

Furthermore, a distal end of the outer frame (2162) of the first lower elastic member (2160a) may be provided with a third contact part (T3) electrically connected to a first terminal of the circuit substrate (2170), and a distal end of outer frame (2162) of the second lower elastic member (2160b) may be provided with a fourth contact part (T4) electrically connected to a second terminal of the circuit substrate (2170).

Bonding between both ends of coil (2120) and the first and second contact parts (T1, T2) of first and second lower elastic members (2160a, 2160b), and bonding between the circuit substrate (2170) and the third and fourth contact parts (T3, T4) may be realized using heat fusion and/or adhesive.

Next, the base (2210) will be explained.

The base (2210) may form a reception space between the bobbin (2110) and the housing (2140) by coupling with the cover member (2300). The base (2210) may be formed with a hollow hole corresponding to a hollow hole of bobbin (2110) or/and a hollow hole of housing (2140), and the hollow hole of base (2210) may have a shape corresponding to that of cover member (2300), e.g., that of a square hollow hole. The base (2210) may be formed with a staircase (2211, see FIG. 32) to be coated with an adhesive when adhesively fixing the cover member (2300). At this time, the staircase (2211) may guide the cover member (2300) coupled at an upper side, and may be so coupled as to allow a distal end of cover member (2300) to be surface-contacted.

The base (2210) may include a guide member (2216) protruded from four corner parts to an upper surface direction, where the guide member (2216) may take a polygonal prism shape. However, the present invention is not limited thereto. The guide member (2216) may be inserted, fastened or coupled to a lower guide groove (2148) of the housing (2140).

Next, a first damper member (2180) and a second damper member (2190) will be explained.

The first damper member (2180) may be interposed between the bobbin (2110) and the connection part (2153) of upper elastic member (2150). The first damper member (2180) may be realized by a sol or gel-shaped resin material, e.g., epoxy. For example, the first damper member (2180) may be disposed between an upper surface of bobbin (2110), e.g., a floor of upper escape groove (2112), and a connection part (2153) of upper elastic member (2150).

Furthermore, the first damper member (2180) may be arranged between a lateral surface of first protrusion part (2111*a*) of bobbin (2110) and a connection part (2153) of upper elastic member (2150). The first protrusion part (2111*a*) may function to prevent the material of first damper member (2180), sol or gel-shaped resin from flowing down.

Figure 39:
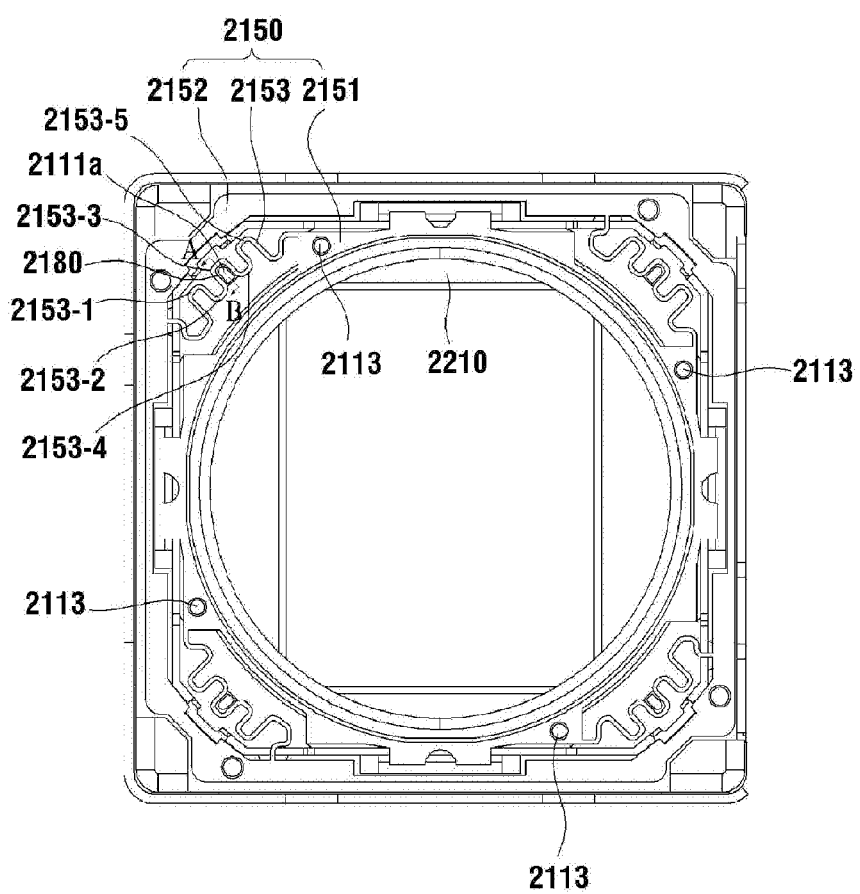
Figure 40A:
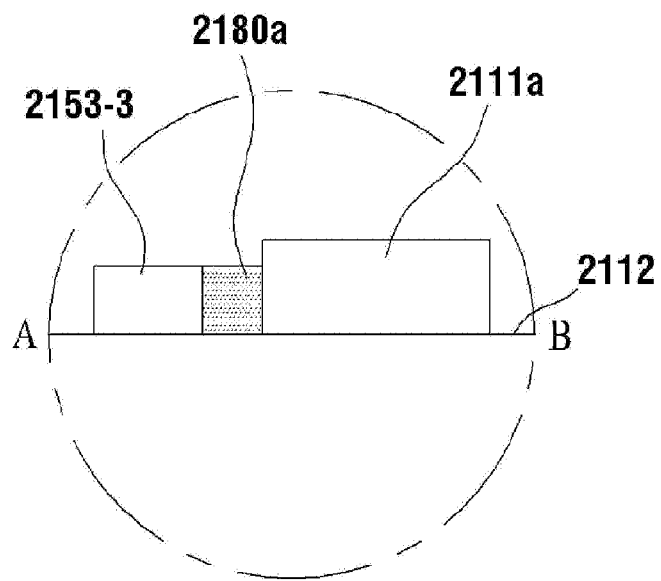
FIG. 40a is a schematic cross-sectional view of a bent part, a first damper member and a first protrusion illustrated in FIG. 39 to an AB direction according to an exemplary embodiment of present invention.

FIG. 39 is a schematic view illustrating a first damper member (2180) interposed between a connection part (2153) of upper elastic member (2150) and a bobbin (2110), and FIG. 40*a* is a schematic cross-sectional view of a bent part (2153-3), a first damper member (2180) and a first protrusion part (2111*a*) illustrated in FIG. 39 to an AB direction according to an exemplary embodiment of present invention.

Referring to FIGS. 39 and 40*a*, the connection part (2153) of upper elastic member (2150) may include mutually connected plurality of bent parts (2153-1 to 2153-5). For example, the connection part (2153) of upper elastic member (2150) may include first bent parts (2153-1, 2153-3, 2153-5) convexly formed from a bobbin (2110) direction to a housing (2140) direction, and second bent parts (2153-2, 2153-4) convexly formed from a housing (2140) direction to a bobbin (2110) direction, where the second bent parts (2153-2, 2153-4) may be disposed among the first bent parts (2153-1, 2153-3, 2153-5).

Any one (e.g., 2153-3) of the plurality of bent parts (2153-1 to 2153-5) in the connection part (2153) at the upper elastic member (2150) may be so disposed as to encompass a lateral surface of first protrusion part (2111*a*) of bobbin (2110).

For example, an inner surface of bent part (e.g., 2153-3) encompassing the first protrusion part (2111*a*) of bobbin (2110) may have a same shape, e.g., a same curvature as that of lateral surface of the first protrusion part (2111*a*).

For example, although the bent part (e.g., 2153-3) disposed at a center in the plurality of bent parts (2153-1 to 2153-5) in the connection part (2153) at the upper elastic member (2150) is so disposed as to encompass a lateral surface of first protrusion part (2111*a*) of bobbin (2110), the present invention is not limited thereto.

For example, when the number of plurality of bent parts (2153-1 to 2153-5) convexly formed from a bobbin (2110) direction to a housing (2140) direction is an odd number, the bent part (e.g., 2153-3) disposed at a center in the plurality of bent parts (2153-1 to 2153-5) may be so disposed as to encompass a lateral surface of first protrusion part (2111*a*) of bobbin (2110).

The first damper member (2180) may be disposed between a lateral surface of first protrusion part (2111*a*) of bobbin (2110) and a corresponding bent part (e.g., 2153-3) in the connection part (2153) at the upper elastic member (2150).

The first damper member (2180) may be disposed between a lateral surface of first protrusion part (2111*a*) of bobbin (2110) and any one of first bent parts (2153-1, 2153-3, 2153-5). For example, the first damper member (2180) may be disposed between a lateral surface of first protrusion part (2111*a*) of bobbin (2110) and the first bent part (e.g., 2153-3) disposed at a center in the plurality of first bent parts (2153-1, 2153-3, 2153-5).

The first damper member (2180) may contact a lateral surface of first protrusion part (2111*a*) of bobbin (2110), a bent part (e.g., 2153-3) in the connection part (2153) at the upper elastic member (2150) corresponding to the first protrusion part (2111*a*) and an upper surface of bobbin (2110), e.g., a floor of upper escape groove (2112).

Figure 40B:
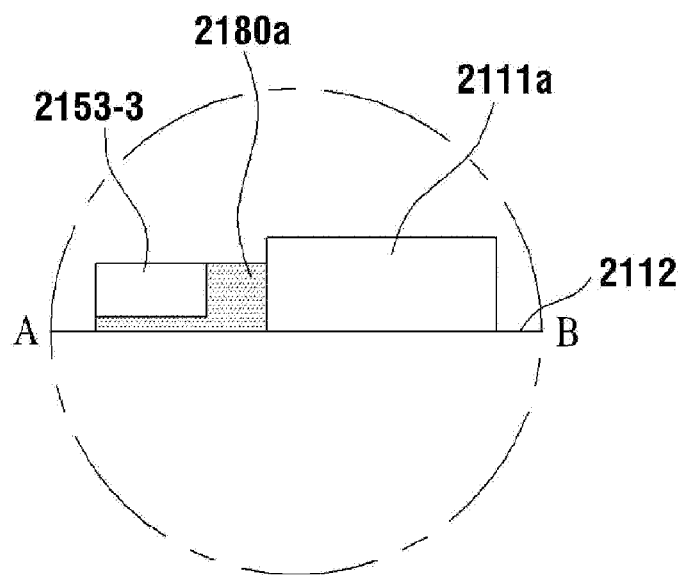
FIG. 40b is a schematic cross-sectional view of a bent part, a first damper member and a first protrusion part illustrated in FIG. 39 to an AB direction according to another exemplary embodiment of present invention.

FIG. 40*b* is a schematic cross-sectional view of a bent part (2153-3), a first damper member (2180*a*) and a first protrusion part (2111*a*) illustrated in FIG. 39 to an AB direction according to another exemplary embodiment of present invention.

Referring to FIG. 40*b*, the first damper member (2180*a*), in addition to the damper member (2180) of FIG. 40*a*, may be also disposed between a bent part (e.g., 2153-3) in the connection part (2153) at the upper elastic member (2150), and an upper surface of bobbin (2110), e.g., a floor of upper escape groove (2112).

Figure 40C:
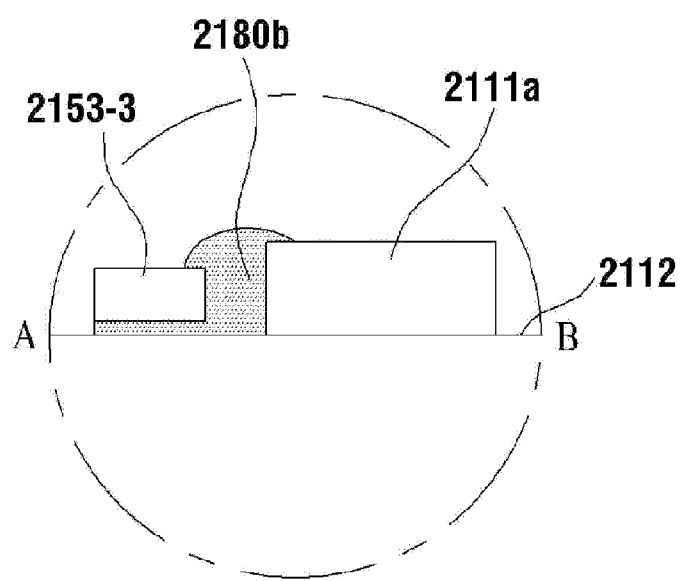
FIG. 40c is a schematic cross-sectional view of a bent part, a first damper member and a first protrusion part illustrated in FIG. 39 to an AB direction according to still another exemplary embodiment of present invention.

FIG. 40*c* is a schematic cross-sectional view of a bent part (2153-3), a first damper member (2180*b*) and a first protrusion part (2111*a*) illustrated in FIG. 39 to an AB direction according to still another exemplary embodiment of present invention.

Referring to FIG. 40*c*, the first damper member (2180*b*), in addition to the damper member (2180*a*) of FIG. 40*b*, may be also disposed between an upper surface of bent part (e.g., 2153-3) in the connection part (2153) at the upper elastic member (2150), and an upper surface of first protrusion part (2111*a*) of bobbin (2110).

Figure 41:
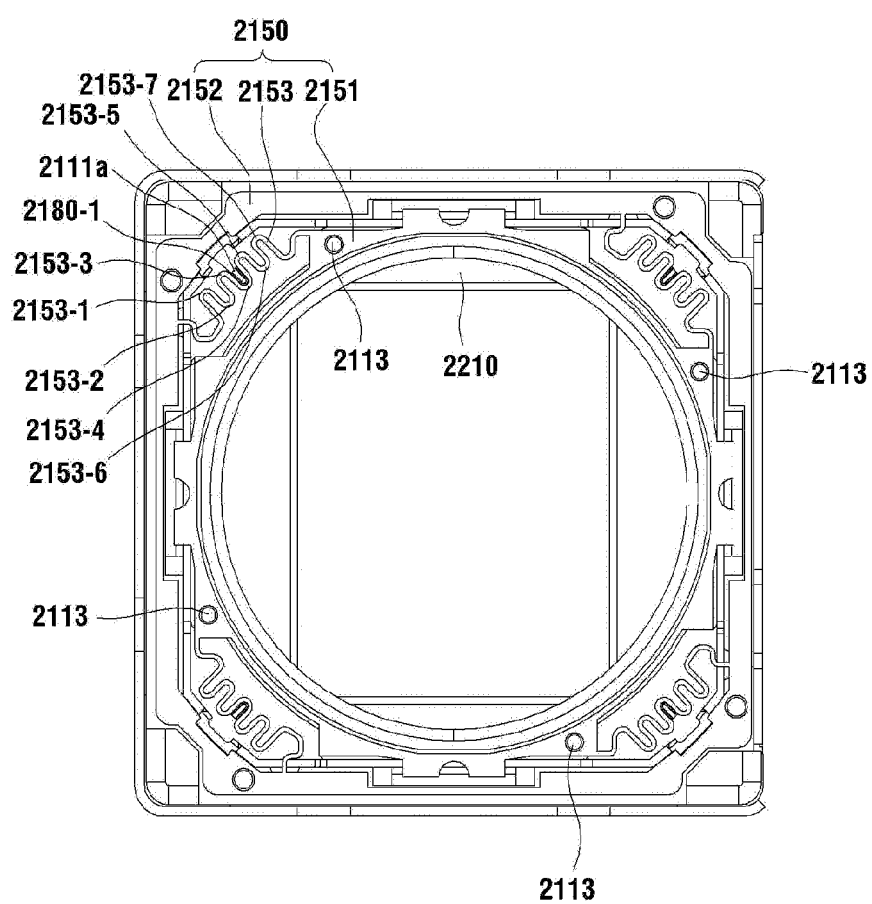

FIG. 41 is a schematic view of bent parts (2153-1 to 2153-6) and first damper member (2180-1) according to another exemplary embodiment of present invention.

Referring to FIG. 41, the connection part of the upper elastic member (2150) may include first bent parts (2153-1, 2153-3, 2153-5), and second bent parts (2153-2, 2153-4, 2153-6).

The first damper member (2180-1) may be disposed between a lateral surface of first protrusion part (2111*a*) of bobbin (2110) and any one of second bent parts (2153-2, 2153-4, 2153-6).

For example, the first damper member (2180-1) may be disposed between a lateral surface of first protrusion part (2111*a*) of bobbin (2110) and a second bent part (e.g., 2153-4) disposed at a center in the plurality of second bent parts (2153-2, 2153-4, 2153-6).

For example, when the number of plurality of first bent parts (2153-2, 2153-4, 2153-6) convexly formed from a house (2140) direction to a bobbin (2110) direction is an odd number, the bent part (e.g., 2153-4) disposed at a center in the plurality of bent parts (2153-2, 2153-4, 2153-6) may be so disposed as to encompass a lateral surface of first protrusion part (2111*a*) of bobbin (2110).

The first damper member (2180-1) may be disposed between a lateral surface of first protrusion part (2111*a*) of bobbin (2110) and a corresponding bent part (e.g., 2153-4) in the connection part (2153) at the upper elastic member (2150).

The explanation of FIGS. 40*a* to 40*c* may be identically applied to that of FIG. 41.

Figure 42:
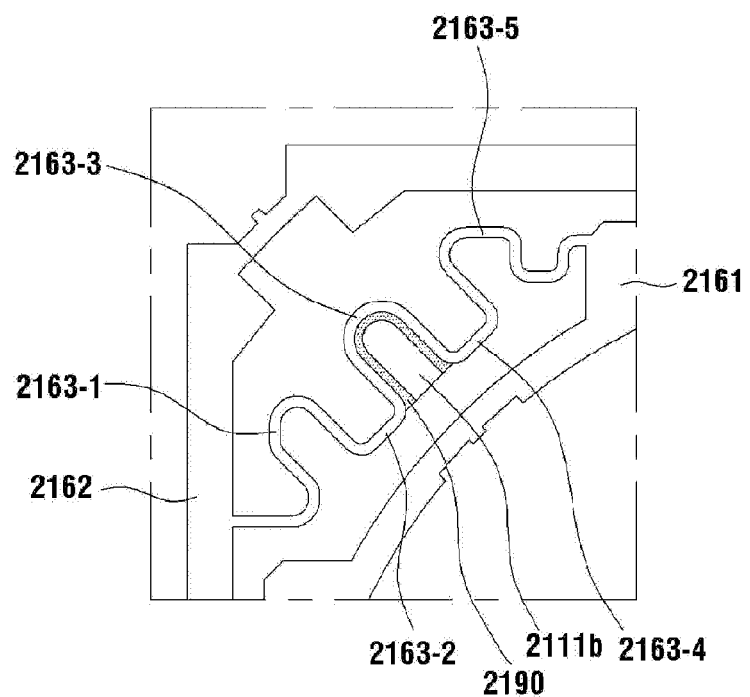

FIG. 42 is a schematic view of second damper member according to an exemplary embodiment of present invention.

Referring to FIG. 42, a second damper member (2190) may be disposed between a bobbin (2110) and a connection part (2163) at the lower elastic member (2160). The second damper member (2190) may be realized by a sol or gel-shaped resin material, e.g., epoxy. For example, the second damper member (2190) may be arranged between a lower surface of bobbin (2110), e.g., a floor of a lower escape groove (2118) and a connection part (2163) of lower elastic member (2160).

Furthermore, the second damper member (2190) may be disposed between a lateral surface of second protrusion part (2111b) of bobbin (2110) and a connection part (2163) of lower elastic member (2160). The second protrusion part (2111b) may function to prevent the material of second damper member (2190), sol or gel-shaped resin, from flowing down.

The connection part (2163) of lower elastic member (2160) may include a mutually-connected plurality of bent parts (2163-1 to 2163-5).

The connection part (2163) of lower elastic member (2160) may include first bent parts (2163-1, 2163-3, 2163-5) convexly formed from a bobbin (2110) direction to a housing (2140) direction, and second bent parts (2163-2, 2163-4) convexly formed from a housing (2140) direction to a bobbin (2110) direction, where the second bent parts (2163-2, 2163-4) may be disposed among adjacent first bent parts (2163-1, 2163-3, 2163-5).

Any one (e.g., 2163-3) of the plurality of bent parts (2163-1 to 2163-5) in the connection part (2163) at the lower elastic member (2160) may be so disposed as to encompass a lateral surface of second protrusion part (2111b) of bobbin (2110).

For example, an inner surface of bent part (e.g., 2163-3) encompassing the second protrusion part (2111b) of bobbin (2110) may have a same shape, e.g., a same curvature as that of lateral surface of the second protrusion part (2111b).

For example, although the bent part (e.g., 2163-3) disposed at a center in the plurality of bent parts (2163-1 to 2163-5) in the connection part (2163) at the lower elastic member (2160) is so disposed as to encompass a lateral surface of second protrusion part (2111b) of bobbin (2110), the present invention is not limited thereto.

The second damper member (2190) may be disposed between a lateral surface of second protrusion part (2111b) of bobbin (2110) and a corresponding bent part (e.g., 2163-3) in the connection part (2163) at the lower elastic member (2160).

The second damper member (2190) may be disposed between a lateral surface of second protrusion part (2111b) of bobbin (2110) and any one of second bent parts (2163-1, 2163-3, 2163-5). For example, the second damper member (2190) may be disposed between a lateral surface of second protrusion part (2111b) of bobbin (2110) and the second bent part (e.g., 2163-3) disposed at a center in the plurality of second bent parts (2163-1, 2163-3, 2163-5).

The second damper member (2190) may contact a lateral surface of second protrusion part (2111b) of bobbin (2110), a bent part (e.g., 2163-3) in the connection part (2163) at the lower elastic member (2160) corresponding to the second protrusion part (2111b) and an upper surface of bobbin (2110), e.g., a floor of lower escape groove (2118).

The first and second damper members (2180, 2190) may function to mitigate the translation of the connection part (2153) at the upper elastic member (2160) and the connection part (2163) at the lower elastic member (2160) that are elastically deformed at the same time when the bobbin (2110) moves, and to restrict the vibration of bobbin (2110).

The first damper members (2180, 2180-1) explained in FIGS. 40a to 40c and FIG. 41 may be identically applied to that of FIG. 42 according to another exemplary embodiment.

Figure 43A:
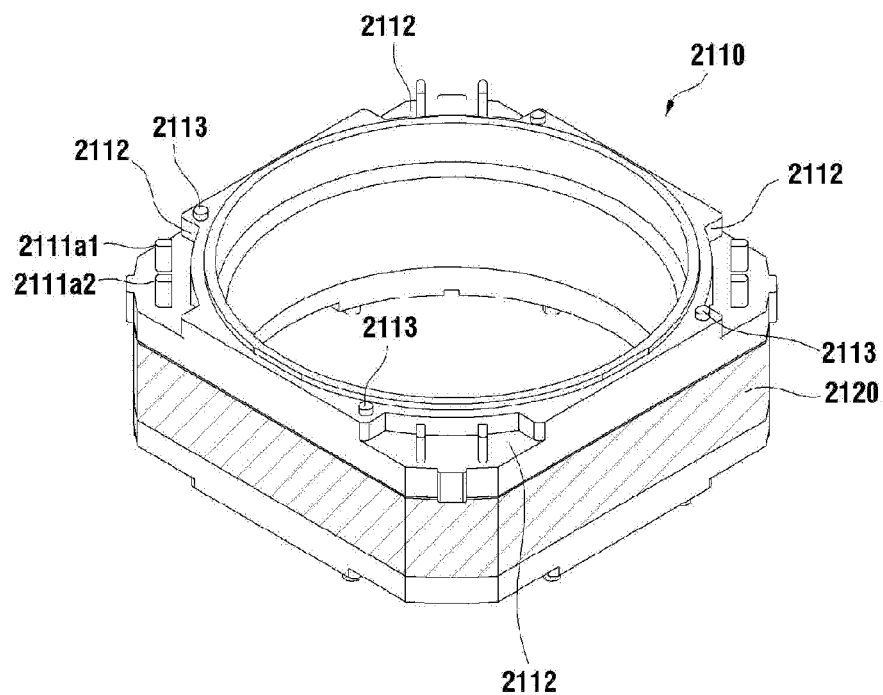
FIG. 43a is a first perspective view of a bobbin according to another exemplary embodiment of present invention.
Figure 43B:
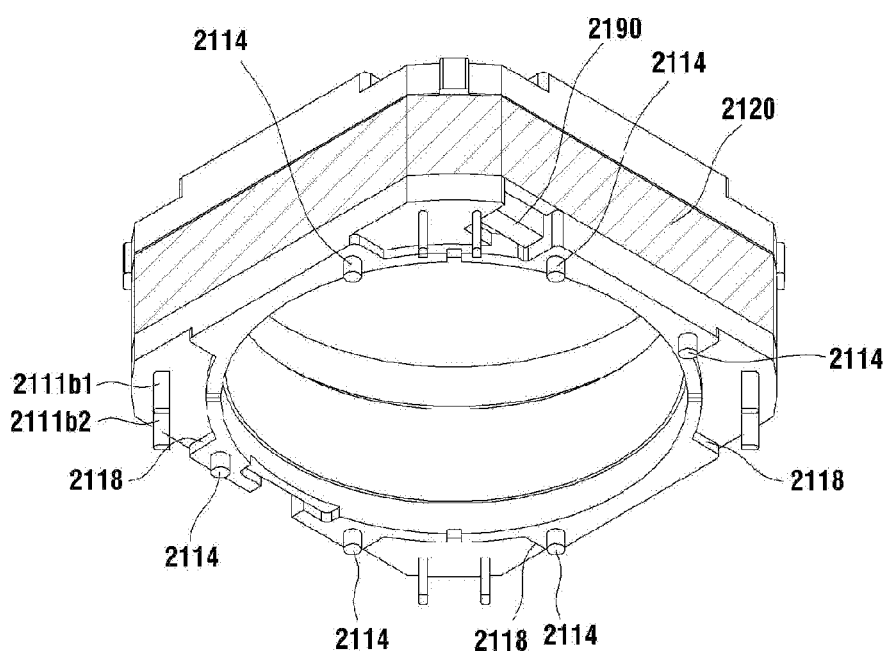
FIG. 43b is a second perspective view of a bobbin according to another exemplary embodiment of present invention.
Figure 44:
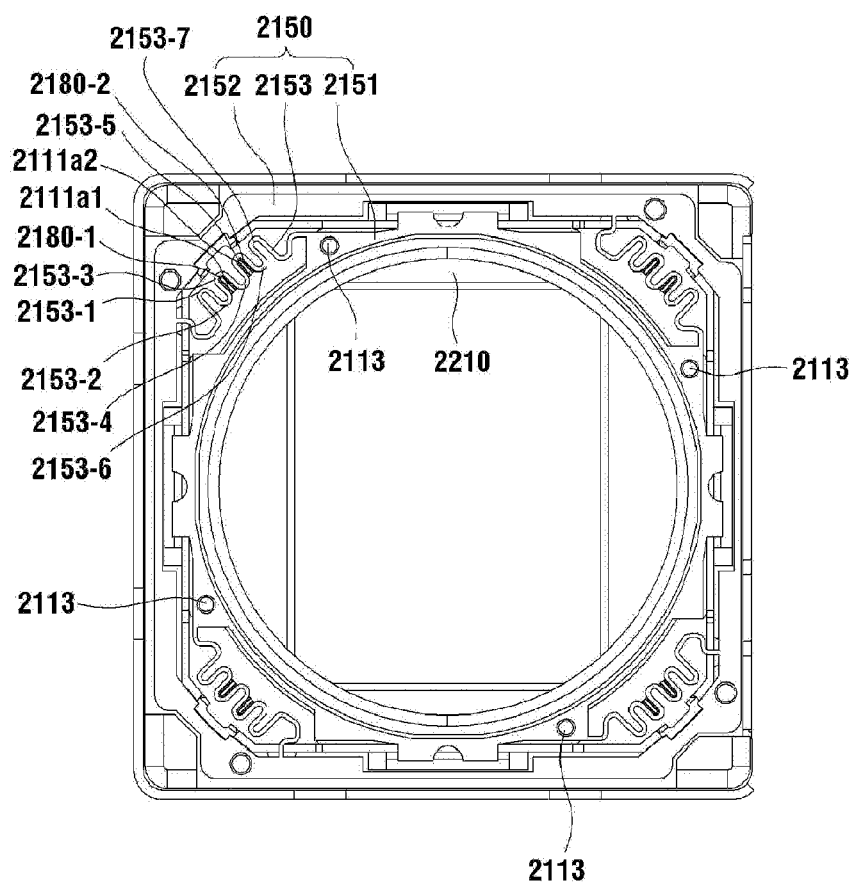

FIG. 43a is a first perspective view of a bobbin according to another exemplary embodiment of present invention, FIG. 43b is a second perspective view of a bobbin according to another exemplary embodiment of present invention, and FIG. 44 is a schematic view of first damper members according to another exemplary embodiment of present invention.

Referring to FIGS. 43a, 43b and 44, the another exemplary embodiment of present invention may include a bobbin having two or more first protrusion parts (2111a1, 2111a2), each mutually spaced apart from the other, formed on an upper surface, e.g., a floor of upper escape groove (2112).

The connection part (2153) of upper elastic member (2150) may include a plurality of bent parts (2153-1 to 2153-7).

The another exemplary embodiment of present invention may include, as illustrated in FIG. 44, two or more first damper members (2180-1, 2180-2). Each of the first damper members (2180-1, 2180-2) may be disposed between any one of corresponding plurality of bent parts (2153-1 to 2153-7) and any one of corresponding first protrusion parts (2111a1, 2111a2).

For example, when the number of plurality of first bent parts (2153-1, 2153-3, 2153-5, 2153-7) convexly formed from a bobbin (2110) direction to a housing (2140) direction is an even number, the even numbered (e.g., 2) bent parts (e.g., 153-3, 2153-5) disposed at a center in the plurality of bent parts (2153-1, 2153-3, 2153-5, 2153-7) may be so disposed as to encompass a lateral surface of first protrusion part (2111a1, 2111a2) of bobbin (2110).

The first damper members (2180-1, 2180-2) may be disposed between centrally-disposed bent parts (2153-3, 2153-7) and corresponding first protrusion parts (2111a1, 2111a2) of bobbin (2110).

In another exemplary embodiment, when the number of first bent parts convexly formed from a housing (2140) direction to a bobbin (2110) direction is an even number, each even numbered (e.g., 2) bent parts disposed at a center in the plurality of bent parts may be so disposed as to encompass any one corresponding lateral surface of first protrusion parts of bobbin (2110). Furthermore, the first damper members may be disposed between first protrusion parts corresponding to the two centrally-disposed bent parts.

The exemplary embodiment of FIG. 44 may be different from that of FIG. 39 only in terms of the number of first protrusion parts, the number of bent parts in the connection part of upper elastic member (2150), and the number of first damper members, and the content explained in FIGS. 39 to 41 may be identically applied.

A bobbin (2110-1) according to another exemplary embodiment may include two or more mutually discrete second protrusion parts (2111b1, 2111b2) formed on a lower surface, e.g., a lower escape groove (2118).

Albeit not being illustrated, the bobbin according to another exemplary embodiment may include two or more second damper members (not shown), and each of the second damper members may be disposed between any corresponding one of the plurality of bent parts of the connection part (2163) of lower elastic member (2160) and any corresponding one of the second protrusion parts (2111b1, 2111b2).

The second damper member (2190) explained in FIG. 42 may be identically applied to the second damper member of another exemplary embodiment albeit being different from that of FIG. 42 only in terms of the number of second protrusion parts, the number of bent parts in the connection part of lower elastic member (2160), and the number of second damper members.

Although the exemplary embodiment of FIG. 32 may include both the first and second damper members (2180, 2190), the present invention is not limited thereto, and other exemplary embodiments may include any one of the first and second damper members (2180, 2190).

The low-priced lens driving device may include two magnets (2130) as illustrated in FIG. 32. When compared with a case where the number of magnets are four, the electromagnetic force in response to interaction with the first coil (2120) may be less in case of where the number of magnets are two, such that it is necessary to lowly change the spring constant (K) of upper and lower elastic members for AF driving, where, when the spring constant (K) of upper and lower elastic members is low, the trembling of mover, e.g., the bobbin (2110) by an outside shock may be great, which results in degradation of resolution of camera module and therefore, the setting time can be elongated to disable a stable camera operation.

The first and second damper members (2180, 2190) may restrict the trembling of mover, e.g., the bobbin (2110) of lens driving device caused by vibration of vibration motor of a mobile phone.

Particularly, because the first and second damper members (2180, 2190) are disposed between the centrally-disposed bent parts (e.g., 2153-3, 2163-3) of connection parts (2153, 2163) of upper and lower elastic members (2150, 2160) and a lateral surface of first and second protrusion parts (2111a, 2111b) of bobbin (2110), the degree of trembling of mover caused by vibration of vibration motor on a mobile phone can be mitigated.

When the spring constant (K) of upper and lower elastic members (2150, 2160) is low, the trembling restriction force to the mover by the first and second damper members (2180, 2190) may be further enhanced. Furthermore, the first and second damper members (2180, 2190) can restrict the trembling of mover at the lens driving device caused by outside shock such as touch input of a smart phone.

Figure 45A:
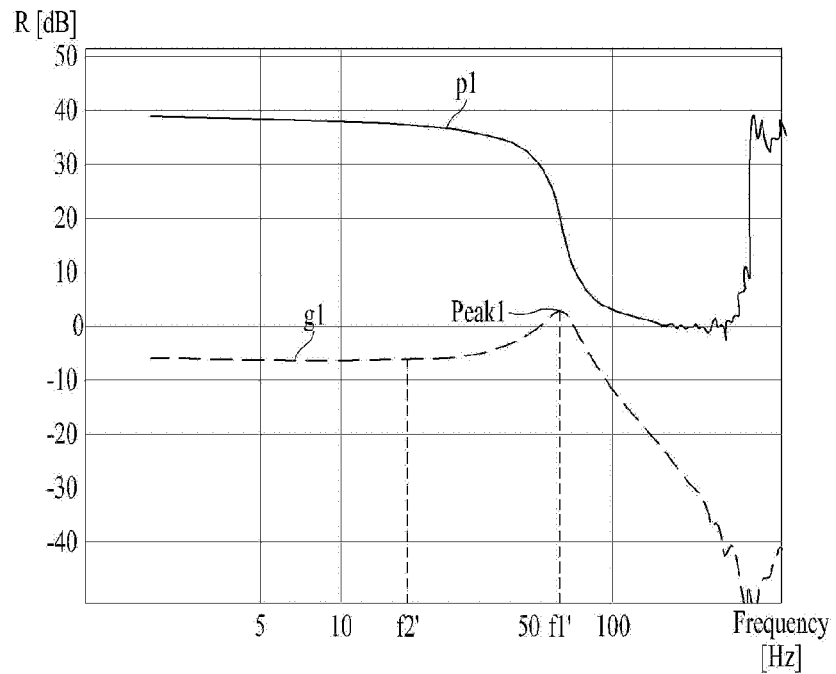
FIG. 45a is a schematic view of a first frequency response characteristics on peak of ratio of displacement at bobbin and a driving signal applied to a coil when a damper member is disposed according to an exemplary embodiment of present invention.
Figure 45B:
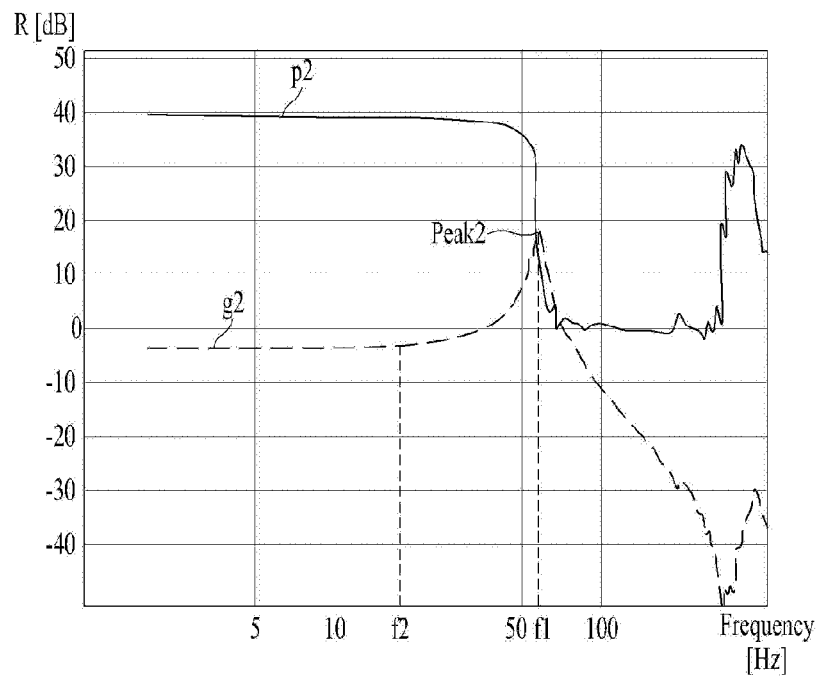
FIG. 45b is a schematic view of a second frequency response characteristics on peak of ratio of displacement at bobbin and a driving signal applied to a coil when a damper member is not disposed according to an exemplary embodiment of present invention.

FIG. 45a is a schematic view of a first frequency response characteristics on peak of ratio of displacement at bobbin (2110) and a driving signal applied to a coil (2120) when a damper member (2180, 2190) is disposed according to an exemplary embodiment of present invention, and FIG. 45b is a schematic view of a second frequency response characteristics on peak of ratio of displacement at bobbin (2110) and a driving signal applied to a coil (2120) when a damper member (2180, 2190) is not disposed according to an exemplary embodiment of present invention.

FIG. 45b illustrates a structure where the damper member (2180, 2190) alone is exempted from the exemplary embodiment of FIG. 45a, and FIGS. 45a, and 45b illustrate an experimental result under the same condition except for presence and absence of damper member (2180, 2190).

FIGS. 45a and 45b show a frequency response characteristic on a ratio between input and output, where the input may be a driving signal, e.g., a driving current, or a driving voltage inputted to the coil (2120), and the output may be a displacement of mover, e.g., the bobbin (2110) in response to frequency change of a driving signal inputted to the coil (2120).

FIGS. 45a and 45b show a result, where a current or a voltage applied to the coil (2120) is changed, and the change of displacement of mover in response to the changed current or frequency change of voltage is outputted, in order to directly ascertain the influence of trembling applied to a mover by an outside shock or a vibration of vibration motor.

For example, FIGS. 45a and 45b illustrate a displacement value of a mover in response to a result where the frequency of inputted voltage is changed within a scope of 2 [Hz]~200 [Hz] while an amplitude of voltage inputted to the coil (2120) is fixed at 100 Mv. For example, a displacement value of mover may be measured using a displacement sensor, and the mover displacement may be set at 1 [mm] in response to an output value 1[V] of displacement sensor, but the present invention is not limited thereto, and the displacement of mover versus the output value of displacement sensor may be set at 1:K (where K is a positive integer of K>10).

g1 and g2 are frequency response characteristic graphs on peaks, and P1 and P2 are frequency response characteristic graphs on phases.

The first (primary) resonance frequency (f1') of first frequency response characteristic may be higher by 3 [Hz] ~15 [Hz] than the first resonance frequency (f1) of second frequency response characteristic.

For example, the first resonance frequency (f1') of first frequency response characteristic may be higher by 5 [Hz] ~10 [Hz] than the first resonance frequency (f1) of second frequency response characteristic.

Furthermore, for example, the first resonance frequency (f1') of first frequency response characteristic may be higher by 8 [Hz]~10 [Hz] than the first resonance frequency (f1) of second frequency response characteristic.

Furthermore, for example, as illustrated in FIGS. 45a and 45b, the first resonance frequency (f1') of first frequency response characteristic may be higher by about 6 [Hz] than the first resonance frequency (f1) of second frequency response characteristic.

For example, the first resonance frequency (f1') of first frequency response characteristic may be 50 [Hz]~170 [Hz]. For example, the first resonance frequency (F1') of first frequency response characteristic may be 70 [Hz].

The first resonance frequency (f1') of first frequency response characteristic may not be overlapped with a resonance frequency (e.g., 175 [Hz]~180 [Hz]) of vibration motor. For example, a difference between the first resonance frequency (f1') of first frequency response characteristic and the resonance frequency of vibration motor may be more than 5 [Hz]. In another exemplary embodiment, a difference between the first resonance frequency (f1') of first frequency response characteristic and the resonance frequency of vibration motor may be more than 10 [Hz].

The peak (peak 1) at the first resonance frequency (f1') of first frequency response characteristic may be lower by 5 [dB]~20 [dB] than the peak (peak2, hereinafter referred to as "reference peak") at the first resonance frequency (f1) of second frequency response characteristic.

For example, the peak (peak 1) at the first resonance frequency (f1') of first frequency response characteristic may be lower by 10 [dB]~20 [dB] than the peak (peak2, hereinafter referred to as "reference peak") at the first resonance frequency (f1) of second frequency response characteristic.

Furthermore, for example, the peak (peak 1) at the first resonance frequency (f1') of first frequency response characteristic may be lower by 15 [dB]~20 [dB] than the peak (peak2) at the first resonance frequency (f1) of second frequency response characteristic. For example, the peak 1 may be lower by 15 [dB] than the peak2.

The first peak lower than a first reference frequency (f2') of first frequency response characteristic may be lower by 3 [dB]~8 [dB] than the second peak at the second reference frequency (f2) of second frequency response characteristic.

For example, the first peak lower than a first reference frequency (f2') of first frequency response characteristic may be lower by 3 [dB]~6 [dB] than the second peak at the second reference frequency (f2) of second frequency response characteristic.

For example, when an absolute value of difference between the first peak lower than a first reference frequency (f2') and the second peak lower than the second reference frequency (f2) is less than 3 [dB], the depth of field for lens mounted on the lens driving device (2100) may be influenced by the vibration of linear vibration motor or outside shock, and therefore, the resolution may be degraded or the focus may be twisted.

On the other hand, when an absolute value of difference between the first peak lower than a first reference frequency (f2') and the second peak lower than the second reference frequency (f2) exceed 8 [dB], the AF driving force may be weakened to require an increase in input driving signal for driving, whereby the power consumption may be increased and the AF sensitivity may be dulled.

Furthermore, for example, the first peak lower than a first reference frequency (f2') of first frequency response characteristic may be lower by 6 [dB]~8 [dB] than the second peak at the second reference frequency (f2) of second frequency response characteristic, in order to prevent the depth of field for lens mounted on the lens driving device (2100) from being more stably influenced by the vibration of linear vibration motor or outside shock.

Here, the first reference frequency (f2') may be a low frequency as much as a difference of first frequency pre-set at the first resonance frequency (f1') of first frequency response characteristic. For example, the difference of pre-set first frequency may be 40 [Hz]~70 [Hz]. Furthermore, in still another exemplary embodiment, the difference of pre-set first frequency may be 50 [Hz]~60 [Hz].

The second reference frequency (f2) may be a low frequency as much as a difference of second frequency pre-set at the first resonance frequency (f1) of second frequency response characteristic. For example, the difference of pre-set second frequency may be 40 [Hz]~70 [Hz]. Furthermore, in still another exemplary embodiment, the difference of pre-set second frequency may be 50 [Hz]~60 [Hz]. The difference of pre-set first frequency and the difference of pre-set second frequency may be identical.

The second peak lower less than the second reference frequency (f2) may be about −3 [dB] at FIG. 45b, and the first peak less than the first reference frequency (f2') at FIG. 45a may be about −7 [dB], and a difference therebetween (first peak−second peak) may be about −4 [dB].

By lowering the first peak less than the first reference frequency (f2') than the second peak less than the second reference frequency (f2) by 3 [dB]~6 [dB], the depth of field for a lens mounted on the lens driving device (2100) can be prevented from being influenced by the vibration of a linear vibration motor having a first resonance frequency of 175 [Hz]~180 [Hz] according to the exemplary embodiment. For example, the depth of field for lens may be 5 μm~10 μm. For example, the depth of field for lens may be 10 μm.

Figure 46A:
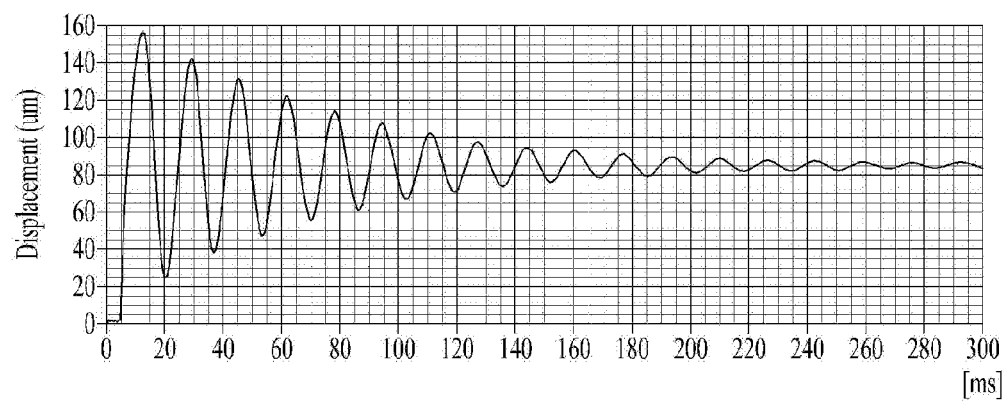
FIG. 46a is a displacement of a mover according to a time in case of FIG. 45b.
Figure 46B:
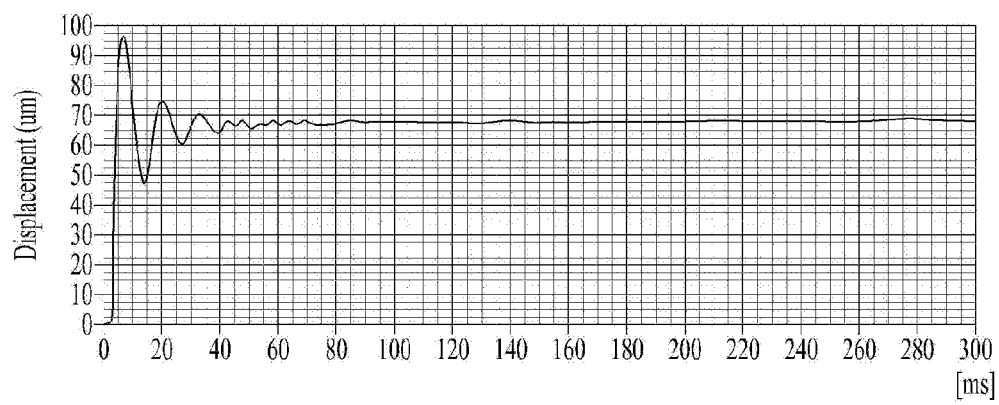

FIG. 46a is a displacement of a mover according to a time in case of FIG. 45b, and FIG. 46b is a displacement of a mover according to a time in case of FIG. 45a.

Referring to FIGS. FIG. 46a and FIG. 46b, a time (250 [ms]) taken for displacement of a mover of FIG. 46b formed with first and second damper members (2180, 2190) to enter a normal state may be shorter than a time (200 [ms]) taken for displacement of a mover of FIG. 46a to enter a normal state.

The first resonance frequency (f1') of first frequency response characteristic may be more increased by as much as 5 [Hz]~10 [Hz] than the first resonance frequency (f1) of second frequency response characteristic by the first damper member (2180) disposed between the bent part (2153-3) of connection part (2153) of upper elastic member (2150) and the first protrusion part (2111a) of bobbin (2110), and the second damper member (2190) disposed between the bent part (2163-3) of connection part (2163) of lower elastic member (2160) and the second protrusion part (2111b) of bobbin (2110), and the first peak of first frequency response characteristic may be lowered by as much as 3 [dB] 6 [dB] than the second peak of second frequency response characteristic, and the (peak1) of first resonance frequency (f1') of first frequency response characteristic may be lowered by as much as 10 [dB]~20 [dB] than the peak (peak2) of the first resonance frequency of second frequency response characteristic.

As a result, the depth of field for lens mounted on the lens driving device (2100) may be prevented from being influenced by the vibration of linear vibration motor or outside shock, whereby degradation of resolution can be prevented and therefore, a mounting time of lens driving device caused by shock can be reduced.

Figure 47:
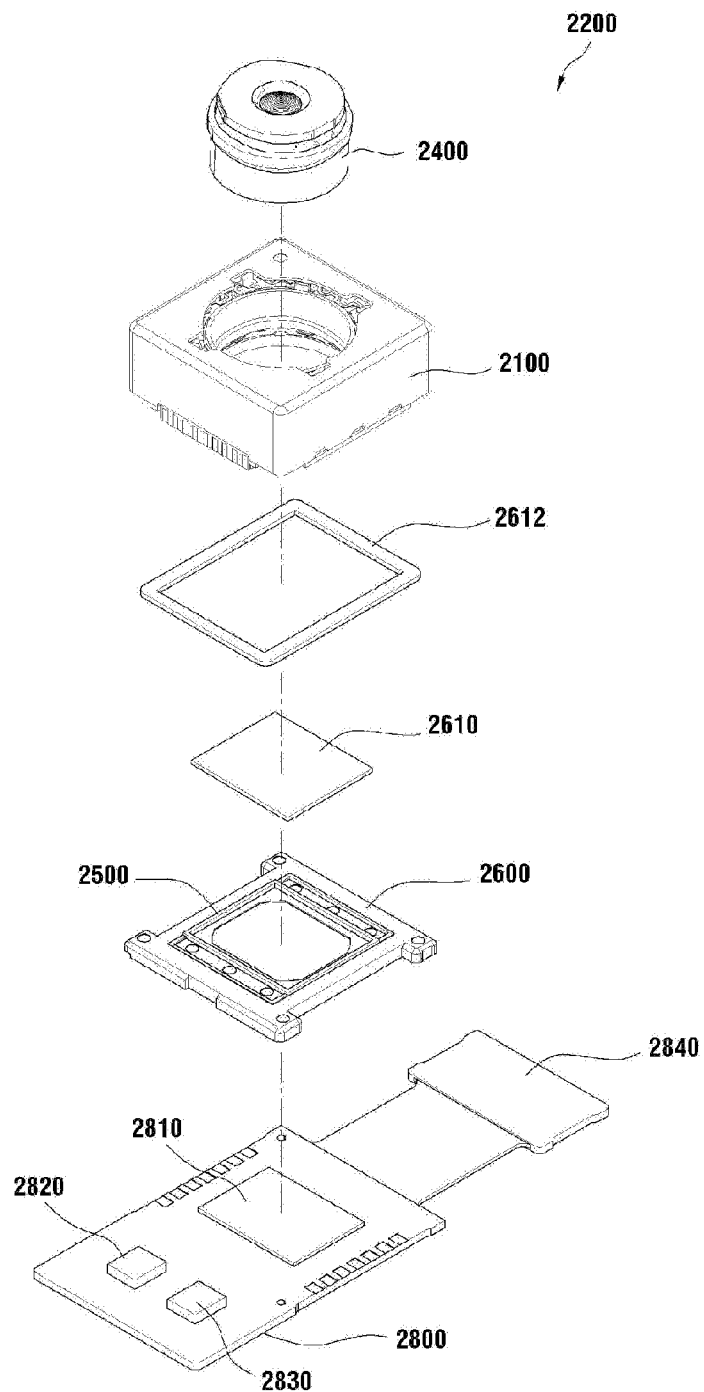

FIG. 47 is an exploded perspective view of a camera module (200) according to an exemplary embodiment of present invention.

Referring to FIG. 47, the camera module (200) may include a lens barrel (2400), a lens driving device (2100), an adhesive member (2710), a filter (2610), a first holder (2600), a second holder (2800), an image sensor (2810), a motion sensor (2820), a controller (2830) and a connector (2840).

The lens barrel (2400) may be mounted on a bobbin (2110) of lens driving device (2100). The first holder (2600) may be disposed beneath the base (2210) of lens driving device (2100). The filter (2610) may be mounted on the first holder (2600), and the first holder (2600) may include a protrusion part (2500) accommodated by the filter (2610).

The adhesive member (2710) may adhere or couple the base (2210) of lens driving device (2100) to the first holder (2600). The adhesive member (2710) may also function to prevent the foreign object from coming into the lens driving device (2100) in addition to the abovementioned adhering function. For example, the adhesive member (2710) may be epoxy, heat-hardening adhesive, a UV hardening adhesive.

The filter (2610) may function to prevent a light of particular frequency band in the light passing through the lens barrel (2400) from being incident on the image sensor (2810). The filter (2610) may be an infrared cut-off filter, but the present invention is not limited thereto. At this time, the filter (2610) may be disposed to be in parallel with the x-y plane.

An area of the first holder (2600) mounted with the filter (2610) may be formed with a hollow hole to allow a light having passed the filter (2610) to be incident on the image sensor (2810). The second holder (2800) may be disposed at a lower surface of first holder (2600) and the second holder (2600) may be mounted with an image sensor (2810). The image sensor (2810) may be an area where a light having passed the filter (2610) is incident, and an image included by the light is captured.

The second holder (2800) may be formed with various circuits, elements and controller for transmitting an image to an outside device by converting the image captured on the image sensor (2810) to an electric signal. The second holder (2800) may be mounted with an image sensor, and formed with a circuit pattern, and may be realized as a circuit substrate coupled by various elements.

The image sensor (2810) may receive an image included in a light incident through the lens driving device (2100) and convert the received image to an electric signal. The filter (2610) and the image sensor (2810) may be so disposed as to face each other to a first direction.

The motion sensor (2820) may be mounted on the second holder (2800) and may be electrically connected to the controller (2830) through a circuit pattern provided on the second holder (2800). The motion sensor (2820) may output rotational angular speed information in response to the movement of camera module (2200). The motion sensor (2820) may be realized by a 2-axis gyro sensor or a 3-axis gyro sensor, or an angular speed sensor.

The controller (2830) may be mounted on the second holder (2800), and may be electrically connected with a second position sensor (2240) of lens driving device (2100) and with a second coil (2230). For example, the second holder (2800) may be electrically connected to the circuit substrate (2250) of lens driving device (2100), and the controller (2820) mounted on the second holder (2800) may be electrically connected to the second position sensor (2240) and the second coil (2230) through the circuit substrate (2250).

The controller (2830) may output a driving signal capable of performing an OIS to the OIS mover of lens driving device (2100), based on feedback signals provided from the second position sensor (2240) of lens driving device (2100).

The connector (2840) may be electrically connected to the second holder (2800) and may be disposed with a port for being electrically connected to an outside device.

Furthermore, the lens driving device (2100) according to an exemplary embodiment may be included in an optical instrument in which a phase of an image in a space can be formed using reflection, refraction, absorption, interference and diffraction which are the physical properties of light, an increase in visual ability of eyes is targeted, record of phase by a lens and reproduction thereof are targeted, optical measurement, transmission or propagation of phase is targeted. For example, an optical instrument according to the exemplary embodiment may include a portable terminal mounted with a smart phone or a camera.

Figure 48:
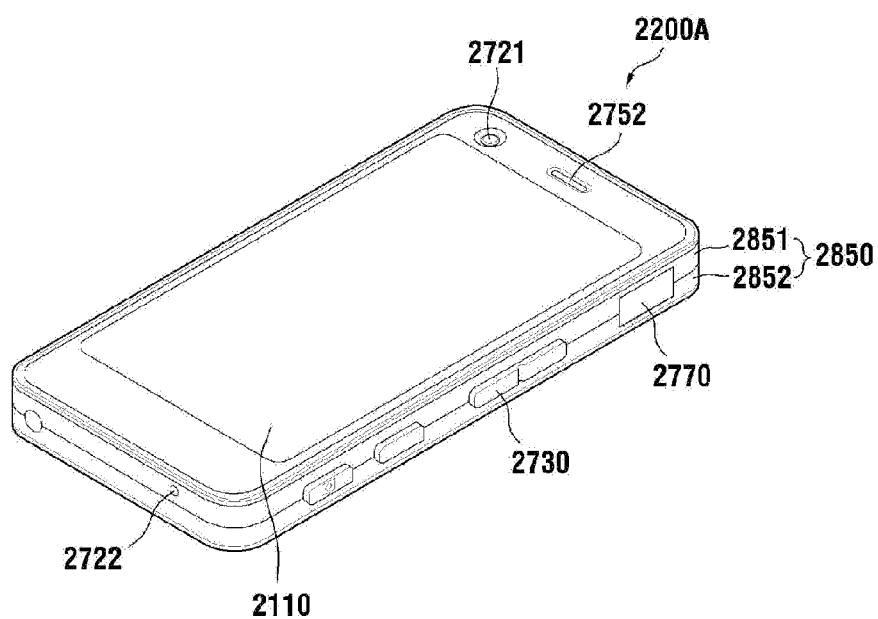
Figure 49:
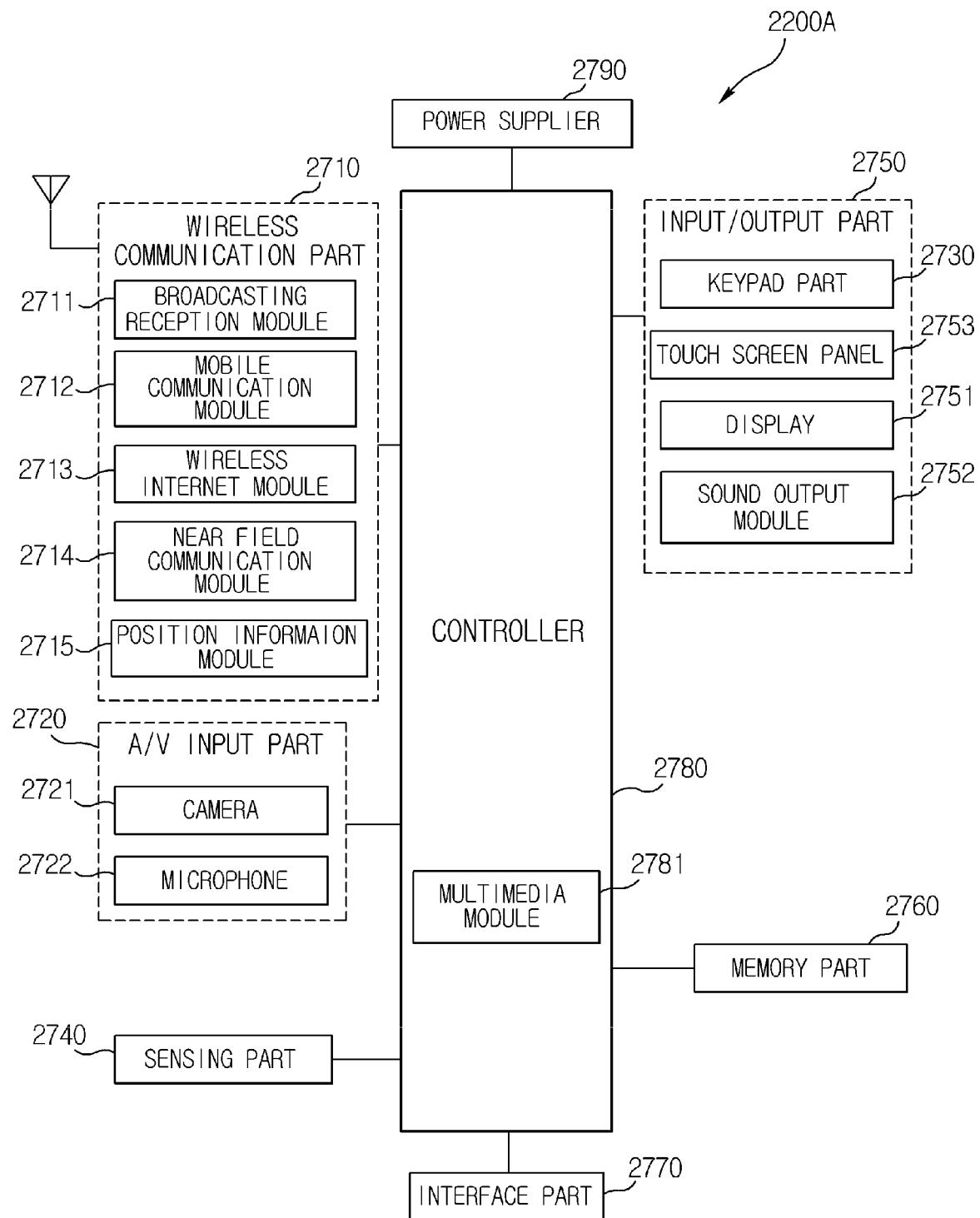

FIG. 48 is a perspective view of a portable terminal (2200A) according to an exemplary embodiment of present invention, and FIG. 49 is a block diagram of a portable terminal illustrated in FIG. 48.

Referring to FIGS. 48 and 49, the portable phone (2200A, hereinafter referred to as "terminal") may include a body (2850), a wireless communication part (2710), an A/V input part (2720), a sensing part (2740), an input/output part (2750), a memory part (2760), an interface part (2770), a controller (2780) and a power supplier (2790).

Although the body (2850) illustrate in FIG. 48 has a bar shape, the present invention is not limited thereto, and may include various structures including a slide type where two or more sub-bodies are coupled in a relative movement, a folder type, a swing type and a swivel type.

The body (2850) may include a case (casing, housing, cover and the like) forming an external look. For example, the body (2850) may be divided to a front case (2851) and a rear case (2852). Various electronic parts of terminal may be embedded in a space formed between the front case (2851) and the rear case (2852).

The wireless communication part (2710) may include one or more modules enabling a wireless communication between the terminal (2200A) and a wireless communication system or between the terminal (2200A) and a network disposed with the terminal (2200A). For example, the wireless communication part (2710) may be configured by including a wireless communication part (2710), a broadcasting reception module (2711), a mobile communication module (2712), a wireless internet module (2713), a near-field communication module (2714) and a position information module (2715).

The A/V input part (2720) is formed for input of audio signal or input of video signal, and may include a camera (2721) and a microphone (2722). The camera (2721) may include a camera module (200) of FIG. 47 according to an exemplary embodiment.

The sensing part (2740) may generate a sensing signal for operation of terminal (2200A) by detecting a current state of terminal (2200A) including an open/close state of terminal (2200A), position of terminal (2200A), presence and/or absence of user touch, azimuth of terminal (2200A) and acceleration/deceleration of terminal (2200A). For example, when the terminal (2200A) is a slide phone type, the sensing part (2740) may sense the open/close state of slide phone. Furthermore, the sensing part (2740) may take charge of sensing functions related to power supply of power supplier (2790) and coupling of outside devices of interface part (2770).

The input/output part (2750) is formed to generate an input or an output related to visual, audio or tactile matters. The input/output part (2750) may generate an input data for operation control of the terminal (2200A), and may display information processed by the terminal (2200A).

The input/output part (2750) may include a key pad part (2730), a display module (2751), a sound output module (2752) and a touch screen panel (2753). The key pad part (2730) may generate an input data in response to a key pad input.

The display module (2751) may include a plurality of pixels that change in color in response to an electric signal. For example, the display module (2751) may include at least one of a liquid crystal display, a thin film transistor-liquid crystal display, an organic light-emitting diode, a flexible display and a 3D display.

The sound output module (2752) may output an audio data received from the wireless communication part (2710) under a call signal reception, communication mode, recording mode, audio recognition mode or a broadcasting reception mode, or output an audio data stored in the memory part (2760).

The touch screen panel (2753) may convert the changes in capacitance generated by a user touch to a particular area on a touch screen to an electric input signal.

The memory part (2760) may store programs for processing and control of controller (2780), and temporarily store inputted/outputted data (e.g., telephone directory, message, audio, stationary image, photograph and video). For example, the memory part (2760) may store images photographed by the camera (2721), e.g., photograph or video.

The interface part (2770) may function as a passage connected to outside devices connected to the terminal (2200A). The interface part (2770) may receive data from outside devices, transmit a power to each element inside the terminal (2200A) by receiving the power, or allow data inside the terminal (2200A) to be transmitted to outside devices. For example, the interface part (2770) may include a wired/wireless headset port, an outside charging port, a wired/wireless data port, a memory card port, a port connecting a device formed with a recognition module, an audio input/output port, a video input/output port and earphone port.

The controller (2780) may control an overall operation of terminal (2200A). For example, the controller (2780) may perform a control and processing operation related to audio communication, data communication and video communication.

The controller (2780) may be formed with a multimedia module (2781) for multimedia reproduction. The multimedia module (2781) may be realized within the controller (2780) and may be realized separately from the controller (2780).

The controller (2780) may implement a pattern recognition process configured to recognize a writing input performed on a touch screen or a picture drawing input as a character or an image.

The power supplier (2790) may supply a power necessary for operation of each element by receiving an outside power or an inside power in response to control of the controller (2780).

The characteristics, structures and effects explained in the abovementioned exemplary embodiments may be included in at least one exemplary embodiment of the present invention, and cannot be limited to one exemplary embodiment. Furthermore, the characteristics, structures and effects exemplified in the abovementioned exemplary embodiments may be implemented by being combined or changed to the other exemplary embodiments by the skilled in the art.

Moreover, it should be interpreted that contents related to the combinations and changes may be included in the protection scope of present invention.

The fourth exemplary embodiment of present invention may include any one or more configurations in the foregoing first, second and third exemplary embodiments.

The first exemplary embodiment may include a conductive line forming structure {combined structure of lower support member (16200) and a substrate (1400)} of driving coil (1220) improved in workability in the second exemplary embodiment. The first exemplary embodiment may include a resonance prevention structure of third exemplary embodiment {damper member (2180) coating structure to bobbin (2110) and upper elastic member (2150)}.

The second exemplary embodiment may include an assembly accuracy improvement structure of sensor (720) and sensing magnet (710) in the first exemplary embodiment {correspondingly form-fitted structure (形合) between sensor (720) and housing (310) and between sensing magnet (710) and bobbin (210)}. The second exemplary embodiment may include a resonance prevention structure of third exemplary embodiment {damper member (2180) coating structure to bobbin (2110) and upper elastic member (2150)}.

The third exemplary embodiment may include an assembly accuracy improvement structure of sensor (720) and sensing magnet (710) of first exemplary embodiment {correspondingly form-fitted structure (形合) between sensor (720) and housing (310) and between sensing magnet (710) and bobbin (210)}. The third exemplary embodiment may include a conductive line forming structure of driving coil (1220) improved in workability according to the second exemplary embodiment {coupled structure between lower support member (16200) and substrate (1400)}.

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention.

Furthermore, terms such as "includes", "including", "have", "having", "comprises" and/or "comprising" as used herein mean that the relevant elements are embedded, unless otherwise described, such that the mentioned elements are not excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments.

The scope of protection of the present invention should be interpreted by the following claims and all technical ideas within the equivalent scope should be interpreted as being included in the scope of right of the present invention.

The invention claimed is:

1. A lens driving device, comprising:
a housing;
a bobbin disposed in the housing;
a coil disposed on the bobbin;
a first magnet disposed on the housing and facing the coil;
a second magnet disposed on the bobbin; and
a sensor disposed on the housing and facing the second magnet,
wherein the sensor comprises an upper surface, a lower surface disposed opposite the upper surface, an inner surface facing the second magnet, an outer surface disposed opposite the inner surface, and both lateral surfaces connecting the inner surface and the outer surface, and
wherein the upper surface and the lower surface of the sensor are fixed to the housing, and one lateral surface of the both lateral surfaces of the sensor is opened.

2. The lens driving device of claim 1, wherein the other lateral surface of both lateral surfaces of the sensor is fixed to the housing.

3. The lens driving device of claim 2, wherein the housing comprises a lower guide part contacting the lower surface of the sensor, an upper guide part contacting the upper surface of the sensor, and a lateral guide part contacting the other lateral surface of the sensor, and an inner guide contacting a portion of the inner surface of the sensor.

4. The lens driving device of claim 2, wherein at least one surface of the lower surface, the upper surface and the other lateral surface and the inner surface of the sensor is fixed to the housing using an adhesive.

5. The lens driving device of claim 1, further comprising a substrate coupled to the sensor and disposed on the housing, wherein the sensor is disposed on an inner surface of the substrate, wherein an outer surface of the substrate is disposed on a coupling surface of the housing, wherein the coupling surface of the housing comprises a first surface parallel with the outer surface of the sensor, a second surface disposed above the first surface to form an obtuse angle with the first surface, and a third surface disposed under the first surface to form an obtuse angle with the first surface, and wherein an upper surface of the substrate disposed on the second surface and a lower surface of the substrate disposed on the third surface are bent toward the sensor.

6. The lens driving device of claim 5, wherein the housing comprises a lateral guide part contacting the other surface of the both lateral surfaces of the sensor, and a bonding infuse hole formed between the lateral guide part and the coupling surface.

7. The lens driving device of claim 1, further comprising a substrate coupled to the sensor and disposed on the housing, wherein the substrate comprises a body part, a sensor mounting part extending from a first lateral surface of the body part and coupled to the sensor, and a terminal part downwardly extending from the body part, and wherein a second lateral surface disposed opposite to the first lateral surface of body part is coupled to the housing by an interference fit method.

8. The lens driving device of claim 7, further comprising a support member coupled to the housing and the bobbin and having elasticity on at least a portion thereof, wherein the support member comprises an outer part coupled to the housing, an inner part coupled to the bobbin, a connection part connecting the outer part and the inner part, and a terminal part extending from the outer part, and wherein the terminal part of the substrate is disposed between the terminal part of the support member.

9. The lens driving device of claim 1, wherein the sensor is disposed at a corner part disposed between lateral parts of the housing.

10. The lens driving device of claim 1, wherein the housing comprises a first lateral part, a first corner part disposed at one side of the first lateral part, and a second corner part disposed at the other side of the first lateral part, wherein the sensor is disposed on the first corner part, wherein the first magnet comprises a first magnet unit disposed on the first lateral part of the housing, and wherein the first magnet unit is more eccentrically disposed toward a second corner part side than the first corner part.

11. The lens driving device of claim 1, wherein a portion of the upper surface of the sensor and a portion of the lower surface of the sensor are fixed to the housing, and wherein a remaining portion of the upper surface of the sensor and a remaining portion of the lower surface of the sensor are opened.

12. The lens driving device of claim 1, wherein the second magnet is disposed between the coil and the sensor, and wherein an upper surface and a lower surface of the second magnet are fixed to the bobbin.

13. The lens driving device of claim 12, wherein the bobbin comprises an upper support part fixed by an upper surface of the second magnet, and a hole formed at the upper support part to open a portion of the upper surface of the second magnet.

14. A camera module comprising:
a PCB (Printed Circuit Board);
an image sensor disposed on the PCB;
the lens driving device of claim 1 disposed on the PCB; and
a lens coupled to the bobbin of the lens driving device and disposed above the image sensor.

15. An optical device comprising:
a body;
the camera module of claim 14 disposed on the body; and
a display part disposed on one surface of the body and outputting an image photographed by the camera module.

16. A lens driving device, comprising:
a housing;
a bobbin disposed in the housing;
a coil disposed on the bobbin;
a first magnet disposed on the housing and facing the coil;
a second magnet disposed on the bobbin;
a substrate disposed on the housing; and
a sensor disposed on the substrate and facing the second magnet, wherein the substrate comprises a body part disposed on a lateral surface of the housing and a sensor mounting part extending from the body part and disposed on a corner part of the housing, wherein the sensor is disposed on the sensor mounting part of the substrate, and wherein the sensor mounting part of the substrate is bent from the body part of the substrate.

17. The lens driving device of claim 16, wherein the sensor mounting part of the substrate and the body part of the substrate form an obtuse angle.

18. The lens driving device of claim 16, wherein the sensor comprises an upper surface, a lower surface opposite to the upper surface, an inner surface facing the second magnet, an outer surface opposite to the inner surface, and both lateral surfaces connecting the inner surface and the outer surface, and wherein the upper surface of the sensor and the lower surface of the sensor are fixed to the housing, and one lateral surface of the both lateral surfaces of the sensor is opened.

19. The lens driving device of claim 16, wherein the sensor mounting part of the substrate is disposed between an upper part of the housing and a lower part of the housing in a vertical direction, and wherein each of an upper surface of the sensor mounting part of the substrate and a lower surface of the sensor mounting part of the substrate is spaced apart from the housing.

20. The lens driving device of claim 19, wherein an upper end part of the sensor mounting part of the substrate and a lower end part of the sensor mounting part are inwardly bent.

* * * * *